United States Patent
Suzuki

(12) 
(10) Patent No.: US 6,230,560 B1
(45) Date of Patent: May 15, 2001

(54) FLOW MEASURING DEVICE AND FLOW MEASURING METHOD

(75) Inventor: Shinichi Suzuki, Yokosuka (JP)

(73) Assignees: Ricoh Company, Ltd., Tokyo; Ricoh Elemex Corporation, Nagoya; Ricoh Seiko Company, Ltd., Tokyo, all of (JP)

( * ) Notice: Subject to any disclaimer, the term of this patent is extended or adjusted under 35 U.S.C. 154(b) by 0 days.

(21) Appl. No.: 09/275,012

(22) Filed: Mar. 24, 1999

Related U.S. Application Data

(62) Division of application No. 08/862,413, filed on May 23, 1997.

(30) Foreign Application Priority Data

| May 24, 1996 | (JP) | 8-129873 |
| Sep. 25, 1996 | (JP) | 8-252895 |
| Feb. 5, 1997 | (JP) | 9-022570 |
| May 9, 1997 | (JP) | 9-119153 |

(51) Int. Cl.$^7$ ................................................. G01F 1/68
(52) U.S. Cl. ....................................................... 73/204.25
(58) Field of Search .......................... 73/202, 204.22, 73/204.25, 204.15

(56) References Cited

U.S. PATENT DOCUMENTS

| 4,627,279 | * | 12/1986 | Ohta et al. | 73/195 |
| 4,793,176 | * | 12/1988 | Sato et al. | 73/118.2 |
| 4,829,818 | * | 5/1989 | Bohrer | 73/204.22 |
| 4,936,144 | * | 6/1990 | Djorup | 73/189 |
| 5,094,105 | * | 3/1992 | Emmert, Jr. et al. | 73/204.25 |
| 5,410,912 | * | 5/1995 | Suzuki | 73/204.15 |
| 5,440,924 | * | 8/1995 | Itsuji et al. | 73/204.25 |

FOREIGN PATENT DOCUMENTS

| 2-120621 | 5/1990 | (JP) . |
| 3-52028 | 8/1991 | (JP) . |
| 4-204119 | 7/1992 | (JP) . |
| 5-164583 | 6/1993 | (JP) . |
| 5-312616 | 11/1993 | (JP) . |
| 6-64080 | 8/1994 | (JP) . |
| 7-51618 | 11/1995 | (JP) . |
| 8-509066 | 9/1996 | (JP) . |

OTHER PUBLICATIONS

Hideyuki Shibuya, Patent Abstracts of Japan Document No.: 7–117436 Date: May 9, 1995, Title: Suspension Control Device.

* cited by examiner

Primary Examiner—Benjamin R. Fuller
Assistant Examiner—Jewel V. Thompson
(74) Attorney, Agent, or Firm—Oblon, Spivak, McClelland, Maier & Neustadt, P.C.

(57) ABSTRACT

A first heating resistor is placed in a fluid flow path. A second heating resistor is placed downstream of the first heating resistor. A power supply unit supplies power to each of the first and second heating resistors. A measuring unit measures directly or indirectly a heating factor value of each of the first and second heating resistors. A subtracting unit subtracts the heating factor value of the first heating resistor from the heating factor value of the second heating resistor. A calculating unit performs one of multiplication and division on the subtracting result and the heating factor value of one of the first and second heating resistors.

2 Claims, 23 Drawing Sheets

FLOW MEASURING DEVICE AND FLOW MEASURING METHOD

This application is a divisional of Ser. No. 08/862,413 filed May 23, 1997.

BACKGROUND OF THE INVENTION

1. Field of the Invention

The present invention relates to a flow measuring device which is used in the technical field of metering such as in a gas meter, flow meter, and so forth, and, in particular, to a heat sensing type flow measuring device and flow measuring method which measures a flow velocity using a change of a resistance value of a heating resistor due to a temperature change resulting from fluid flowing.

2. Description of the Related Art

Recently, a flow meter using a fluidic flow control device is being studied as a next generation gas meter which will substitute for a conventional integrating-type film-type meter. However, the fluidic flow control device cannot measure a low flow rate equal to or less than 150 liters/hour (hereinafter, referred to as 'L/H'). Therefore, as a flow measuring device for a low flow rate range, a flow measuring device referred to as a flow sensor is used which is of a heat sensing type wherein a heating resistor is arranged on a micro bridge and is exposed to a fluid.

As a flow measuring device (flow sensor), various systems have been proposed.

Japanese Utility-Model Publication No.7-51618, Japanese Utility-Model Publication No. 7-117436, and Japanese Laid-Open Patent Application No. 5-312616 disclose flow measuring devices of a system (first system) in which a balanced bridge circuit is used and a heating resistor is driven to a fixed temperature. An example of such a flow measuring device in the prior art will now be described with reference to FIG. 1. The flow measuring device 1 uses a balanced bridge circuit 2. The balanced bridge circuit 2 has a resistance thermometer bulb 3 and a heating resistor 4. These resistors 3 and 4 have the same large temperature coefficient of resistance. A temperature setting resistor 5 which has a small temperature coefficient of resistance is connected to the resistance thermometer bulb 3. The resistors 3 and 5 form resistance thermometer bulb portion 6. Another resistor 7 is connected to the resistance thermometer bulb portion 6, and another resistor 8 is connected to the heating resistor 4. The resistors 7 and 8 have the same small temperature coefficient of resistance. As a result of the resistors 7 and 8 being connected, the balanced bridge circuit 2 is formed.

The point or node 9 at which the resistors 3 and 4 are connected to one another is grounded. To the point 10 at which the resistors 7 and 8 are connected to one another, a direct-current power source 12 is connected via a control transistor 11. A differential amplifier 15 is connected to the connection point 13 of the resistance thermometer bulb portion 6 and resistor 7 and the connection point 14 of the resistors 4 and 8. The differential amplifier 15 is connected to the control transistor 11 so as to provide feedback.

In the flow measuring device 1, the resistance thermometer bulb 3 and the heating resistor 4 are placed in a flow path, and feedback control is performed so that the balance of the balanced bridge circuit 2 is maintained. In the state in which the balanced bridge circuit 2 balances, power consumed by the heating resistor corresponds to the flow rate of the fluid. Therefore, the flow rate of the fluid can be measured by measuring the output of the differential amplifier 15 and the voltage of the connection point 14. According to the flow measuring device 1, feedback control is performed on the balance of the balanced bridge circuit 2 which changes according to change of the flow rate of the fluid. Thereby, the flow rate of the fluid can be measured. However, in the flow measuring device 1, when the temperature of the fluid changes, an error occurs in the measurement result. Therefore, it is necessary to correct the flow measurement result according to change of the temperature of the fluid.

For this purpose, in a flow measuring device disclosed in Japanese Laid-Open Patent Application No. 4-204119, a resistance thermometer bulb is detachable from a balanced bridge circuit. The resistance thermometer bulb detached from the balanced bridge circuit is driven by a constant current and the voltage drop is measured. From the measurement result, the temperature of the fluid is measured. In a flow measuring device disclosed in Japanese Laid-Open Patent Application No. 5-164583, a heating resistor which is driven by a constant voltage and a resistance thermometer bulb which is driven by a constant current are provided separately. The flow-rate measurement error is corrected as a result of multiplying flow rate data obtained from the heating resistor by fluid temperature data obtained from the resistance thermometer bulb. In a flow measuring device disclosed in Japanese Laid-Open Patent Application No. 2-120621, a resistance thermometer bulb of a pair of resistance thermometer bulbs is placed upstream of a heating resistor and another resistance thermometer bulb of the pair of resistance thermometer bulbs is placed downstream of the heating resistor. A balanced bridge circuit is formed including these resistance thermometer bulbs. Data corresponding to the temperature difference of the pair of resistance thermometer bulbs is detected from a balance change of the balanced bridge circuit. Data corresponding to the heating temperature of the heating resistor is detected from the resistance values of the pair of resistance thermometer bulbs. By dividing the temperature difference data by the heating temperature data, data corresponding to the fluid flow rate is obtained.

A second system is provided by a constant-current driving type system, in which a heating resistor is placed upstream of a flow path and another heating resistor is placed downstream of the flow path. Each of the heating resistors is heated by a constant current. The flow rate of the fluid is measured based on change of the resistance values of the heating resistors.

An example of such a flow measuring device in the prior art disclosed in Japanese Patent Publication No. 3-52028, for example, will now be described with reference to FIG. 2. A flow measuring device 21 which will now be described has a first heating resistor 22 and a second heating resistor 23, each of which has a large temperature coefficient of resistance. These heating resistors 22 and 23 are formed, for example, by printed wiring on a surface of a wiring substrate (not shown in the figure). To the first and second heating resistors 22 and 23, first and second operational amplifiers 24 and 25, which act as first and second measuring means, are connected, respectively. Thereby, feedback loops 26 and 27 are formed.

A potentiometer 29 is connected to a pair of input terminals 28. To the potentiometer 29, the feedback loops 26 and 27 are connected via resistors 30 and 31. Thereby, a portion from the input terminals 28 to the feedback loops 26 and 27 acts as first and second power supply means which supply variable-voltage and constant-current power to the first and second heating resistors 22 and 23. To the feedback loops 26 and 26, resistors 32, 33, 34 and 35 and a third operational amplifier 36 are connected. The third operational amplifier 36 and a ground terminal 37 are connected to a pair of output terminals 38, respectively.

The flow measuring device 21 can measure the flow rate of a fluid such as gas. In this case, the wiring substrate is appropriately placed in the flow path of the fluid. Thereby, the first and second heating resistors 22 and 23 are positioned in the stated order in the fluid flow direction. When power is supplied to the feedback loops 26 and 27 via the input terminals 28 in this state, variable-voltage and constant-current power is supplied to the first and second heating resistors which are then heated.

When the fluid flows in this state, a heat quantity moves from the upstream first heating resistor 22 to the downstream second heating resistor 23. Thereby, the resistance value of the first heating resistor 22 which has a large temperature coefficient of resistance decreases, and the resistance value of the second heating resistor 23 which also has a large temperature coefficient of resistance increases. However, the current values of the feedback loops 26 and 27 are maintained constant, respectively. Thereby, the output voltage of the feedback loop 26 decreases and the output voltage of the feedback loop 27 increases. This voltage difference is detected by the third operational amplifier 36. The thus-detected voltage difference corresponds to the flow-rate of the fluid, and thereby, the flow rate of the fluid can be detected from the output voltage of the output terminals 38.

Another example of a signal processing system of such a constant-current driving type flow measuring device is disclosed in Japanese Patent Publication No. 6-64080 and will now be described with reference to FIG. 3. FIG. 3 shows an electric arrangement of the signal processing system. In a flow measuring device 41, two temperature sensing resistors (heating resistors) 42 and 43 are positioned in a flow path of a fluid, and are connected in series. Further, a temperature sensing resistor 44 which is used for measuring the temperature around the sensor is provided. A current source 45 is connected to the temperature sensing resistor 44. Further, an operational amplifier 46 is provided. The plus input terminal of the operational amplifier 46 is connected to the connection point $P_{11}$ of the temperature sensing resistor 44 and current source 45. The output terminal of the operational amplifier 46 is connected to one end of the series-connected resistor series (one end of the temperature sensing resistor 42). An output terminal is drawn from the connection point $P_{12}$ of the temperature sensing resistor 42 and 43.

In the arrangement, the output voltage of the operational amplifier 46 is supplied to the resistor series, and the flow rate is measured by using a voltage change at the connection point $P_{12}$. The temperature sensing resistor 44 is used for measuring an ambient temperature and the voltage at the connection point $P_{11}$ changes according to change of the ambient temperature. Thus, influence of the ambient temperature, otherwise on the output voltage obtained at the connection point $P_{12}$, is eliminated.

Another example is disclosed in Japanese Laid-Open Patent Application No. 8-509066. FIG. 4 shows an electronic arrangement thereof. In the example of a flow measuring device 51, four resistors 53, 54, 55 and 56 form a balanced bridge circuit 52. The resistors 55 and 56 are ordinary resistors and have substantially equal characteristics. The resistors 53 and 54 are placed in a flow path 57 of a fluid, and are heating resistors which heat as a result of receiving a power supply and have substantially equal characteristics. In this case, the resistor 53 is placed on the upstream side. A current source 58 is connected to the connection point of the resistors 54 and 56 of the balanced bridge circuit 52. A transistor 62 is connected to the connection point of the resistors 53 and 55. Further, the connection point A of the resistors 53 and 54 is connected to the minus input terminal of an operational amplifier 59. The plus input terminal of the operational amplifier 59 is grounded. A feedback resistor 60 is connected between the minus input terminal and the output terminal of the operational amplifier 59. Thereby, the connection point A is artificially grounded through the operational amplifier 59. The connection point B of the resistors 55 and 56 is connected to the minus input terminal of an operational amplifier 61. The plus input terminal of the operational amplifier 61 is grounded, and the resistor 55 and transistor 62 are connected between the minus input terminal and the output terminal of the operational amplifier 61.

In this arrangement, due to flow of the fluid in the flow path 57, the balanced state is disrupted or broken. However, in order to maintain the artificial grounding of the connection point A, the current quantity flowing to the connection point A changes. The change of the current of the connection point A is obtained as the output of the operational amplifier 59. Therefore, the flow rate of the fluid can be measured by monitoring the output of the operational amplifier 59.

In such a type of a flow measuring device, as described above, when the temperature of a fluid (ambient temperature) changes, an error occurs in the flow measurement result. Therefore, it is necessary to correct the flow measurement result according to change of the fluid temperature. A temperature sensing type flow measuring device has a measuring capability for a low flow rate range. For the temperature sensing type flow measuring device, it is important to accurately measure the state in which the fluid does not flow and thus the flow rate is zero. However, the state corresponding to the zero flow rate changes according to change of the ambient temperature. In order to improve measurement accuracy, it is necessary to provide for flow measurement stability independent of temperature effects in consideration of the zero flow rate state.

However, in a flow measuring device in the system disclosed in the Japanese Laid-Open Patent Application No. 4-204119, although the flow rate and temperature of a fluid are measured, no function is provided for correcting the flow measurement result based on the temperature. In a flow measuring device in the system disclosed in Japanese Laid-Open Patent Application No. 5-164583, when a heating resistor is degraded over a period of time and thereby flow rate data changes, it is not possible to correct this error and obtain an accurate flow rate. With regard to this point, in a flow measuring device in the system disclosed in Japanese Laid-Open Patent Application No. 2-120621, even if a heating resistor is degraded due to time, flow measurement can be performed independent of the degradation. However, a resistance thermometer bulb should be heated by a heater, and, during a long period of use, an error occurs in measurement due to degradation of the resistance thermometer bulb. Further, as a result of power supply to a balanced bridge circuit, the resistance thermometer bulb heats, and the heating temperature changes according to the ambient temperature and flow rate. Accordingly, an error occurs in the measurement result based on the resistance value of the resistance thermometer bulb.

Consequently, in these flow measuring devices, each uses a balanced bridge circuit and thus measures flow rates. In this system, it is necessary that the balance of the balanced bridge circuit is maintained. However, the plurality of resistors forming the balanced bridge circuit are degraded over time, and, in particular for the heating resistor, the degree of the degradation varies with heating temperatures and environments of use. Therefore, it is difficult to maintain the balance of the balanced bridge for a long period. Further, when the balanced bridge is used, in comparison to the voltage applied to the balanced bridge, the voltage applied to each heating resistor should be low. Therefore, for example, a battery-driven flow measuring device is provided in which a voltage range is narrow, and only very low voltage is applied to each heating resistor. As a result, the selectable range of the resistance value of each heating resistor is narrow, or, it is necessary to select a resistance value which is difficult to implement in a manufacturing method.

In the flow measuring device 21 shown in FIG. 2 and disclosed in Japanese Patent Publication No. 3-52028, the first and second heating resistors 22 and 23, placed in the stated order in the fluid flowing direction, are driven by constant currents, and the flow rate is measured from the difference between the two end voltages. However, in this system, the measuring result includes not only the flow rate of the fluid but also the temperature of the fluid. Accordingly, it is not possible to accurately measure the fluid flow rate.

In fact, the resistance value "R" of a heating resistor is approximated so that "$R=R0(1+\alpha \cdot dT)$", where "R0" represents the resistance value of the heating resistor in a reference condition where the flow rate is "0" in a predetermined temperature; "dT" represents the difference between the reference temperature and the temperature of the heating resistor and "$\alpha$" represents the temperature coefficient of resistance of the heating resistor. Accordingly, the resistance value R of the heating resistor changes according to change of its temperature. Further, the temperature of the heating resistor in a fluid is obtained as a result of adding the heating temperature due to the Joule heat by a current flowing through the heating resistor and the temperature of the fluid, and subtracting, from the addition result, the temperature due to the heat quantity which moves to the fluid.

Thus, in the flow measuring device 21, the resistance value of each of the upstream and downstream first and second heating resistors 22 and 23 changes according to a change of the temperature of a fluid. Therefore, when constant currents flows therethrough, respectively, the Joule heats change and thereby heating temperatures change. The fluid removes part of the Joule heats from the heating resistors. When the Joule heats change, the heat quantities moving from the first and second heating resistors to the fluid change, respectively.

The first and second operational amplifiers 24 and 25 output voltages corresponding to the heating temperatures of the first and second heating resistors 22 and 23 which depend on the above-described effects. The third operational amplifier 36 outputs the difference of these voltages as the fluid flow measurement result. Accordingly, the output result includes the effect of the difference between the heat quantities which move from the first and second heating resistors to the fluid, respectively. Therefore, the output result changes according to change of the temperature of the fluid. Further, if the temperature coefficients of resistance and the resistance values at the reference temperature of the first and second heating resistors 22 and 23 are different, even if the fluid does not flow, the output result occurs when the temperature of the fluid changes. Accordingly, it is difficult to determine whether the fluid is flowing or not flowing (zero flow rate).

In the flow measuring device 31 shown in FIG. 3 and disclosed in Japanese Patent Publication No. 6-64080, it is necessary to adjust the resistance values of the temperature sensing resistors 42, 43 and 44 so that a specific condition is fulfilled for the purpose of removing ambient temperature effects for the temperature sensing resistors 42, 43 and 44. However, manufacturing of the temperature sensing resistors having the adjusted resistance values is difficult. In the flow measuring device 51 shown in FIG. 4 and disclosed in Japanese Laid-Open Patent Application No. 8-509066, the resistors 53 and 54 of the resistors forming the balanced bridge circuit 52 are likely to be degraded because of the heating of the resistors 53 and 54. Therefore, it is difficult to maintain the balance state of the balanced bridge circuit 52 for a long period. Accordingly, such a flow measuring device is not suitable for a gas meter.

SUMMARY OF THE INVENTION

An object of the present invention is to provide a flow measuring device and a flow measuring method in which a heat quantity which moves from an upstream heating resistor to a downstream heating resistor is directly or indirectly measured, and a flow rate signal is obtained. Thereby, the "0" flow rate state can be properly measured. Further, without being affected by an ambient temperature such as the fluid temperature, flow rates in a low flow rate range can be properly measured.

Another object of the present invention is to provide a flow measuring device of a simple arrangement which can properly measure flow rates without being affected by an ambient temperature.

Another object of the present invention is to provide a flow measuring device in which, in order to eliminate influence of an ambient temperature, measurement errors of heating temperatures of heating resistors can be reduced.

Another object of the present invention is to provide a flow measuring device which can properly measure flow rates without being affected by an ambient temperature, and without losing design flexibility in forming heating resistors.

Another object of the present invention is to provide a flow measuring device which can properly measure flow rates without being affected by an ambient temperature, by simply measuring equivalent factors in comparison to measurement of the heating temperatures of heating resistors.

Another object of the present invention is to provide a flow measuring device in which, when flow rates are measured based on the changes of the resistance values of two heating resistors which are exposed to a fluid, measurement accuracy can be improved as a result of reducing current values which affect the measurement result.

Another object of the present invention is to provide a flow measuring device which can be driven by a battery for a long period as a result of reducing the operating voltage.

A first aspect of the present invention comprises: a first heating resistor which is placed in a fluid flow path; a second heating resistor which is placed downstream of the first heating resistor; power supply means for supplying power to each of the first and second heating resistors; measuring means for measuring directly or indirectly a heating factor value of each of the first and second heating resistors; subtracting means for subtracting the heating factor value of the first heating resistor from the heating factor value of the second heating resistor; and calculating means for performing one of multiplication and division on the subtracting result and the heating factor value of one of the first and second heating resistors. Thus, the first and second heating resistors, each of which heat by power supplied by the power supply means, are arranged in the stated order in the fluid flow direction. Thereby, a heat quantity of the upstream-side first heating resistor is transferred to the downstream-side second heating resistor due to the fluid flow. The transferred heat quantity depends on the fluid flow rate and the heating temperatures of the heating resistors. Therefore, when the measuring means measures the heating factor values which directly or indirectly correspond to the heating temperatures of the first and second heating resistors, the subtracting means obtains the difference between the heating factor values, and the calculating means performs division or multiplication using this difference and the heating factor value of one heating resistor, the calculation result corresponds to the fluid flow rate. The term "flow rate" used here means a fluid volume which passes through a unit area during a unit period of time and is has the same meaning as that of the term "flow velocity". Further, the term "heating factor value" directly means a heating temperature of each heating resistor. However, heating factor values may be any other factor values which change based on change of a heat quantity which is transferred from the upstream-side first heating resistor to the downstream-side second heating resistor. Heating factor values may be indirect values based on the resistance value of the heating resistors, the voltage between the ends each heating resistor or the like. In the first aspect of the present invention, the fluid flow rate is calculated based on the heating factor values which correspond to the heat quantity transferred from the upstream heating resistor to the downstream heating resistor due to the fluid flow. Thereby, it is possible to accurately measure the fluid flow rate. Further, it is also possible to prevent degradation of flow rate measurement accuracy due to degradation of the heating resistors over time. Further, power is directly supplied from the power supply means to the heating resistors without forming a balanced bridge. As a result, power consumption of the heating resistors can be reduced and it is possible to easily form the heating resistors which heat to desired temperatures.

A second aspect of the present invention comprises: a first heating resistor which is placed in a fluid flow path; a second heating resistor which is placed downstream of the first heating resistor; power supply means for supplying power to each of the first and second heating resistors; temperature measuring means for measuring the heating temperature of each of the first and second heating resistors; subtracting means for subtracting the heating temperature of the first heating resistor from the heating temperature of the second heating resistor; and dividing means for dividing the subtraction result by the heating temperature of one of the first and second heating resistors. Thus, the first and second heating resistors, each of which are heated by power supplied by the power supply means, are arranged in the stated order in the fluid flow direction. Thereby, a heat quantity of the upstream-side first heating resistor is transferred to the downstream-side second heating resistor due to the fluid flow. The transferred heat quantity depends on the fluid flow rate and the heating temperatures of the heating resistors. Therefore, when the dividing means divides the difference between the heating temperatures of the first and second heating resistors by the heating temperature of one heating resistor, the calculation result is one which corresponds to the fluid flow rate. In the second aspect of the present invention, the fluid flow rate is calculated according to the heat quantity which is transferred from the upstream heating resistor to the downstream heating resistor due to the fluid flow. Thereby, it is possible to accurately measure the fluid flow rate. Further, it is also possible to prevent degradation of flow rate measurement accuracy due to degradation of the heating resistors over time. Further, power is directly supplied from the power supply means to the heating resistors without forming a balanced bridge. As a result, power consumption of the heating resistors can be reduced and it is possible to easily form the heating resistors which heat to desired temperatures.

In a third aspect of the present invention, in the flow measuring device of the second aspect of the present invention, the power supply means comprises a single driving power source and the driving power source and the first and second heating resistors are connected in series. Thereby, the single driving power source supplies power to the first and second heating resistors in turn, and thus the currents flowing through the first and second heating resistors are completely or substantially identical and the heat quantities generated by the first and second heating resistors are completely or substantially identical. Thereby, the heating temperature of each heating resistor is accurately detected, and thus, based on the heating temperatures, the fluid flow rate is accurately measured. Further, it is also possible to achieve miniaturization and a lightweight device. Further, it is also possible to improve the manufacturing efficiency.

In a fourth aspect of the present invention, in the flow measuring device of the second aspect of the present invention, the subtracting means multiplies by a constant at least one of the two heating temperatures of the first and second heating resistors before performing subtraction thereon. As a result, even if the temperature coefficients of resistance of the first and second heating resistors are different from one another due to a manufacturing error and/or degradation over time, by multiplying by the constant, the difference is corrected in the calculation. Thereby, it is possible to accurately measure the fluid flow rate independently of manufacturing error and/or degradation over time of the heating resistors.

A fifth aspect of the present invention, in the flow measuring device of the second aspect of the present invention, further comprises current detecting means for measuring a current flowing through each of the first and second heating resistors, wherein the temperature measuring means calculates the heating temperature of each of the first and second heating resistors based on the current measurement result. Thus, the heating temperatures of the first and second heating resistors are calculated based on the actually measured current, and, based on the heating temperatures, flow rates are calculated. As a result, it is possible to more accurately measure fluid flow rates.

A sixth aspect of the present invention, in the flow measuring device of the second aspect of the present invention, further comprises a third resistor which is placed in a position which is thermally insulated from the first and second heating resistors, power supply means for supplying power to said third resistor, the supplied power being so small that said third resistor does not heat, and measuring means which measures the temperature of the third resistor, wherein the temperature measuring means calculates the heating temperature of each of the first and second heating resistors based on the measured temperature of the third resistor. In this arrangement, although the power supply means supply power to the third resistor which is thermally insulated from the first and second heating resistors, the third resistor is not heated by the supplied power. As a result the temperature of the third resistor, which is electrically measured by the measuring means, is the same as the fluid temperature. Based on the measured temperature, the temperature measuring means calculates the heating temperature of each of the first and second heating resistor, and, based on the heating temperatures, the fluid flow rate is calculated. In this arrangement, because the heating temperatures of the heating resistors are calculated based on the actually measured temperature value, the fluid flow rate can be more accurately measured.

A seventh aspect of the present invention, in the flow measuring device of the second aspect of the present invention, further comprises resistance measuring means for measuring the resistance value of each of the first and second heating resistors and resistance storing means for storing each measured resistance value, wherein the temperature measuring means calculates the heating temperature of each of the first and second heating resistors based on the stored resistance values. Thus, the resistance values of the first and second heating resistors are measured by the resistance measuring means, and are stored by the storing means. Based on the stored resistance values, the temperate measuring means calculates the heating temperatures of the first and second heating resistors. Based on the heating temperatures, the fluid flow rate is calculated. In this arrangement, the heating temperatures of the heating temperatures of the first and second heating resistors are calculated based on the resistance values in the reference condition. Therefore, it is possible to measure the fluid flow rate more accurately.

An eighth aspect of the present invention comprises: a first heating resistor which is placed in a fluid flow path and has a large temperature coefficient of resistance; a second heating resistor which has the same or substantially identical temperature coefficient of resistance as that of the first heating resistors and the same or substantially identical resistance value as that of the first heating resistor in a reference condition and is placed downstream of the first heating resistor; first power supply means for supplying variable-voltage constant-current power to the first heating resistor; second power supply means for supplying the same or substantially identical power as that of the first power supply means to the second heating resistor; first measuring means for measuring the voltage between the ends of the first heating resistor; second measuring means for measuring the voltage between the ends of the second heating resistor; subtracting means for subtracting the measured voltage of the first measuring means from the measured voltage of the second measuring means; dividing means for dividing the subtraction result by the measured voltage of the first measuring means. Thus, the temperature coefficients of resistance of the first and second heating resistors are large and the same as one another. Further, the resistance values of the heating resistors in the reference condition are the same as one another. These first and second heating resistors are arranged in the stated order in the fluid flow direction, and the first and second power supply means supply identical or substantially identical and constant-current power to the first and second heating resistors, respectively. By the power supply, each of the first and second heating resistors is heated. As a result, when the fluid flows, a heat quantity of the upstream-side first heating resistor is transferred to the downstream-side second heating resistor. Because the constant-current power is supplied to each of the first and second heating resistors of the large temperature coefficients of resistance, the voltage between the ends of the first heating resistor and the voltage between the ends of the second heating resistor correspond to the generating heat quantities thereof, respectively. The voltage between the ends of each resistors is measured by the respective one of the first and second measuring means. The subtracting means subtracts the measured voltage of the first measuring means from the measured voltage of the second measuring means. The subtracting means divides the subtracting result by the measured voltage of the first measuring means. As a result, the calculation result linearly corresponds to the fluid flow rate, and, when the flow rate is "0", the calculation result is "0". Accordingly, based on the calculation result, the fluid flow rate can be calculated, and whether or not the fluid flows can be accurately determined.

A ninth aspect of the present invention comprises: a first heating resistor which is placed in a fluid flow path and has a large temperature coefficient of resistance; a second heating resistor which is placed downstream of the first heating resistor and has a large temperature coefficient of resistance; first power supply means for supplying variable-voltage constant-current power to the first heating resistor; second power supply means for supplying variable-voltage constant-current power to the second heating resistor; first measuring means for measuring the voltage between the ends of the first heating resistor; second measuring means for measuring the voltage between the ends of the second heating resistor; coefficient multiplying means for multiplying the measured voltage of the first measuring means by a predetermined correction coefficient; subtracting means for subtracting the multiplication result from the measured voltage of the second measuring means; and dividing means for dividing the subtraction result by the measured voltage of the first measuring means. Thus, the first and second heating resistors, each having the large temperature coefficient of resistance, are arranged in the stated order in the fluid flow direction. To the first and second heating resistors, the first and second power supply means supply constant-current power, respectively. Because each of the first and second heating resistors heats by the power supply, when the fluid flows, a heat quantity is transferred from the upstream-side first heating resistor to the downstream-side second heating resistor. Because the constant-current power is supplied to each of the heating resistors having the large temperature coefficient of resistance, the voltage between the ends of the first heating resistors and the voltage between the ends of the second heating resistor correspond to the generating heat quantities thereof, respectively. The voltage between ends of each resistor is measured by the respective one of the first and second measuring means. Then, the coefficient multiplying means multiplies the measured voltage of the first measuring means by a predetermined correction coefficient. The multiplication result is subtracted from the measured voltage of the second measuring means. The dividing means divides the subtraction result by the measured voltage of the first measuring means. Therefore, the calculation result linearly corresponds to the fluid flow rate, and, when the flow rate is "0", the calculation result is "0". The above-mentioned correction coefficient is a value which is not "0" and is set depending on various conditions. For example, the correction coefficient may be "1". It is preferable that the correction coefficient is such that, when the flow rate is "0", the output result of the dividing means is "0". In this arrangement, it is possible that, when the flow rate is "0", the calculation result is "0" even if conditions such as the resistance values, currents and so forth are different between the first and second heating resistors. Accordingly, based on the calculation result, whether or not the fluid is flowing can be accurately determined, and also, the fluid flow rate can be measured.

In a tenth aspect of the present invention, in the flow measuring device of the ninth aspect of the present invention, the value resulting from dividing the resistance value of the second heating resistor in a reference condition where the flow rate is "0" at a predetermined temperature by the resistance value of the first heating resistor in the reference condition is set as the correction coefficient to the coefficient multiplying means. Thus, the coefficient multiplying means multiplies the voltage between the ends of the first heating resistor by this correction coefficient, the multiplication result is subtracted from the voltage between the ends of the second heating resistor, and the subtraction result is divided by the voltage between the ends of the first heating resistor. Thereby, even if the resistance values of the first and second heating resistors in the reference condition are different from one another, when the fluid flow rate is "0", the calculation result is "0". Thus, whether or not the fluid is flowing can be accurately determined.

In an eleventh aspect of the present invention, in the flow measuring device of the ninth aspect of the present invention, the value resulting from dividing the measured voltage of the second measuring means in a reference condition where the flow rate is "0" at a predetermined temperature by the measured voltage of the first measuring means in the reference condition is set as the correction coefficient to the coefficient multiplying means. Thus, the coefficient multiplying means multiplies the voltage between the ends of the first heating resistor by this correction coefficient, the multiplication result is subtracted from the voltage between the ends of the second heating resistor, and the subtraction result is divided by the voltage between the ends of the first heating resistor. Thereby, even if the resistance values of the first and second heating resistors in the reference condition are different from one another, when the fluid flow rate is "0", the calculation result is "0". Thus, whether or not the fluid is flowing can be accurately determined.

In a twelfth aspect of the present invention, in the flow measuring device of the eighth or ninth aspect of the present invention, further comprises $m^{th}$ power means for raising the measured voltage of the first measuring means to the $m^{th}$ power, $n^{th}$ power means for raising the measured voltage of the second measuring means to the $n^{th}$ power and result correcting means for multiplying the division result of the dividing means by the raising to the $m^{th}$ power result of the $m^{th}$ power means and the raising to the $n^{th}$ power result of the $n^{th}$ power means. Thus, the $m^{th}$ power means raises the measured voltage of the first measuring means to the $m^{th}$ power, the $n^{th}$ power means raises the measured voltage of the second measuring means to the $n^{th}$ power, and the result correcting means multiplies the division result of the dividing means by the raising to the $m^{th}$ power result and the raising to the $n^{th}$ power result. Because the ratio of temperature correction of the first and second heating resistors is adjusted by "m, n", the influence of the fluid temperature on the fluid flow rate measurement result is reduced. The values "m, n" are values which are set depending on various conditions. It is preferable that "m, n" are such that, even when the fluid temperature changes, the fluid flow rate measurement result does not change. In this arrangement, the calculation result which is the fluid flow rate measurement result is corrected as a result of multiplying by the raising to the $m^{th}$ power result of the voltage between the ends of the first heating resistor and the raising to the $n^{th}$ power result of the voltage between the ends of the second heating resistor. Thus, the ratio of temperature correction of the first and second heating resistors is adjusted by "m, n", and the influence of the fluid temperature on the fluid flow rate measurement result is reduced. As a result, it is possible to accurately measure fluid flow rates independently of the fluid temperature.

In a thirteenth aspect of the present invention, in the flow measuring device of the twelfth aspect of the present invention, m=1, n=1. Therefore, substantially, raising to the $m^{th}$ power of the $m^{th}$ power means and raising to the $n^{th}$ power of the $n^{th}$ power means are not performed. The only necessary calculation is simple multiplication by the voltage between the ends of the first heating resistor and the voltage between the ends of the second heating resistor. Accordingly, calculation is simplified and thereby a hardware and/or a software structure can be simplified.

In a fourteenth aspect of the present invention, in the flow measuring device of the twelfth aspect of the present invention, m+n=1.5. Thereby, the temperature correction of the first and second heating resistors is very effectively performed. Accordingly, the fluid flow rate can be accurately measured independently of the fluid temperature.

A fifteenth aspect of the present invention comprises: a first heating resistor which is placed in a fluid flow path and has a large temperature coefficient of resistance; a second heating resistor which has the same or substantially the same temperature coefficient of resistance as that of the first heating resistors and the same or substantially the same resistance value as that of the first heating resistor in a reference condition and is placed downstream of the first heating resistor; first power supply means for supplying variable-voltage constant-current power to the first heating resistor; second power supply means for supplying the same or substantially the same power as that of the first power supply means to the second heating resistor; first measuring means for measuring the voltage between the ends of the first heating resistor; second measuring means for measuring the voltage between the ends of the second heating resistor; subtracting means for subtracting the measured voltage of the first measuring means from the measured voltage of the second measuring means; multiplying means for multiplying the subtraction result by the measured voltage of the second measuring means. Thus, the temperature coefficients of resistance of the first and second heating resistors are large and identical or substantially identical to one another. Further, the resistance values of the heating resistors in the reference condition are identical to one another. These first and second heating resistors are arranged in the stated order in the fluid flow direction, and, to the first and second heating resistors, the first and second power supply means supply mutually identical or substantially identical constant-current power, respectively. By the power supply, each of the first and second heating resistors is heated. As a result, when the fluid flows, a heat quantity of the upstream-side first heating resistor is transferred to the downstream-side second heating resistor. Because the constant-current power is supplied to each of the first and second heating resistors of the large temperature coefficient of resistance, the voltage between the ends of the first heating resistors and the voltage between the ends of second heating resistor correspond to the generating heat quantities thereof, respectively. The voltage between the ends of each resistor is measured by the respective one of the first and second measuring means. Then, the subtracting means subtracts the measured voltage of the first measuring means from the measured voltage of the second measuring means, the multiplying means multiplies the subtraction result by the measured voltage of the second measuring means. As a result, the calculation result linearly corresponds to the fluid flow rate, and, when the flow rate is "0", the calculation result is "0". Accordingly, based on the calculation result, the fluid flow rate can be calculated, and whether or not the fluid is flowing can be accurately determined.

A sixteenth aspect of the present invention comprises: a first heating resistor which is placed in a fluid flow path and has a large temperature coefficient of resistance; a second heating resistor which is placed downstream of the first heating resistor and has a large temperature coefficient of resistance; first power supply means for supplying variable-voltage constant-current power to the first heating resistor; second power supply means for supplying variable-voltage constant-current power to the second heating resistor; first measuring means for measuring the voltage between the ends of the first heating resistor; second measuring means for measuring the voltage between the ends of the second heating resistor; subtracting means for subtracting the measured voltage of the first measuring means from the measured voltage of the second measuring means; coefficient multiplying means for multiplying the measured voltage of the first measuring means by a predetermined correction coefficient; adding means for adding the multiplication result to the subtraction result of the subtracting means and multiplying means for multiplying the addition result by the measured voltage of the second measuring means. Thus, the first and second heating resistors, each having the large temperature coefficient of resistance, are arranged in the stated order in the fluid flow direction. To the first and second heating resistors, the first and second power supply means supply constant-current power, respectively. Because each of the first and second heating resistors is heated by the power supply, when the fluid flows, a heat quantity is transferred from the upstream-side first heating resistor to the downstream-side second heating resistor. Because the constant-current power is supplied to each of the heating resistors having the large temperature coefficient of resistance, the voltage between the ends of the first heating resistor and the voltage between the ends of the second heating resistor correspond to the generating heat quantities thereof, respectively. The voltage between the ends of each resistor is measured by the respective one of the first and second measuring means. Then, the subtracting means subtracts the measured voltage of the first measuring means from the measured voltage of the second measuring means, the coefficient multiplying means multiplies the measured voltage of the first measuring means by a predetermined correction coefficient, The adding means adds the multiplication result to the subtraction result of the subtracting means. The multiplying means multiplies the addition result by the measured voltage of the second measuring means. The calculation result linearly corresponds to the fluid flow rate, and, when the flow rate is "0", the calculation result is "0". The above-mentioned correction coefficient is a value set depending on various conditions. For example, the correction coefficient may be "0". It is preferable that the correction coefficient is such that, when the flow rate is "0", the output result of the multiplying means is "0". In this arrangement, it is possible that, when the flow rate is "0", the calculation result is "0" even if conditions such as the resistance values, currents and so forth are different between the first and second heating resistors. Accordingly, based on the calculation result, whether or not the fluid is flowing can be accurately determined, and also, the fluid flow rate can be measured.

In a seventeenth aspect of the present invention, in the flow measuring device of the sixteenth aspect of the present invention, the value resulting from subtracting from "1" the result of dividing the resistance value of the second heating resistor in a reference condition where the flow rate is "0" at a predetermined temperature by the resistance value of the first heating resistor in the reference condition is set as the correction coefficient to the coefficient multiplying means. Thus, the voltage between the ends of the first heating resistor is multiplied by this correction coefficient, the multiplication result is added to the difference between the voltage between the ends of the first heating resistor and the voltage between the ends of second heating resistor, the addition result is multiplied by the voltage between the ends of the second heating resistor. Thereby, even if the resistance values of the first and second heating resistors in the reference condition are different from one another, when the fluid flow rate is "0", the calculation result is "0". Thus, whether or not the fluid is flowing can be accurately determined.

In an eighteenth aspect of the present invention, in the flow measuring device of the sixteenth aspect of the present invention, the value resulting from subtracting from "1" the result of dividing the measured voltage of the second measuring means in a reference condition where the flow rate is "0" at a predetermined temperature by the measured voltage of the first measuring means in the reference condition is set as the correction coefficient to the coefficient multiplying means. Thus, the voltage between the ends of the first heating resistor is multiplied by this correction coefficient, the multiplication result is added to the difference between the voltage between of the ends of the first heating resistor and the voltage between the ends of the second heating resistor, the addition result is multiplied by the voltage between the ends of the second heating resistor. Thereby, even if the resistance values of the first and second heating resistors in the reference condition are different from one another, when the fluid flow rate is "0", the calculation result is "0". Thus, whether or not the fluid is flowing can be accurately determined.

In a nineteenth aspect of the present invention, in the flow measuring device of the sixteenth aspect of the present invention, the value resulting from inverting the plus/minus sign of the result of dividing the subtraction result of the subtracting means in a reference condition where the flow rate is "0" at a predetermined temperature by the measured voltage of the first measuring means in the reference condition is set as the correction coefficient to the coefficient multiplying means. Thus, the voltage between the ends of the first heating resistor is multiplied by this correction coefficient, the multiplication result is added to the difference between the voltage between the ends of the first heating resistor and the voltage between the ends of the second heating resistor, the addition result is multiplied by the voltage between the ends of the second heating resistor. The multiplication result is "0" when the fluid flow rate is "0". Errors in the subtracting means and the first measuring means are compensated and the measurement result is calculated. In this arrangement, it is possible that, even if the resistance values in the reference condition of the first and second heating resistors are different from one another, when the fluid flow rate is "0", the calculation result is "0". Especially, because the differential voltage of the first and second heating resistors can be used in calculation of the correction coefficient, whether or not the fluid is flowing can be more accurately determined.

A twentieth aspect of the present invention, in the flow measuring device of the fifteenth or sixteenth aspect of the present invention, further comprises $m^{th}$ power means for raising the measured voltage of the first measuring means to the $(m-1)^{th}$ power, $n^{th}$ power means for raising the measured voltage of the second measuring means to the $n^{th}$ power, wherein the multiplying means multiplies the subtracting result of the subtracting means or the addition result of the adding means by the raising to the $(m-1)^{th}$ power result of the $m^{th}$ power means and the raising to the $n^{th}$ power result of the $n^{th}$ power means. Thus, the $m^{th}$ power means raises the measured voltage of the first measuring means to the $(m-1)^{th}$ power, the nth power means raises the measured voltage of the second measuring means to the $n^{th}$ power, and the multiplying means multiplies the subtracting result of the subtracting means or the addition result of the adding means by the raising to the $(m-1)^{th}$ power result of the $m^{th}$ power means and the raising to the $n^{th}$ power result of the $n^{th}$ power means. The multiplication result is one which corresponds to the fluid flow rate, and the ratio of the temperature corrections of the first and second heating resistors are adjusted by "m, n". Thereby, the influence of the fluid temperature on the fluid flow rate measurement result can be reduced. As result, it is possible to accurately measure fluid flow rates independently of the fluid temperature.

A twenty-first aspect of the present invention, in the flow measuring device of any of the eighth to twentieth aspects of the present invention, further comprises an A-D converter for converting from analog values to digital values the measured voltage of at least one of the first measuring means and second measuring means and the subtraction result of the subtracting means, digital adding means for adding the digital-converted subtraction result and measured voltage, and replacement means for replacing the addition result for the measured voltage of the other of the first measuring means and the second measuring means. Thus, the measured voltage of at least one of the first measuring means and second measuring means and the subtraction result of the subtracting means is converted from analog values to digital values by the A-D converter, the digital-converted subtraction result and measured voltage is added by the adding means, and the addition result is replaced for the measured voltage of the other of the first measuring means and the second measuring means by the replacement means. Accordingly, in the flow measurement result calculation, both the voltage between the ends of the first heating resistor and the voltage between the ends of the second heating resistor are not used at once. Instead, one of the voltage between the ends of the first heating resistor and the voltage between the ends of the second heating resistor and the differential voltage are used. Thereby, mismatch in calculation due to using of the voltage between the ends of each resistor and the differential voltage can be prevented. Thus, matching in the calculation can be maintained and the fluid flow rate can be accurately measured.

In a twenty-second aspect of the present invention, in the flow measuring device of the twenty-first aspect of the present invention, the value resulting from dividing the value resulting from inverting the plus/minus sign of a value according to the subtraction result of the subtracting means in a reference condition where the flow rate is "0" at a predetermined temperature by the value resulting from subtracting value according to the subtraction result of the subtracting means in the reference condition from the value according to the measured voltage of the second measuring means in the reference condition is set as the correction coefficient to the coefficient multiplying means. Thus, it is possible that, in the correction coefficient calculation, only the voltage between the ends of the second heating resistor is used and the voltage between the ends of the first heating resistor is not used. Thereby, mismatch in calculation due to using of the voltage between the ends of each resistor and the differential voltage can be prevented. Thus, matching in the calculation can be maintained and the fluid flow rate can be accurately measured.

A twenty-third aspect of the present invention comprises the steps of: a) placing a first heating resistor and a second heating resistor, each having a large temperature coefficient of resistance, in the stated order in a fluid flow direction; b) causing each of the first and second heating resistors to be heated by variable-voltage constant-current power; c) measuring the voltage between the ends of each of the first and second heating resistors; d) multiplying the voltage between the ends of the first heating resistor by a predetermined correction coefficient; e) subtracting the multiplication result from the voltage between the ends of the second heating resistor; f) dividing the subtracting result by the voltage between the ends of the first heating resistor; and thus g) measuring a flow rate based on a heat quantity which moves from the first heating resistor to the second heating resistor due to fluid flow. The calculation result linearly corresponds to the fluid flow rate, and, when the flow rate is "0", the calculation result is "0". In this arrangement, the calculation result is "0" even if conditions such as the resistance values, currents and so forth are different between the first and second heating resistors. Accordingly, based on the calculation result, whether or not the fluid flows can be accurately determined, and also, because the calculation result linearly corresponds to the fluid flow rate, the fluid flow rate can be measured.

A twenty-forth aspect of the present invention comprises steps of: a) placing a first heating resistor and a second heating resistor, each having a large temperature coefficient of resistance, in the stated order in a fluid flow direction; b) causing each of the first and second heating resistors to be heated by variable-voltage constant-current power; c) measuring the voltage between the ends of each of the first and second heating resistors; e) subtracting the voltage between the ends of the first heating resistor from the voltage between the ends of the second heating resistor; f) multiplying the voltage between the ends of the first heating resistor by a predetermined correction coefficient; g) adding the multiplication result to the both-voltage subtraction result; h) multiplying the addition result by the voltage between the ends of the second heating resistor; and thus measuring a flow rate based on a heat quantity which moves from the first heating resistor to the second heating resistor due to fluid flow. The calculation result linearly corresponds to the fluid flow rate, and, when the flow rate is "0", the calculation result is "0". In this arrangement, the calculation result is "0" even if conditions such as the resistance values, currents and so forth are different between the first and second heating resistors. Accordingly, based on the calculation result, whether or not the fluid is flowing can be accurately determined, and also, because the calculation result linearly corresponds to the fluid flow rate, the fluid flow rate can be measured.

A twenty-fifth aspect of the present invention comprises: a first heating resistor which is placed in a fluid flow path; a second heating resistor which is placed downstream of the first heating resistor, the first heating resistor and second heating resistor being connected in series and the same or substantially the same current flows through the first heating resistor and flows through the second heating resistor; a constant-current source which causes a constant current to flow through a resistor series of the first and second heating resistors; a first voltage measuring means for measuring the terminal voltages of the first heating resistor; and a second voltage measuring means for measuring the terminal voltages of the second heating resistor. Thus, the first and second heating resistors are connected in series and the same or substantially the same current flows through the first heating resistor and flows through the second heating resistor. Thereby, it is possible to cause an equal current to flow through these heating resistors by using the single constant-current source. Thus, it is possible to reduce the influence of the current on the flow measurement.

A twenty-sixth aspect of the present invention, in the flow measuring device of the twenty fifth aspect of the present invention, further comprises subtracting means for calculating the difference between an output voltage of the first voltage measuring means and an output voltage of the second voltage measuring means. By adding the subtracting means, it is possible to improve the measurement accuracy of the difference between the resistance values of the first and second heating resistors.

A twenty-seventh aspect of the present invention comprises: a first heating resistor which is placed in a fluid flow path; a second heating resistor which is placed downstream of the first heating resistor, the first and second heating resistor being connected in series, the zero voltage point being provided in a connection path between the first and second heating resistor, and the same or substantially the same current flows through the first heating resistor and flows through the second heating resistor; and a constant-current source for causing a constant current to flow through a resistor series of the first and second heating resistors. Thus, the first and second heating resistors are connected in series and the same current as flows through the first heating resistor flows through the second heating resistor. Thereby, it is possible to cause an equal current to flow through these heating resistors by using the single constant-current source. Thus, it is possible to reduce the influence of the current on the flow measurement. Especially, by setting the voltage of one end of one heating resistor to be positive and the voltage of one end of the other heating resistor to be negative, it is possible to provide the zero voltage point in the connection path between these heating resistors. Thereby, it is possible to reduce the voltages which are necessary to be applied to these heating resistors for the flow measurement. As a result, it is possible to set the circuit operating voltages to be low. Such a feature is advantageous in a case where the device is driven by a battery.

A twenty-eighth aspect of the present invention, in the flow measuring device of the twenty seventh aspect of the present invention, further comprises adding means for adding the terminal voltage of a larger absolute value between the both-end terminal voltages of the first heating resistor and the terminal voltage of a larger absolute value between the both-end terminal voltages of the second heating resistor. By adding the adding means, it is possible to improve the measurement accuracy of the difference between the resistance values of the first and second heating resistors.

A twenty-ninth aspect of the present invention comprises: a first heating resistor having a large temperature coefficient of resistance and placed in a fluid flow path; a second heating resistor which has the same or substantially the same temperature coefficient of resistance as that of the first heating resistor and the same or substantially the same resistance value in a reference condition as that of the first heating resistor, the first heating resistor and second heating resistor being connected in series and the same or substantially the same current flows through the first heating resistor and flows through the second heating resistor; a constant-current source which causes a constant current to flow through a resistor series of the first and second heating resistors; and an operational amplifier for maintaining the connection point between the first and second heating resistors to be at a constant voltage by artificial grounding. Thus, the operational amplifier maintains the connection point between the first and second heating resistors to be at the constant voltage by artificial grounding. Thereby, it is not necessary that, in the twenty-seventh aspect, a resistor or the like is provided in the connection path for providing the zero voltage point therein. Further, it is possible to cause the circuit to operate with lower voltages.

A thirtieth aspect of the present invention, in the flow measuring device of the twenty-ninth aspect of the present invention, further comprises adding means for adding the voltages at the ends of the in-series-connected resistor series. By adding the adding means, it is possible to improve the measurement accuracy of the difference between the resistance values of the first and second heating resistors.

A thirty-first aspect of the present invention, in the flow measuring device of the thirtieth aspect of the present invention, further comprises impedance converting means to be inserted in an input stage of the adding means. Thereby, the influence of the adding means on the current flowing through the first and second heating resistors is reduced by the impedance converting means.

In a thirty-second aspect of the present invention, in the flow measuring device of the thirty-first aspect of the present invention, the adding means and the impedance converting means include operational amplifiers, respectively, and operational amplifiers which are formed on a common silicon wafer and sealed by a common package are used as the operational amplifiers of the adding means and the impedance converting means and the operational amplifier which maintains the connection point to be at the constant voltage by artificial grounding. Thereby, it is possible to make the offset voltages of all the operational amplifiers approximately equal. Thereby, it is possible to improve the measurement accuracy of the difference between the resistance values of the first and second heating resistors.

A thirty-third aspect of the present invention, in the flow measuring device of any of the twenty-fifth to thirty-second aspects, further comprises switching means for causing the current flowing through the resistor series to be zero at an arbitrary point of time. Thus, by causing the current to be zero when it is necessary to measure flow rates, power which is otherwise unnecessarily consumed can be eliminated. Particularly, when the device is driven by a battery, it is possible to elongate a period for which the measurement operation can be performed without replacing the battery.

Other objects and further features of the present invention will become more apparent from the following detailed description when read in conjunction with the accompanying drawings.

DETAILED DESCRIPTION OF THE PREFERRED EMBODIMENTS

Figure 1:
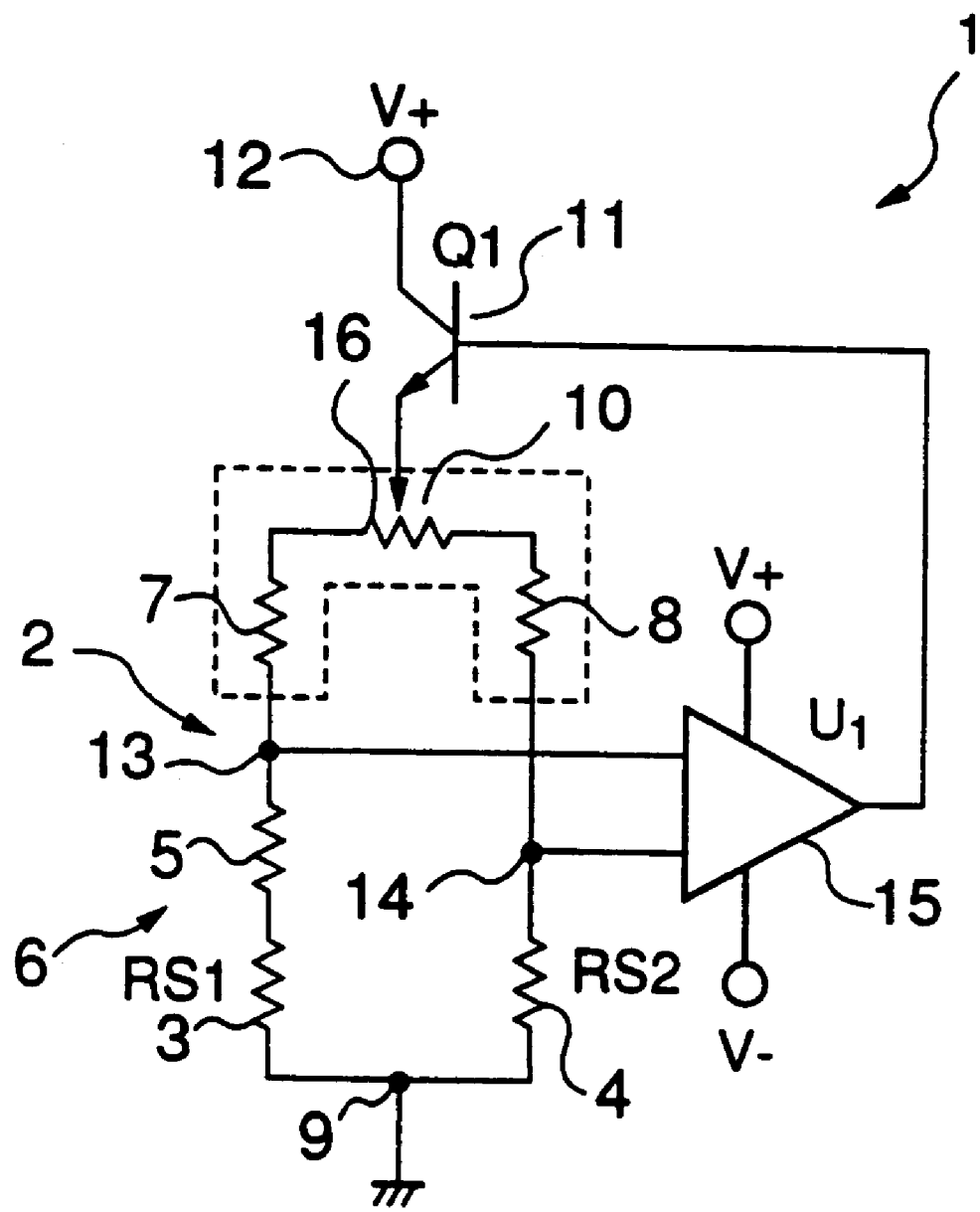
FIG. 1 shows a block diagram of a flow measuring device in a first example in the related art.
Figure 2:
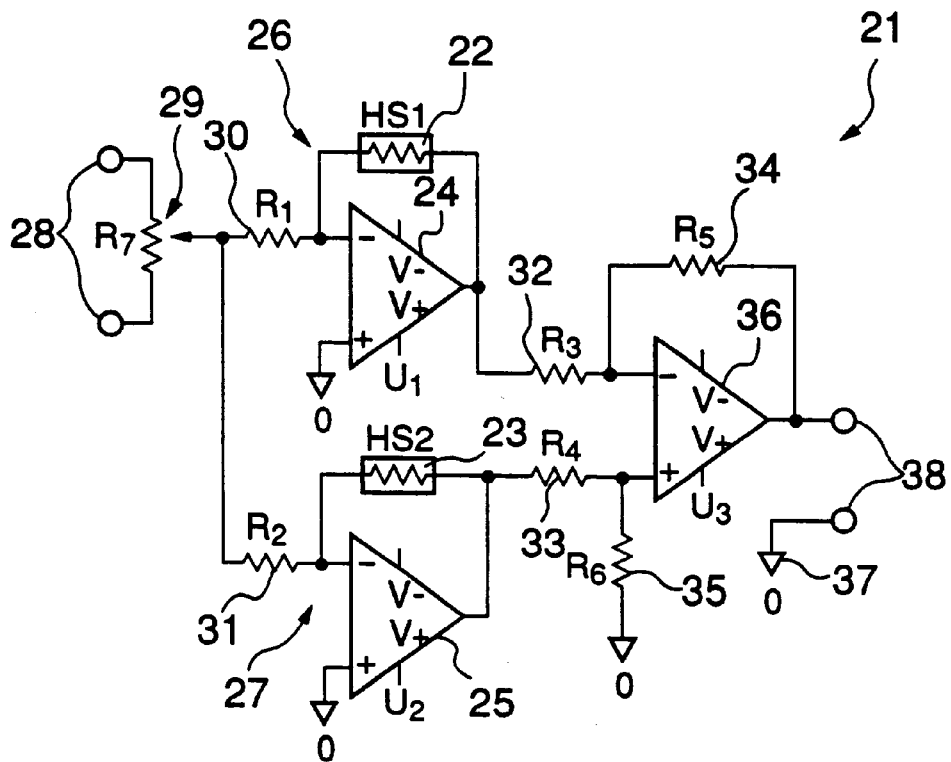
FIG. 2 shows a block diagram of a flow measuring device in a second example in the related art.
Figure 3:
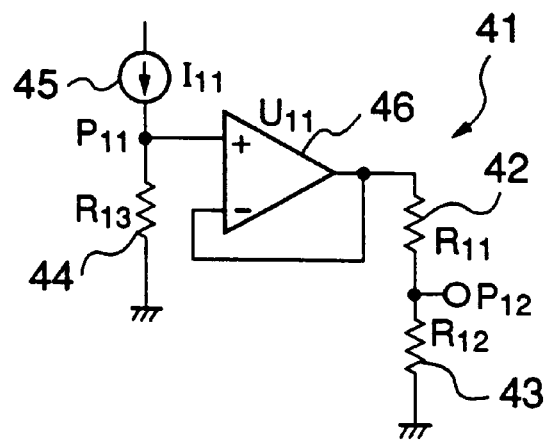
FIG. 3 shows a block diagram of a flow measuring device in a third example in the related art.
Figure 4:
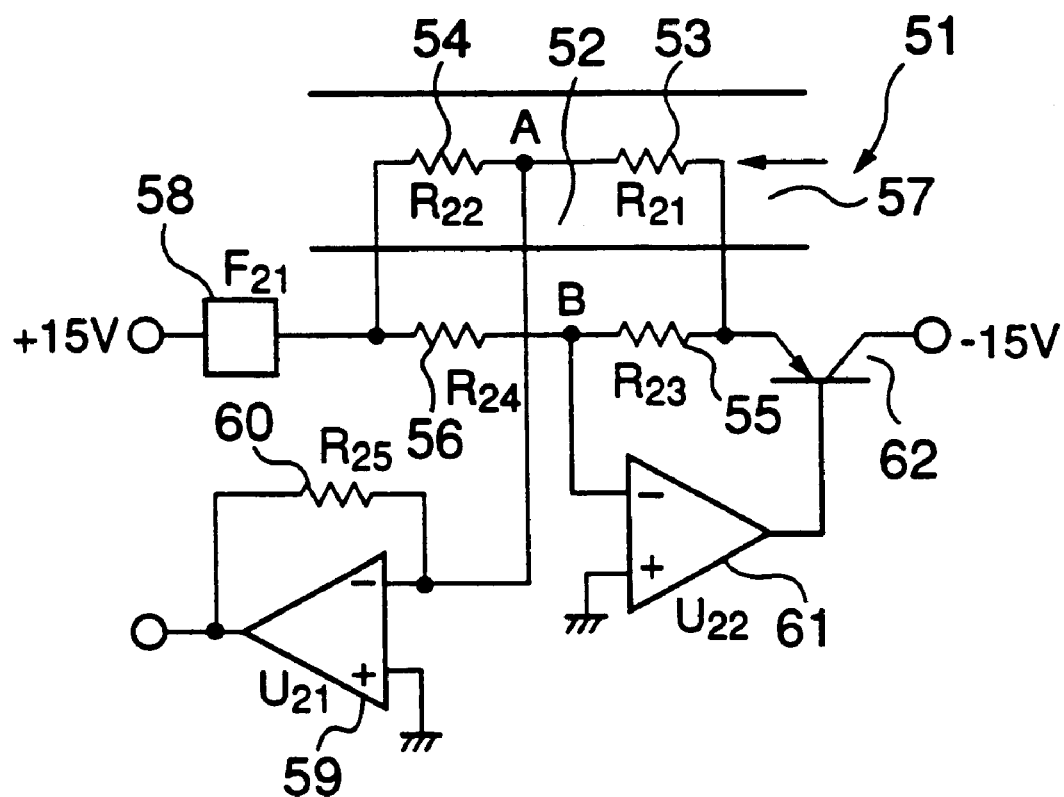
FIG. 4 shows a block diagram of a flow measuring device in a fourth example in the related art.
Figure 5:
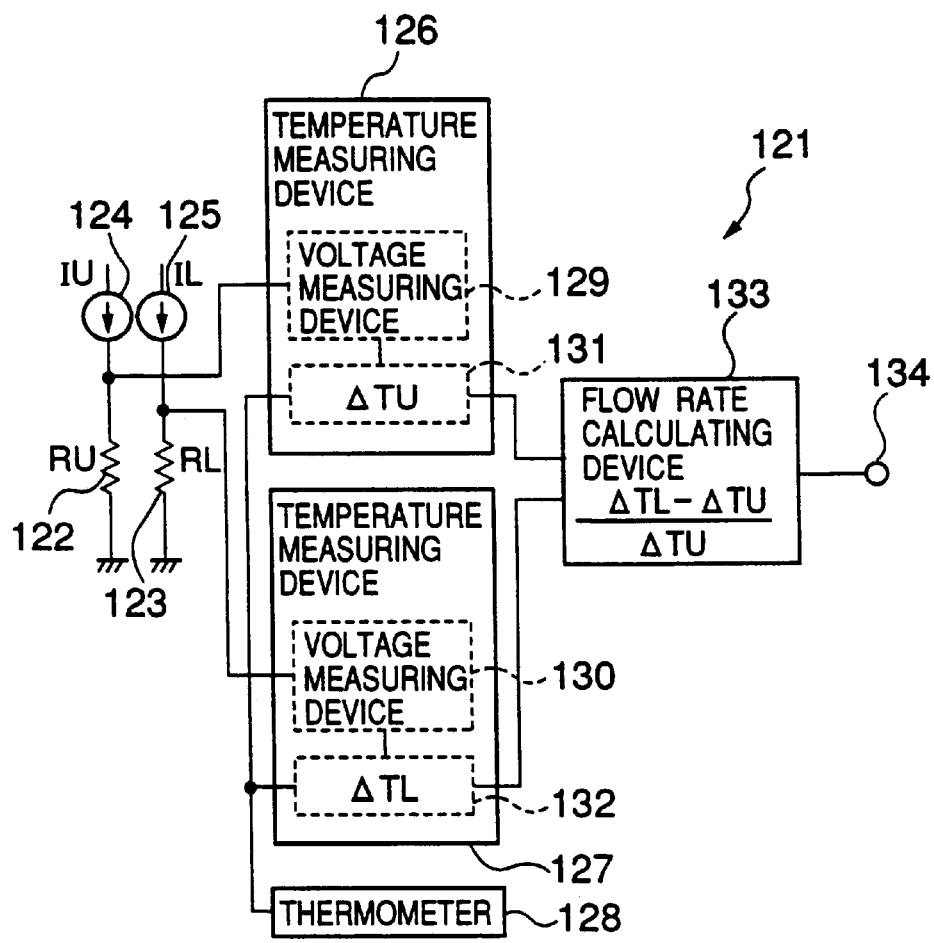
FIG. 5 shows a block diagram of a flow measuring device in a first embodiment of the present invention.
Figure 6:
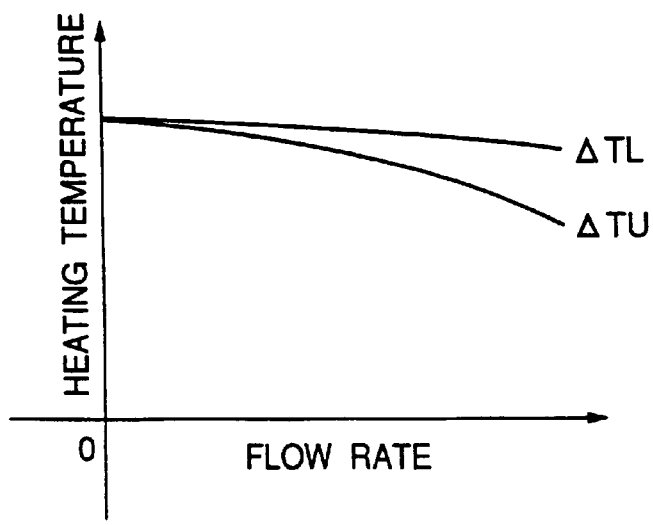
FIG. 6 shows a characteristic graph showing changes of heating temperatures of first and second heating resistors due to change of the flow rate.
Figure 7:
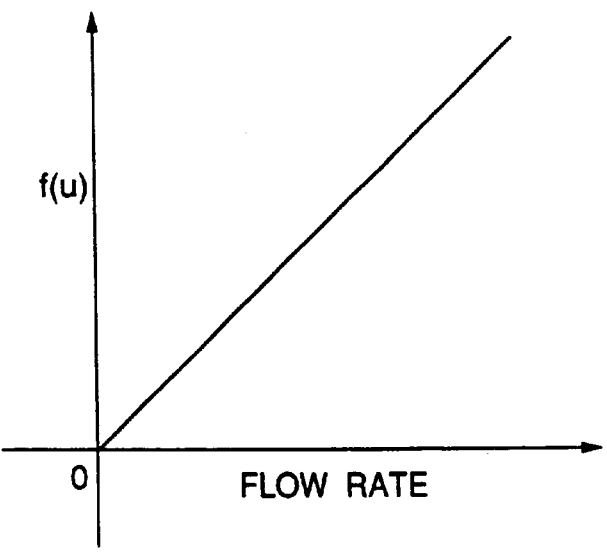
FIG. 7 shows a characteristic graph showing a relationship between a flow rate calculated result and an actual flow rate.

A first embodiment of the present invention will now be described with reference to FIGS. 5, 6 and 7. As shown in FIG. 5, a flow measuring device 121 in the first embodiment includes first and second heating resistors 122 and 123. To the heating resistors 122 and 123, first and second constant-current sources 124 and 125, acting as power supply means, are connected, respectively.

The first and second heating resistors are, for example, platinum films having a temperature coefficient of resistance on the order of 3000 ppm/° C. The first and second heating resistors 122 and 123 are arranged on a surface of a substrate (not shown in the figure) side by side, and arranged in an order in the fluid flow direction. Because the constant-current sources 124 and 125 supply constant-current power to the heating resistors 122 and 123, the heat resistors 122 and 123 heat by constant heat quantities of the Joule heats of the supplied power.

One end of each of the first and second heat resistors 122 and 123 is grounded. To the other end of each of the first and second heat resistors 122 and 123, the respective one of temperature measuring devices 126 and 127, acting as temperature measuring means, is connected, individually. To the temperature measuring devices 126 and 127, a thermometer 128 is connected and measures each of the heat temperatures of the heating resistors 122 and 123.

The temperature measuring devices 126 and 127 include voltage measuring devices 129 and 130 and temperature calculators 131 and 132, respectively. The voltage measuring devices 129 and 130 measure the terminal voltages of the first and second heat resistors 122 and 123, respectively. The thermometer 128 is placed in the flow path of a fluid and measures the temperature of the fluid regardless of flow of the fluid. The temperature coefficients of the heating resistors 122 and 123 are previously set. The temperature calculators 131 and 132 calculate the heating temperatures $\Delta TU$ and $\Delta TL$ of the heating resistors 122 and 123, respectively, based on the terminal voltages and the fluid temperature.

To the temperature measuring devices 126 and 127, a flow rate calculating device 133, acting as dividing means, is connected. The flow rate calculating device 133 divides the difference "$\Delta TU - \Delta TL$" of the two heating temperatures $\Delta TU$ and $\Delta TL$ by the heating temperature $\Delta TU$ of the upstream-side first heating resistor 122. The calculation result:

$$f(u) = (\Delta TU - \Delta TL)/\Delta TU$$

is output, as a signal, via an output terminal 134, as the measurement result of the fluid flow rate.

In the above-described arrangement, when the flow measuring device 121 is used for measuring the flow rate of the fluid, the first and second heating resistors 122 and 123 are arranged in the stated order in the flow direction, and also, the thermometer 128 is placed in a position inside the flow path in which the thermometer 128 is not affected by the flowing.

When the constant-current sources 124 and 125 supply constant currents to the first and second heating resistors 122 and 123, respectively, which are arranged in the flow path in this order, the heating resistors 122 and 123 heat by constant heat quantities according to the constant currents. By the heating, the resistance values of the first and second heating resistors 122 and 123 change according to the temperature coefficients. The voltage measuring devices 129 and 130 measure the terminal voltages which change according to the changes of the resistance values, respectively. The temperature calculators 131 and 132 calculate the heating temperature $\Delta TU$ and $\Delta TL$ of the heating resistors 122 and 123, respectively based on the values of these terminal voltages and the temperature of the fluid measured by the thermometer 128.

Because each of the first and second heating resistors 122 and 123 is driven by the constant current I, when the terminal voltage V is measured, the resistance R is calculated as "R=V/I". Assuming that the resistance value of each of the heating resistors 122 and 123 at a reference temperature T0 is R0 and the temperature coefficient thereof is $\alpha$, the resistance value R of each of the heating resistors 122 and 123 when each of the heating resistors 122 and 123 heat from the reference temperature T0 by a heating temperature $\Delta T$ is obtained as follows: "R=R0(1+$\alpha\Delta T$)". Accordingly, when the resistance value R0 at the reference temperature T0 and the temperature coefficient $\alpha$ of each of the heating resistors 122 and 123 is set, the heating temperature $\Delta T$ is calculated from the resistance R when each of the heating resistors 122 and 123 is heated.

The first and second heating resistors 122 and 123 are cooled according to the flow rate of the fluid. Because the heating resistors 122 and 123 are arranged in the fluid flow direction in this order, a heat quantity removed from the upstream-side first heating resistor 122 is transferred, through the fluid, to the downstream-side second heating resistor 123. Thereby, as shown in FIG. 6, a temperature difference occurs between the heating temperatures $\Delta TU$ and $\Delta TL$ of the first and second heating resistors 122 and 123, according to the fluid flow rate.

The heat quantity transferred from the upstream first heating resistor 122 to the downstream heating resistor 123 depends on the fluid flow rate and the heating temperatures $\Delta TU$ and $\Delta TL$. Therefore, as a result of the difference $\Delta TL-\Delta TU$ between the two heating temperatures $\Delta TU$ and $\Delta TL$ being divided by the heating temperature $\Delta TU$ of the upstream first heating resistor 122 by the flow rate calculating device 133, as shown in FIG. 7, the calculation result f(u) accurately corresponds to the fluid flow rate.

When the fluid flow direction is reversed, the plus/minus of the flow rate f(u) measured as described above is inverted. Thereby, the flow measuring device 121 in the embodiment not only measures the fluid flow rate but also determines the flow direction. The flow measuring device 121 can accurately measure the reversed fluid flow rate.

Thus, in the flow measuring device 121 in the embodiment, the flow measurement value is calculated based on the heat quantity transferred by the fluid flow. Thereby, when the resistance values of the heating resistors 122 and 123 change due to elapse of time or the fluid temperature changes, the fluid flow rate can be accurately measured. Further, power is directly supplied to the heating resistors 122 and 123 without forming a balanced bridge.

Thereby, power consumption is low, and, if a battery is used as the power source, a long period of operation is possible. Further, because it is easy to cause the heating resistors 122 and 123 to heat to a desired temperature, flexibility in forming the heating resistors 122 and 123 is good.

The present invention is not limited to the embodiment and variations are possible. For example, although it is assumed that the temperature measuring devices 126 and 127 and flow rate calculating device 133 are formed by special analog circuits in the embodiment, it is also possible that these devices are formed by a microcomputer, which has A-D (analog-to-digital) converters at the input terminals thereof. Further, in the embodiment, the calculation result f(u) of dividing the difference of the heating temperatures $\Delta TL$ and $\Delta TU$ of the heating resistors 122 and 123 by the heating temperature $\Delta TU$ is calculated actually as "($\Delta TL-\Delta TU$)/$\Delta TU$". However, it is also possible that the calculation result is calculated as "$\Delta TL/\Delta TU-1$".

Figure 8:
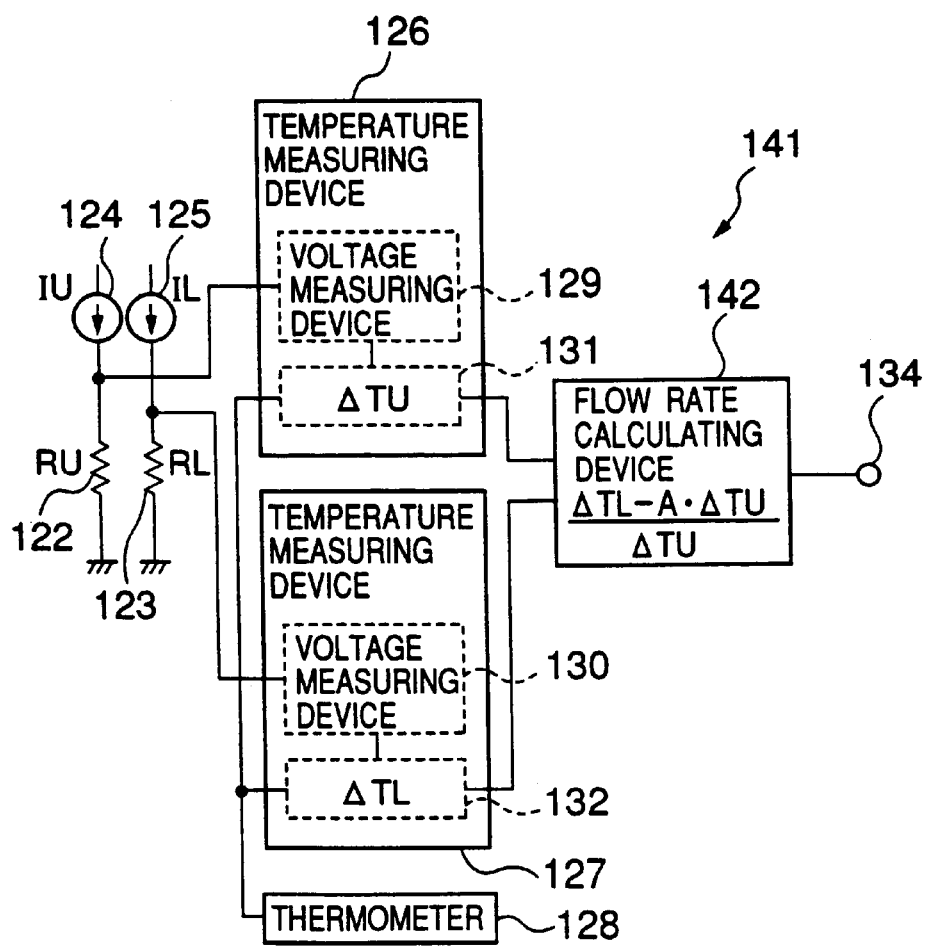
FIG. 8 shows a block diagram of a flow measuring device in one variant embodiment.

Further, as shown in FIG. 8, it is possible that a flow rate calculating device 142, acting as operating means (dividing means), multiplies at least one of the heating temperatures $\Delta TU$ and $\Delta TL$ by a constant A. Thereby, in a flow measuring device 141 including the flow rate calculating device 142, even if the heating temperatures of the first and second heating resistors 122 and 123 in the condition where the fluid does not move are different from one another due to a manufacturing error or the like, it is possible to perform correction by multiplication of the constant A so that $\Delta TL-A\cdot\Delta TU=0$ in this condition. Thus, it is possible to perform accurate flow measurement.

In a case where the flow measuring device 142 is formed by a microcomputer, the constant A is set as a parameter in a memory. Thereby, it is easy to correct a slight manufacturing error in the heating resistors 122 and 123. The calculation "($\Delta TL-A\cdot\Delta TU$)/$\Delta TU$" can be performed as "$\Delta TL/\Delta TU-A$".

Figure 9:
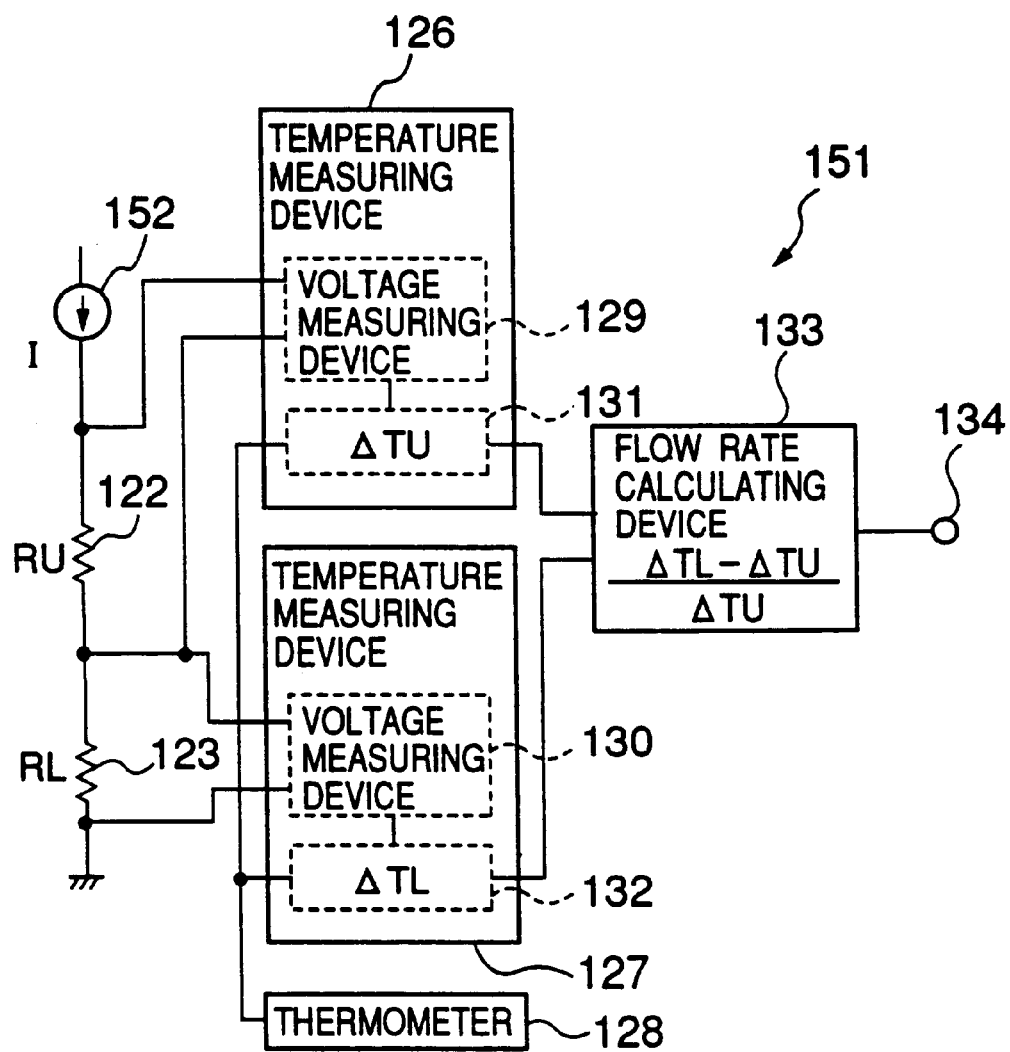
FIG. 9 shows a block diagram of a flow measuring device in a second embodiment of the present invention.

A second embodiment of the present invention will now be described with reference to FIG. 9. With regard to a flow measuring device 151 in the embodiment, the same reference numerals are given to parts/components identical to those in the above-described flow measuring device 121, and the descriptions there of are omitted. (A similar manner will be used for subsequent embodiments.)

In the flow measuring device 151 in the embodiment, similar to the above-described flow measuring device 121, the first and second heating resistors 122 and 123 are provided. However, these heating resistors 122 and 123 are connected in series, and also, a single constant-current source 152 as a driving power source which is power supply means is connected in series. Therefore, the temperature measuring device 126 is connected to both ends of the first heating resistor 122 and the temperature measuring device 127 is connected to both ends of the second heating resistor 123.

Similar to the above-described flow measuring device 121, the flow measuring device 151 in the embodiment measures fluid flow rates. In this case, in the flow measuring device 151, the single constant-current source 152 supplies a constant current to both the first and second heating resistors 122 and 123. Thereby, substantially equal currents are supplied to the first and second heating resistors 122 and 123, and thereby, it is possible to perform accurate flow measurement. Further, the arrangement of the device is simple, and it is possible to achieve low power consumption, miniaturization and weight reduction, and manufacturing efficiency improvement.

Figure 10:
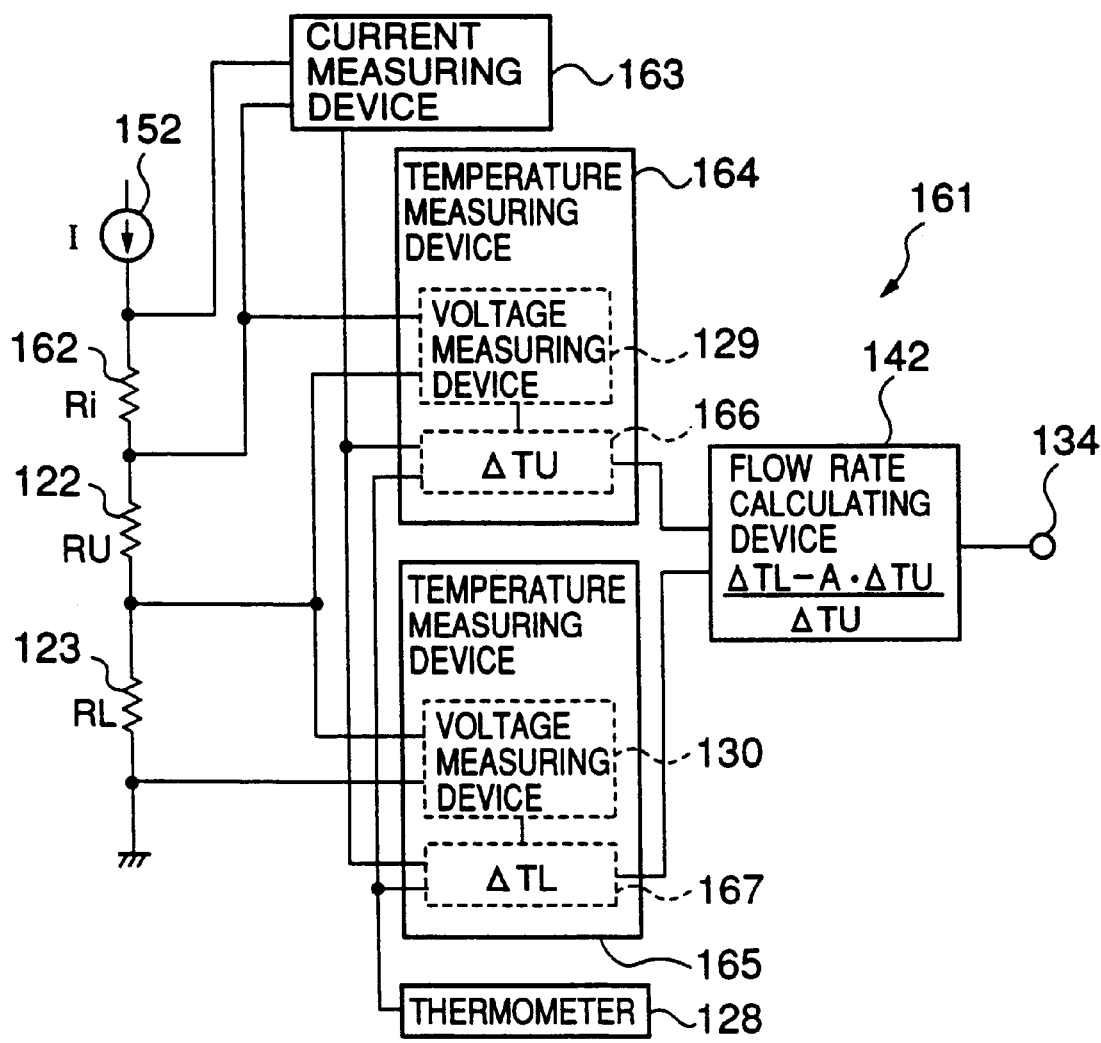
FIG. 10 shows a block diagram of a flow measuring device in a third embodiment of the present invention.

A third embodiment of the present invention will now be described with reference to FIG. 10. In a flow measuring device 161 in the third embodiment, the first and second heating resistors 122 and 123 and a single constant-current source 152 are connected in series, and also, an auxiliary resistor 162 is connected between the constant-current source 152 and first heating resistor 122 in series. To both ends of the auxiliary resistor 162, a current measuring device 163, acting as a current detecting means, is connected, and the current measuring device 163 is connected to temperature calculators 166 and 167 of first and second temperature measuring devices 164 and 165 acting as temperature measuring means.

Different from the first and second heating resistors 122 and 123, the auxiliary resistor 162 has an extremely low temperature coefficient, and does not heat by power supplied by the constant-current source 152. The current measuring device 163 measures the voltage between both ends of the auxiliary resistor 162, and calculates the current value using the measured voltage and the resistance value of the auxiliary resistor 162. The temperature calculators 166 and 167 of the temperature measuring devices 164 and 165 calculate the resistance values of the first and second heating resistors 122 and 123, respectively, using the current measuring result of the auxiliary resistor 162 and the terminal voltages of the first and second heating resistors 122 and 123. Based on the calculated resistance values, the temperature calculators 166 and 167 calculate the heating temperatures of the heating resistors 122 and 123, respectively.

When the flow measuring device 161 in the embodiment having the above-described arrangement measures fluid flow rates, the constant current is supplied by the constant-current source 162 to the first and second heating resistors 122 and 123 which are arranged in a flow path. This constant current is also supplied to the auxiliary resistor 162. The current flowing through the auxiliary resistor 162 is measured by the current measuring device 163 and the measured current value is output to the temperature calculators 166 and 167 of the temperature measuring devices 164 and 165. These temperature calculators 166 and 167 use the input current value of the auxiliary resistor 162 and the terminal voltages of the first and second heating resistors, and thus calculate the resistance values of the heating resistors 122 and 123, respectively. The calculators 166 and 167 use these resistance values, the temperature coefficients of the heating resistors 122 and 123 and the fluid temperature measured by the thermometer 128, and thus calculate the heating temperatures $\Delta TU$ and $\Delta TL$ of the heating resistors 122 and 123, respectively. The flow rate calculating device 142 divides the difference between the two heating temperature $\Delta TL$ and $\Delta TU$ "$\Delta TL - A \cdot \Delta TU$" by the heating temperature $\Delta TU$ of the upstream-side first heating resistor 122. The flow rate calculating device 142 outputs the calculation result f(u) as a signal which accurately corresponds to the fluid flow rate.

In the flow measuring device 161, the resistance values of the heating resistors 122 and 123 are calculated based on the current value of the auxiliary resistor which is connected with the heating resistors 122 and 123 in series. Thereby, it is possible to perform flow measurement more accurately. Because the currents of the first and second heating resistors 122 and 123 are thus actually measured, it is not necessary that the driving power source is the constant-current source 152. Instead, a voltage source can be used as the driving power source.

Figure 11:
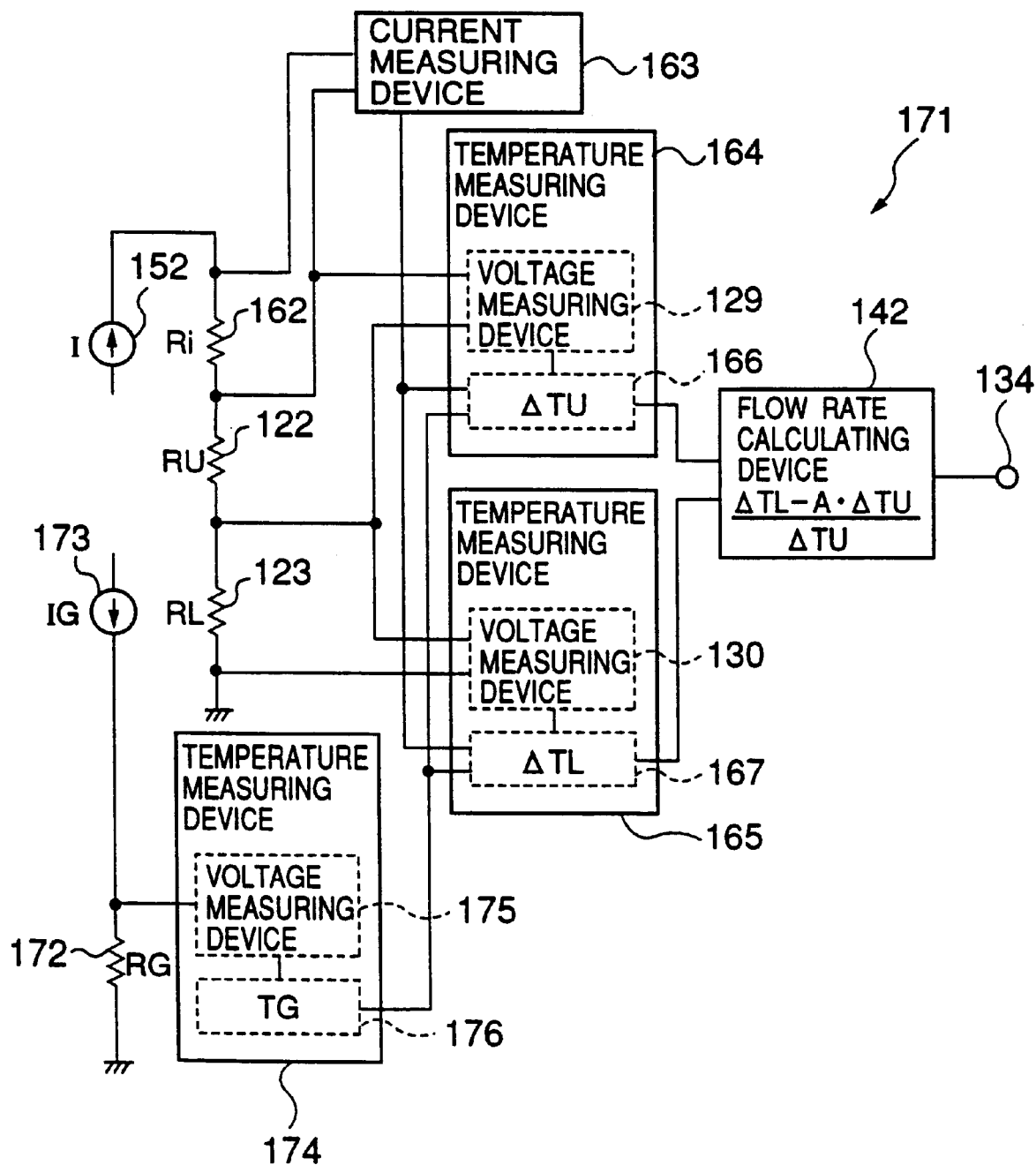
FIG. 11 shows a block diagram of a flow measuring device in a fourth embodiment of the present invention.

A fourth embodiment of the present invention will now be described with reference to FIG. 11. In a flow measuring device 171 in the fourth embodiment, a third resistor 172 is provided in addition to the first and second heating resistors 122 and 123 and auxiliary resistor 162. To the third resistor 172, a special constant-current source 173, acting as second power supply means, is connected. Further, to the resistor 172, a voltage measuring device 175 of a special temperature measuring device 174, acting as third measuring means, is connected. A temperature calculator 176 of the temperature measuring device 174 is connected to the temperature calculators 166 and 167 of the temperature measuring devices 164 and 165 of the heating resistors 122 and 123. Thereby, the thermometer 128 which is connected to these temperature calculators 166 and 167 is not provided.

The structure of the third resistor 172 is identical to the structure of each of the heating resistors 122 and 123. However, the constant-current source 173 supplies a constant current to the third resistor 172 in an amount such that the third resistor does not heat. The third resistor 172 is, for example, placed upstream of the heating resistors 122 and 123 in the fluid flow direction. Thus, the third resistor 172 is placed in a position which is thermally insulated from the heating resistors 122 and 123.

The temperature measuring device 174 measures the heating temperature of the third resistor 172. The temperature calculators 166 and 167 of the temperature measuring devices 164 and 165 calculate the heating temperatures of the heating resistors 122 and 123, respectively, based on the heating temperature of the third resistor 172. Because the third resistor 172 does not heat although power is supplied thereto, the temperature of the third resistor 172 is equal to the temperature of the fluid. Based on the temperature of the third resistor 172, the heating temperatures of the heating resistors 122 and 123 are calculated.

In the above-described arrangement, when the flow measuring device 171 measures flow rates of the fluid, although the third resistor 172 is placed in the flow path of the fluid together with the first and second heating resistors 122 and 123, the third resistor 172 is placed in the position which is thermally insulated from the heating resistors 122 and 123 as mentioned above. In this arrangement, each of the heating resistors 122 and 123 heats by the constant current supplied by the constant-current source 152. However, the third resistor 172 does not heat by the constant current supplied by the constant-current source 173.

The temperature of the third resistor 172 is calculated using the terminal voltage and the temperature coefficient of the third resistor 172 and the current value of the constant-current source 173. Based on the calculated temperature, the temperature measuring devices 164 and 165 calculate the heating temperatures $\Delta TU$ and $\Delta TL$ of the heating resistors 122 and 123, respectively. The temperature of the third resistor 172 which does not heat is equal to the temperature of the fluid as mentioned above. Therefore, based on the temperature of the third resistor 172, the heating temperatures $\Delta TU$ and $\Delta TL$ of the heating resistors 122 and 123 are accurately calculated. Using the calculated heating temperatures, the flow rate calculating device 142 accurately calculates the fluid flow rate.

In the flow measuring device 171 in the embodiment, the temperature of the fluid is actually measured using the third resistor 172. Based on the measured temperature, flow rates of the fluid can be accurately measured. Further, it is not necessary to provide the special thermometer 128.

Figure 12:
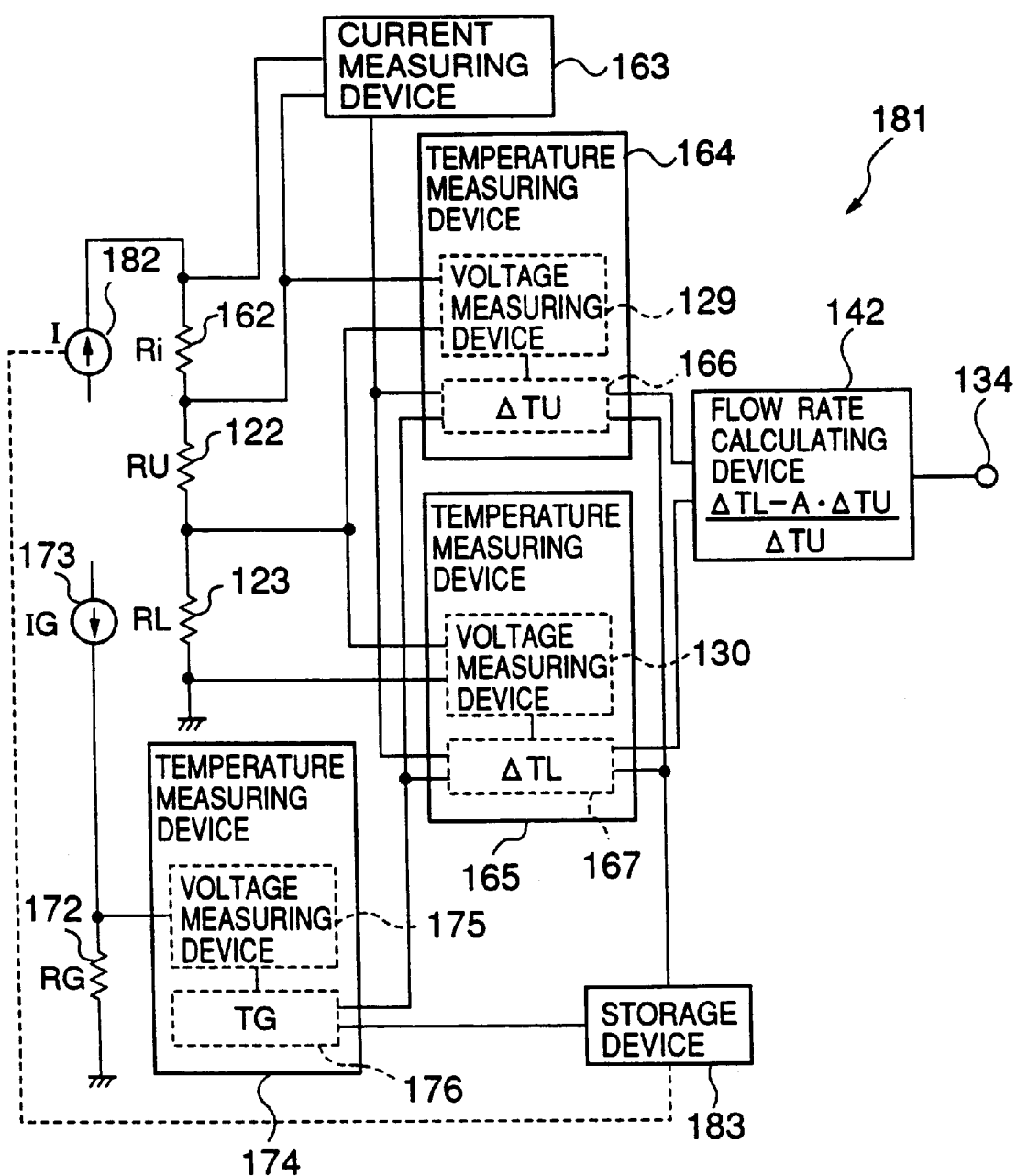
FIG. 12 shows a block diagram of a flow measuring device in a fifth embodiment of the present invention.

With reference to FIG. 12, a fifth embodiment of the present invention will now be described. In a flow measuring device 181 in the fifth embodiment, a constant-current source 182 which is connected, as a driving power source acting as power supply means, to the first and second heating resistors 122 and 123 selectively outputs a large current which causes the first and second heating resistors 122 and 123 to heat and a small current which does not cause the first and second heating resistors 122 and 123 to heat. The temperature measuring devices 164 and 165 act as resistance measuring means for measuring the resistance values of the first and second heating resistors 122 and 123. To the temperature measuring devices 164 and 165, a storage device 183 acting as resistance storing means is connected. To the storage device 183, the constant-current source 182 is connected. In timing when the constant-current source 182 outputs the small current, resistance values R0 of the first and second heating resistors 122 and 123 are supplied to the storage device 183 and the storage device 183 stores therein the supplied resistance values R0. The resistance values R0 are the resistance values of the heating resistors 122 and 123 in the reference condition. The resistance values R0 are obtained from converting the measured resistance values of the heating resistors 122 and 123 into the resistance values R0, respectively, using the temperature output (indicating the fluid temperature) of the temperature calculator 176. The resistance values R0 are output from the storage device 183 to the temperature measuring devices 164 and 165, respectively, in timing when the constant-current source 182 outputs the large current. The temperature measuring devices 164 and 165 calculate the heating temperatures $\Delta TU$ and $\Delta TL$ of the first and second heating resistors 122 and 123 based on the input resistance values R0 in the reference condition.

In the above-described arrangement, in the flow measuring device 181, for example, at an initial setting time before starting flow measurement, the constant-current source 182 outputs the small current to the first and second heating resistors 122 and 123. Then, the resistance values of the first and second heating resistors 122 and 123 when these heating resistors do not heat are obtained, and, also using the fluid temperature supplied by the temperature measuring device 174, the resistance values R0 in the reference condition are calculated and stored in the storage device 183.

When such initial setting has been completed and then flow measurement will be started, the constant-current source 182 outputs the large current to the first and second heating resistors 122 and 123. Then, the temperature measuring devices 164 and 165 measure the heating temperatures $\Delta TU$ and $\Delta TL$ of the first and second heating resistors 122 and 123, respectively. At this time, the storage device 183 supplies the resistance values R0 at the reference condition to the temperature measuring devices 164 and 165, respectively. Based on the supplied resistance values R0, the heating temperatures $\Delta TU$ and $\Delta TL$ of the first and second heating resistors 122 and 123 are accurately calculated. The flow rate calculating device 142 uses the calculated heating temperatures and thus accurately calculates the fluid flow rate.

In the flow measuring device 181, the resistance values of the first and second heating resistors 122 and 123 when these heating resistors do not heat are actually measured, the fluid temperature is actually measured through the third resistor 172 and the temperature measuring device 174, and thereby, the resistance values R0 of the first and second heating resistors 122 and 123 in the reference condition are calculated. Based on the calculated resistance values R0, flow rates of the fluid can be accurately measured. Therefore, when the first and second heating resistors 122 and 123 are degraded over time, for example, the flow measurement accuracy is not degraded.

Thus, based on the resistance values R0 of the first and second heating resistors in the reference condition, the heating temperatures $\Delta TU$ and $\Delta TL$ are calculated. It is also possible to correct the expression $(\Delta TL - A \cdot \Delta TU)/\Delta TU$ based on the resistance values R0 of the first and second heating resistors 122 and 123 in the reference condition. For example, when changes of the resistance values R0 due to elapsed time are different between the first and second heating resistors 122 and 123, it is preferable that the constant A of the expression is set such that the difference is corrected in the calculation.

Figure 13:
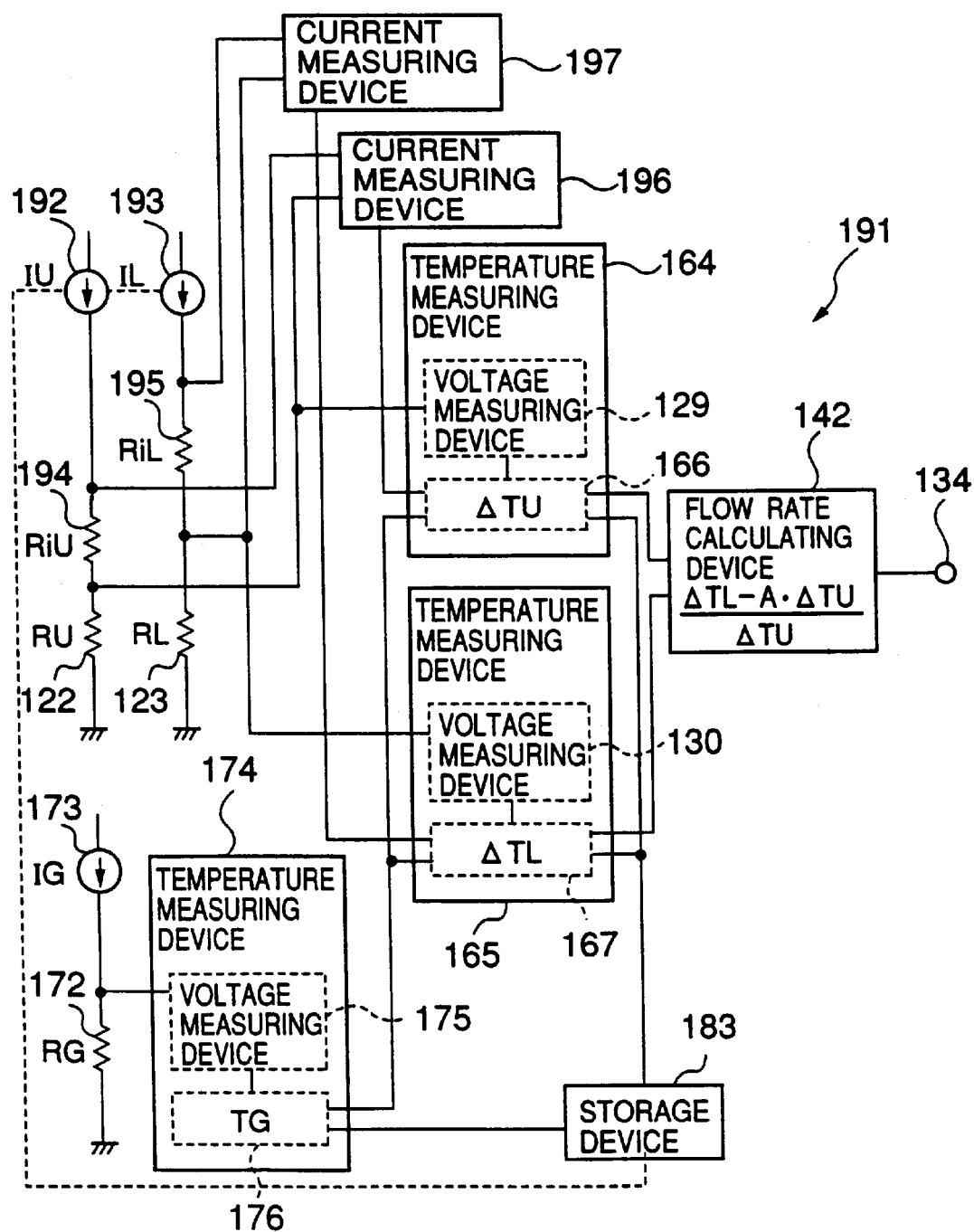
FIG. 13 shows a block diagram of a flow measuring device in a first variant embodiment.

Further, in the flow measuring device 181, the single constant-current source 182 commonly supplies power to the first and second heating resistors 122 and 123. However, as shown in FIG. 13, in a flow measuring device 191, it is possible that first and second constant-current sources 192 and 193, acting as power supply means, are connected to the first and second heating resistors 122 and 123, respectively, and a setting is made such that power supplied to the second heating resistor 123 is lower than power supplied to the first heating resistor 122. In this flow measuring device 191, a pair of auxiliary resistors 194 and 195 are provided, individually, between the constant-current sources 192 and 193 and the first and second heating resistors 122 and 123. First and second current measuring devices 196 and 197 are connected to the auxiliary resistors 194 and 195, respectively.

Because a heat quantity is transferred from the upstream-side first heating resistor 122 to the downstream-side second heating resistor 123, flow measurement accuracy is not degraded although the heating temperature of the second heating resistor 123 is lowered. In the flow measuring device 191, by reducing power to be supplied to the second heating resistor 123, power consumption of the entire device is reduced, and also, degradation of the heating resistor 123 over time is reduced.

Figure 14:
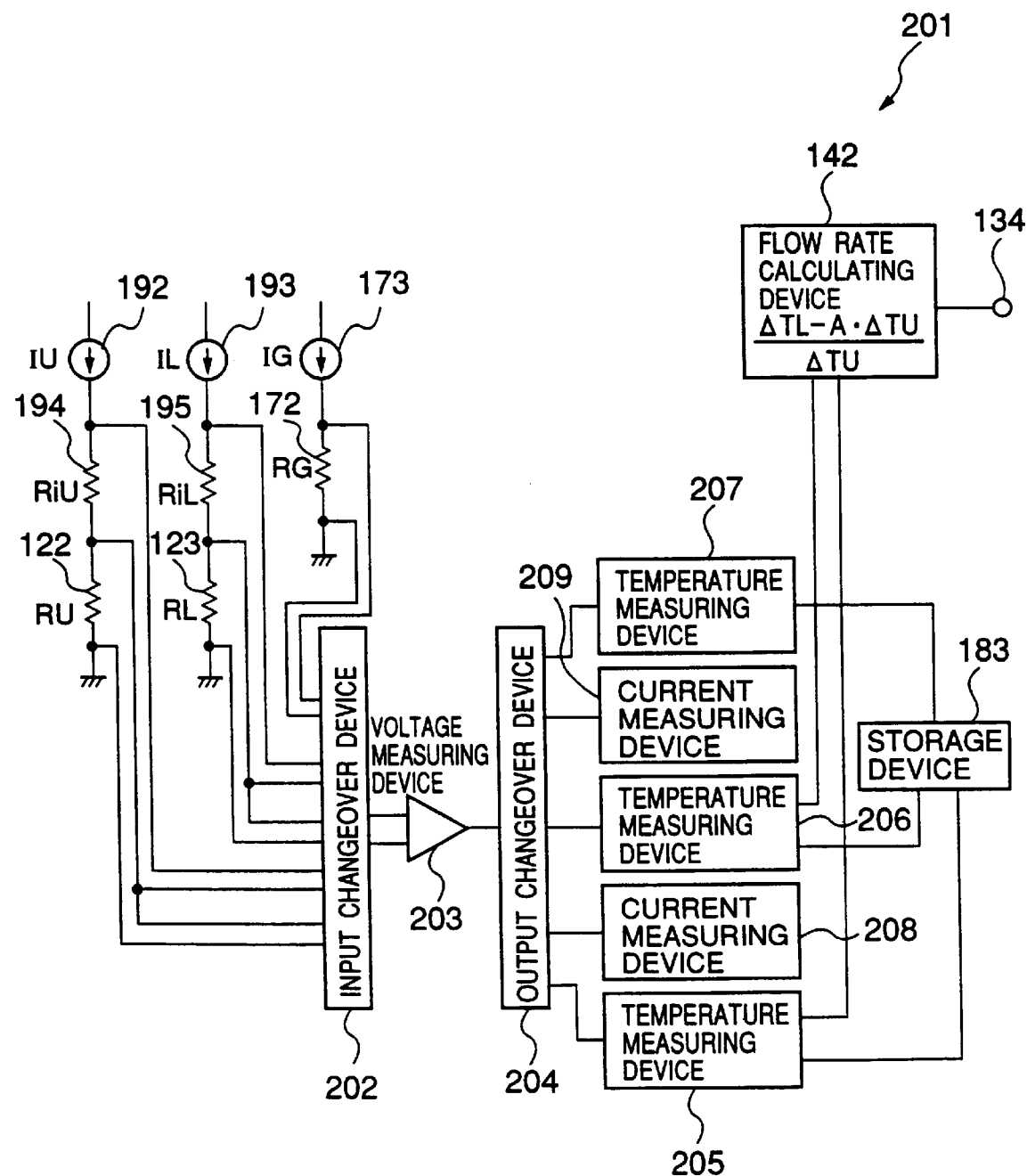
FIG. 14 shows a block diagram of a flow measuring device in a second variant embodiment.

In the flow measuring device 191, the five measuring devices 164, 165, 174, 196 and 197 are connected to the five resistors 122, 123, 172, 194 and 195, respectively. However, as shown in FIG. 14, in a flow measuring device 201, it is possible that a single voltage measuring device 203 is connected to the resistors 122, 123, 172, 194 and 195 via an input changeover device 202, and, to the voltage measuring device 203, temperature measuring devices 205, 206 and 207 and current measuring devices 208 and 209 are connected via an output changeover device 204.

In this case, each part/component is used in a time sharing manner using the changeover devices 202 and 204. Because the single voltage measuring device 203 is used for the five resistors 122, 123, 172, 194 and 195, it is possible to measure the terminal voltages of the five resistors with the same characteristics. Thereby, it is possible to more accurately measure flow rates.

Figure 15:
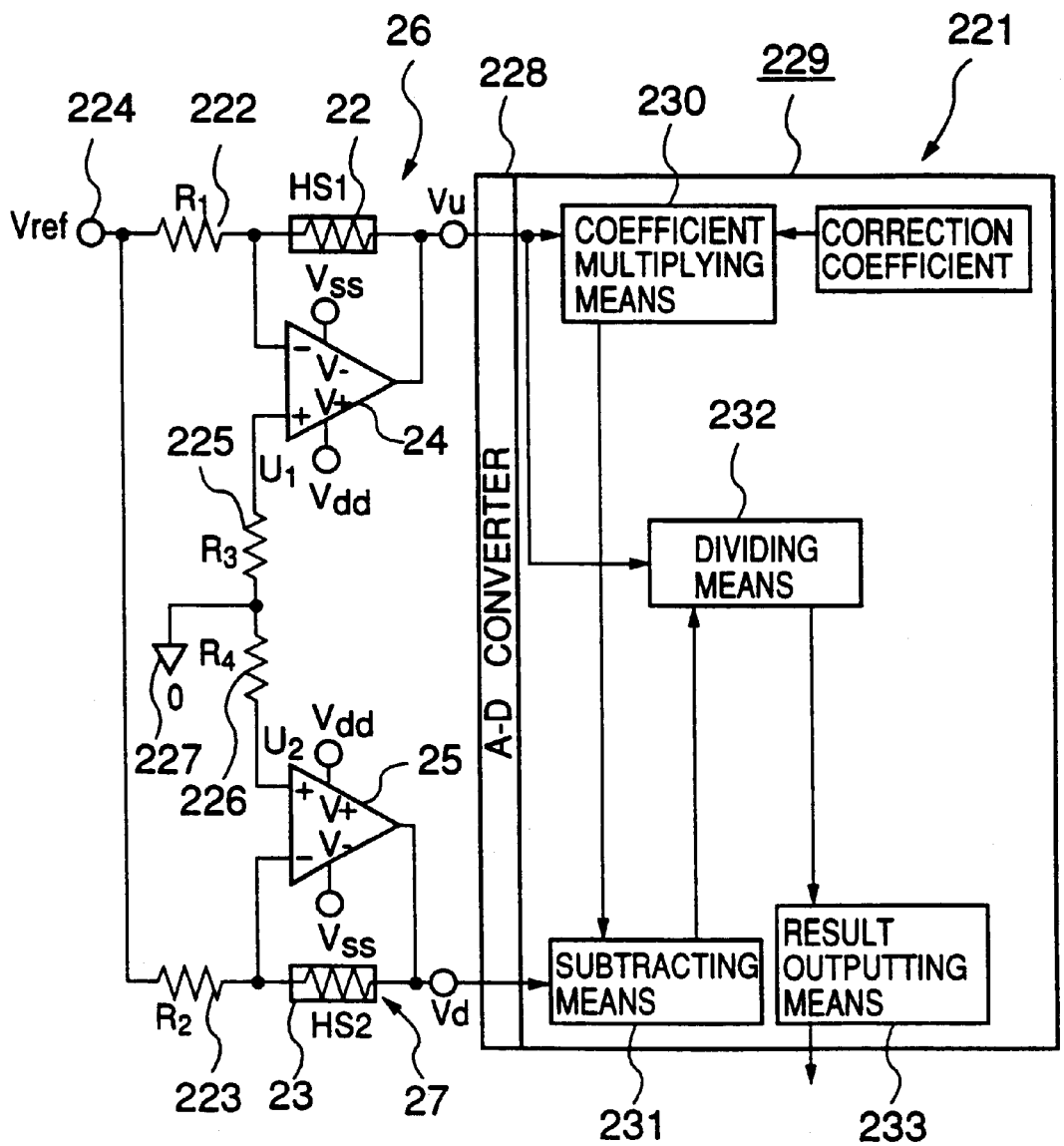
FIG. 15 shows a block diagram of a flow measuring device in a sixth embodiment of the present invention.
Figure 16:
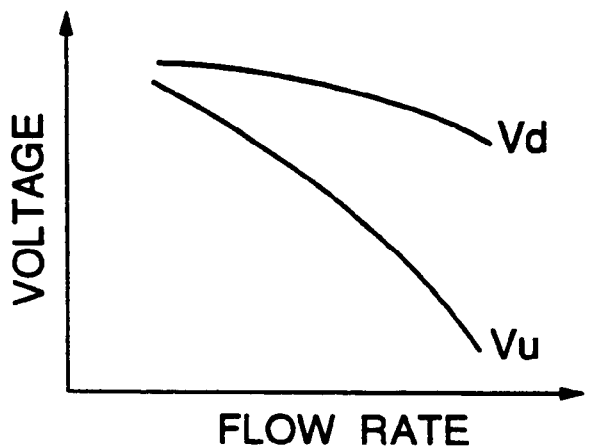
FIG. 16 shows a characteristic graph showing a relationship between change of the fluid flow rate and change of the voltage between the ends of the first heating resistor and the voltage between the ends of the second heating resistor.
Figure 17:
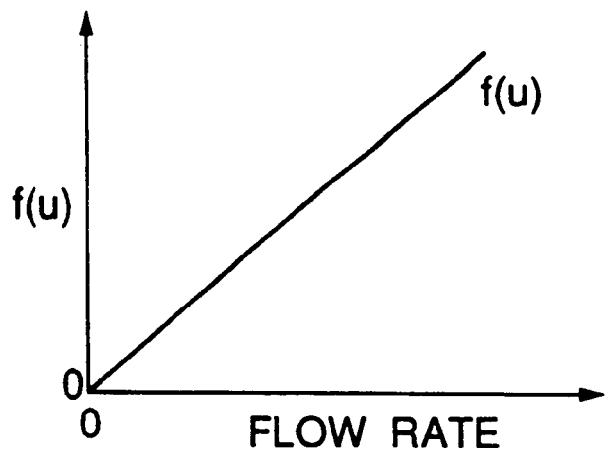
FIG. 17 shows a characteristic graph showing a relationship between change of the fluid flow rate and a measurement result.

With reference to FIGS. 15, 16 and 17, a sixth embodiment of the present invention will now be described. In a flow measuring device 221 in the sixth embodiment, the temperature coefficients of resistance and the resistance values in a reference condition are identical between a first heating resistor 22 and a second heating resistor 23. Feedback loops 26 and 27 are formed as a result of first and second operational amplifiers 24 and 25 being connected to the first and second heating resistors 22 and 23, respectively. To the minus-side input terminals of first and second operational amplifiers 24 and 25, acting as input terminal of the feedback loops 26 and 27, a reference voltage "Vref" input terminal 224 is connected via resistors 222 and 223, and, to the plus-side input terminals of the first and second operational amplifiers 24 and 25, a ground terminal 227 is connected via resistors 225 and 226, these parts/components acting as first and second power supply means.

In the flow measuring device 221, an A-D converter 228 is connected to the output terminals of the feedback loops 26 and 27. To the A-D converter 228, a communication I/F (interface, not shown in the figure) of a microprocessor 229 is connected. This microprocessor 229 includes a CPU (not shown in the figure) as a main portion of the microprocessor 229. To the CPU, hardware such as a ROM, a RAM (each not shown in the figure), the communication I/F and so forth are connected.

When various data is input to the communication I/F, for example, the CPU uses the input data and performs various data processing according to various software programs. The CPU outputs the data processing result via the communication I/F. In the ROM, the software programs according to which the CPU performs various data processing is stored. In the RAM, various work areas which the CPU uses for the data processing are provided.

As a result of the CPU reading software programs and performing various data processing operations, various functions are performed as various means. As such various means, the flow measuring device 221 has a coefficient multiplying means 230, subtracting means 231, dividing means 232, and result outputting means 233. The software programs for configuring the CPU to function as these means 230, 231, 232 and 233 are stored in the ROM.

The A-D converter 228 converts the measurement voltages "Vu, Vd" of the first and second operational amplifiers 24 and 25 from the analog values to the digital values, respectively. The coefficient multiplying means 230 multiplies the measurement voltage "Vu" of the first operational amplifier 24, which has been converted into the digital value, by a predetermined correction coefficient. The correction coefficient is set as a value resulting from dividing the resistance value "Rd" of the second heating resistor 23 in the reference condition where the flow rate is "0" at a predetermined temperature by the resistance value "Ru" of the first heating resistor 24 in the reference condition. This value is, for example, stored in the ROM as a parameter which the CPU can read. However, in this case, because the temperature coefficients in resistance and the resistance values in the reference condition are identical between the first and second heating resistors 22 and 23 and also currents supplied to the first and second heating resistors are identical to one another, the correction coefficient is set as "1".

The subtracting means 231 subtracts the multiplication result of the coefficient multiplying means 230 from the measurement voltage "Vd" of the second operational amplifier 25. The dividing means 232 divides the subtraction result of the subtracting means 231 by the measurement voltage "Vu" of the first operational amplifier 24. The result outputting means 233 output the division result of the dividing means 232 externally via the communication I/F as digital data according to the fluid flow rate.

The flow measuring device 221 measures a flow rate of a fluid such as gas, and outputs the measurement result externally as digital data. In this case, the first and second heating resistors 22 and 23 are positioned on a wiring substrate in this stated order in the fluid flow direction. The first heating resistor 22 and second heating resistor 23 are caused to heat as a result of variable-voltage and constant-current power being supplied. When the fluid flows in this state, the heat quantity moves from the upstream-side first heating resistor 22 to the downstream-side second heating resistor 23. Thereby, the resistance values of the heating resistors 22 and 23 change. The currents of the feedback loops 26 and 27 are maintained to be constant, and the output voltages change.

For example, in the case of the feedback loop 26, because the output terminal of the first operational amplifier 24 is connected to the minus-side input terminal via the heating resistor 22 so as to form the feedback loop, the voltages at the plus-side and minus-side input terminals of the operational amplifier 24 are identical to one another. Because the plus-side input terminal of the first operational amplifier 24 is connected to the ground terminal 227 via the resistor 225, the voltages at the plus-side and minus-side input terminals are "0".

Because the resistor 222 of the resistance value "R1" is provided between the voltage "0" input terminal of the first operational amplifier 24 and the reference voltage "Vref" input terminal 224, the constant current "I1=Vref/R1" flows through the resistor 222. This constant current also flows through the first heating resistor 22. Similarly, the constant current "I2=Vref/R1" flows through the resistor 223 and also flows through the second heating resistor 23.

Thus, although the resistances "Ru, Rd" of the first and second heating resistors 22 and 23 change, the constant currents "I1, I2" flow therethrough. Therefore, when the resistance values "Ru, Rd" of the first and second heating resistors 22 and 23 change as a result of change of the fluid flow rate, the measurement voltages "Vu=I1·Ru, Vd=I2·Rd" of the first and second operational amplifiers 24 and 25 change. The measurement voltages are the voltages at the ends of the first and second heating resistors 22 and 23. The measurement voltages "Vu, Vd" are converted from the analog values to the digital values by the A-D converter 228 and are input to the microprocessor 229. The microprocessor 229 performs predetermined data processing on the input data.

Thus, the measurement voltage "Vu" of the first operational amplifier 24 is multiplied by the correction coefficient "A", and the multiplication result "A·Vu" is subtracted from the measurement voltage "Vd" of the second operational amplifier 25. The subtraction result "Vd−A·Vu" is divided by the measurement value "Vu" of the first operational amplifier 24, and the division result "(Vd−A·Vu)/Vu" is output externally as digital data according to the fluid flow rate.

For example, when the digital data is converted into the actual flow rate and displayed on a display (not shown in the figure), the fluid flow rate can be observed. When a feedback control is performed so that a flow adjusting valve (not shown in the figure) is controlled based on the digital data, it is possible to maintain the fluid flow rate to be constant.

In the flow measuring device 221, the difference between the measurement voltages "Vu, Vd" of the first and second operational amplifiers 24 and 25 is not directly used as the flow rate measurement result. In the flow measuring device 221, the predetermined data processing is performed on these measurement voltages "Vu, Vd", and thus, the fluid flow rates can be measured. Further, it is also possible to determine whether or not the fluid is flowing. This will now be described in detail.

Because the first and second heating resistors 22 and 23 are positioned in the stated order in the fluid flow direction, fluid to which a heat quantity moves from the first heating resistor 22 flows on a surface of the second heating resistor 23. As a result, due to fluid flow, the first heating resistor 22 is cooled better than the second heating resistor 23. The voltages "Vu, Vd" at the ends of the first and second heating resistors 22 and 23 have the following relationship:

$$Vd = A \cdot Vu + f(u) \cdot Vu,$$

where "f(u)" is a function which changes according to change of a flow rate "u", and "A" is a predetermined coefficient. The coefficient "A" is used for correcting a difference of conditions of the first and second heating resistors 22 and 23. Therefore, when the resistances "Ru, Rd" of the first and second heating resistors 22 and 23 in the reference condition are identical to one another and currents "I1, I2" flowing through the heating resistors 22 and 23 are identical to one another, the coefficient "A" is "1".

When the fluid flow rate is "0", the voltages "Vu, Vd" at the ends of the first and second heating resistors 22 and 23 have the relation "Vd=A·Vu". This relation changes when the fluid flows. It is considered that the relation change due to the fluid flowing results from the fact that the fluid moves a heat quantity from the upstream-side first resistor 22 to the downstream-side second resistor 23, and this factor is expressed by "f(u)·Vu".

The function "f(u)" is a signal indicating the fluid flow rate. From the above-mentioned equation, $$f(u)=(Vd-A\cdot Vu)/Vu.$$

Thus, in the flowing measuring device 221, the voltage "Vu" at the end of the first heating resistor 22 is multiplied by the correction coefficient "A", the multiplication result is subtracted from the voltage "Vd" at the end of the second heating resistor 23, and the subtraction result is divided by the voltage "Vu" at the end of the first heating resistor 22. The division result "f(u)" is digital data according to the fluid flow rate.

As shown in FIG. 16, when the flow rate changes, the voltages "Vu, Vd" at the ends of the first and second heating resistors 22 and 23 change nonlinearly. However, as shown in FIG. 17, the calculation result "f(u)" changes approximately linearly. From the digital data, the fluid flow rate can be obtained. As a result of the fluid flow rate being thus measured, the measurement result is "0" when the flow rate is "0". Accordingly, whether or not the fluid is flowing can be accurately determined.

Especially in the flow measuring device 221, the voltage "Vu" at the end of the first heating resistor 22 is multiplied by the correction coefficient "A". Therefore, even in a case where the resistance values of the first and second heating resistors 22 and 23 in the reference condition and/or currents flowing therethrough are different from one another, the difference can be corrected using the correction coefficient "A". Accordingly, in such a case, whether or not the fluid is flowing can be accurately determined. As mentioned above, the resistance values of the first and second heating resistors 22 and 23 in the reference condition and currents flowing therethrough are identical to one another, the correction coefficient "A" is "1". Accordingly, in this case, the coefficient multiplying means 230 can be omitted. In this case, it is possible to simplify the structure of the software programs of the microprocessor 229, reduce the data processing load and improve the data processing speed.

When the resistance values of the first and second heating resistors 22 and 23 in the reference condition and/or currents flowing therethrough are different from one another, it is necessary to appropriately set the correction coefficient "A". It is preferable that setting is made such that "f(u)" is "0" when the fluid flow rate is "0". For example, a high measuring accuracy is required in the flow measuring device 221, in order to omit the multiplication by the correction coefficient "A", it is necessary to form the first and second heating resistors 22 and 23 to be precisely identical to one another. However, manufacturing of precisely identical heating resistors is difficult.

Instead, the resistance values "Ru, Rd" of the first and second heating resistors 22 and 23 are measured in a condition where the fluid flow rate is "0" and the identical currents "I" flow through the first and second heating resistors 22 and 23, and then, the ratio "Rd/Ru" is set to the coefficient multiplying means 230 as the correction coefficient "A". Thereby, even if the resistance values of the heating resistors 22 and 23 in the reference condition are different from one another, when the flow rate is "0", the measurement result "f(u)" is "0".

The specifics of actually setting the correction coefficient "A" will now be described. After the first and second resistors 22 and 23 are formed on the wiring substrate, the resistance values "Ru, Rd" thereof in the reference condition where the flow rate is "0" at the predetermined temperature are measured. Then, the value of the ratio "Rd/Ru" is stored in the ROM of the microprocessor 229 as the parameter of correction coefficient "A" in the software program of the coefficient multiplying means 230. Thus, appropriate setting of the correction coefficient "A" is simple.

Setting of the correction coefficient "A" based on the resistance values "Ru, Rd" of the first and second heating resistors 22 and 23 is effective when currents flowing through the first and second heating resistors 22 and 23 are identical to one another. However, this setting is not effective when currents flowing through the first and second heating resistors 22 and 23 are different from one another. In such a case, it is preferable that, after actually forming the power source circuit and current flowing circuit, the voltages "Vu, Vd" at the ends of the first and second heating resistors 22 and 23 in the reference condition are measured from the first and second operational amplifiers 24 and 25, and the correction coefficient "A" is set as "Vd/Vu=A".

Thereby, in the flow measuring device 221, even if the resistance values of the first and second resistors 22 and 23 in the reference condition are different from one another and/or currents flowing therethrough are different from one another, when the flow rate is "0", the measurement result "f(u)" is "0". Thus, whether or not the fluid is flowing can be determined. Also in this case, the correction coefficient "A" is stored in the ROM of the microprocessor 229 as the parameter of the software program, after the necessary hardware is manufactured. Thus, setting of the correction coefficient "A" can be appropriately performed.

There may be variants of this embodiment. For example, in the embodiment, according to the software program stored in the ROM, the CPU performs data processing, and thus various means of the flow measuring device 221 is provided. However, it is also possible that each of the various means is manufactured as specific hardware. It is also possible that some portions of the various means are provided as a result of software programs stored in a ROM or the like being executed and the other portions are manufactured as specific hardware. Further, it is also possible that a ROM or the like in which predetermined software programs are stored and hardware of the other portions are manufactured as firmware.

In the embodiment, the measurement result "f(u)" is calculated such that "f(u)" is approximately linear to the fluid flow rate and is "0" when the flow rate is "0". However, in the measurement result "f(u)", information of temperature is included. Therefore, when the temperature of the fluid changes, the inclination of the measurement result "f(u)" changes. Therefore, it is difficult to measure flow rates accurately.

In order to solve this problem, it is preferable to add $m^{th}$ power means for raising the voltage "Vu" at the end of the first heating resistor 22 to the $m^{th}$ power, $n^{th}$ power means for raising the voltage "Vd" at the end of the second heating resistor 23 to the $n^{th}$ power, and result correcting means for multiplying the division result "f(u)" of the dividing means 232 by the raising to the $m^{th}$ power result of the $m^{th}$ power means and the raising to the $n^{th}$ power result of the $n^{th}$ power means. Software programs for configuring the CPU to act as these means are stored in the ROM.

Because the digital data "f(u)" according to the fluid flow rate is multiplied by the result of raising the voltage "Vu" at the end of the first heating resistor 22 to the $m^{th}$ power and the result of raising the voltage "Vd" at the end of the second heating resistor 22 to the $n^{th}$ power, the multiplication result "f2(u)" corresponds to the flow rate and is not much affected by the fluid temperature. This will now be described in detail.

The resistance "Ru" of the first heating resistor 22 is expressed as follows:

$$Ru=Ru0(1+\alpha u \cdot dT),$$

where "Ru0" represents the resistance value at a reference temperature, "dT" represents the temperature difference from the reference temperature and "αu" represents the temperature coefficient of resistance. When the temperature changes, if a current I flowing through the resistor is fixed, $$I \cdot Ru = I \cdot Ru0(1+\alpha u \cdot dT),$$

and the voltage "Vu" is expressed as follows:

$$Vu=Vu0(1+\alpha u \cdot dT),$$

wherer "Vu0" represents the voltage "Vu" at the reference temperature. Because the "Vu0" is a constant, the end voltage "Vu" changes according to change of the fluid temperature. Similarly, the voltage "Vd" at the end of the second heating resistor 23 changes according to change of the fluid temperature.

By multiplying the digital data "f(u)" according to the fluid flow rate m times by the voltage "Vu" at the end of the first heating resistor 22 and also n times by the voltage "Vd" at the end of the second heating resistor 23, influence of temperature on the flow rate measurement result is minimized for a required temperature range. The above-mentioned calculation is as follows:

$$f2(u)=f(u) \cdot Vu^m \cdot Vd^n.$$

Thus, $$f2(u)=\{(Vd-A \cdot Vu)/Vu\} \cdot Vu^m \cdot Vd^n.$$

Figure 18:
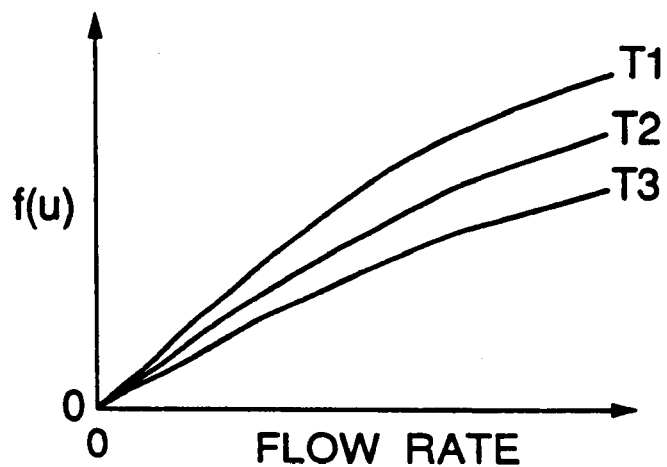
FIG. 18 shows a characteristic graph showing flow rate measurement results in three temperatures.
Figure 19:
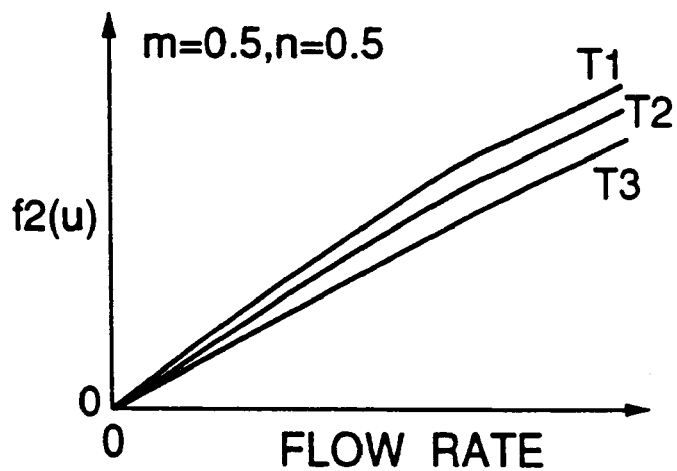
FIG. 19 shows a characteristic graph showing flow rate measurement results in three temperatures after correcting with predetermined exponents.
Figure 20:
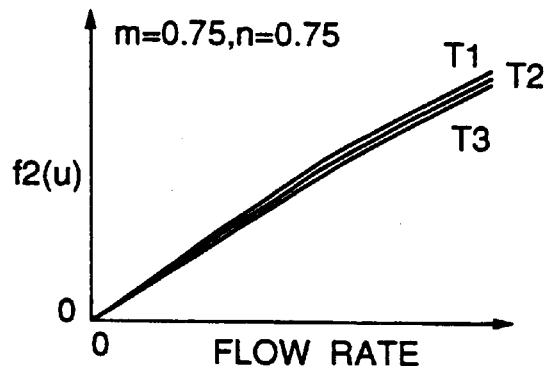
FIG. 20 shows a characteristic graph showing flow rate measurement results in the three temperatures after correcting with other predetermined exponents.
Figure 21:
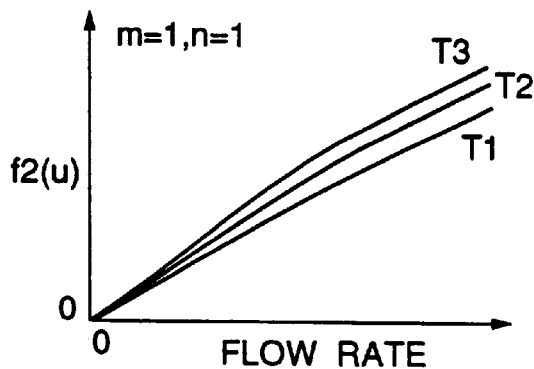
FIG. 21 shows a characteristic graph showing flow rate measurement results in the three temperatures after correcting with other predetermined exponents.

For example, when "m=n=0", the flow rate measurement result is not corrected, and as a result, as shown in FIG. 18, the measurement result f(u) is affected by the fluid temperature. When "m=n=0.5", as shown in FIG. 19, the influence of the temperature on the flow rate measurement result is reduced. When "m=n=0.75", as shown in FIG. 20, the influence of the temperature on the flow rate measurement result is very small. When "m=n=1", as shown in FIG. 21, the influence of the temperature on the flow rate measurement result increases.

The above-mentioned exponents "m, n" are set to be optimum depending on various conditions. One example of an optimum setting is "m=n=0.75". Using the thus-set values m and n, by multiplying the voltage "Vu" at the end of the first heating resistor 22 m times by itself and multiplying the voltage "Vd" at the end of the second heating resistor 23 n times by itself, then multiplying the flow rate measurement result "f(u)" by these multiplication results, and thus calculating the corrected measurement result "f2(u)", it is possible to accurately measure the fluid flow rate independently of the fluid temperature.

Figure 22:
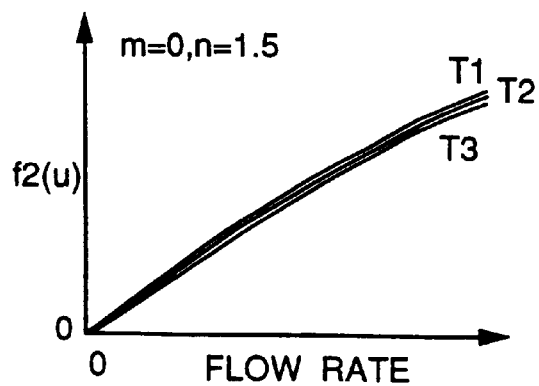
FIG. 22 shows a characteristic graph showing flow rate measurement results in the three temperatures after correcting with other predetermined exponents.

Setting of the exponents "m, n" in the condition where "m=n" for simplifying the calculation has been described. However, in a case where the voltages "Vu, Vd" at the ends of the first and second heating resistors 22 and 23 are approximately identical to one another, it may be that "m+n=1.5". As shown in FIG. 22, when "m=0, n=1.5", influence of temperature is very small and flow rates can be measured well.

When the exponents "m, n" are not integers as mentioned above, calculation of raising to the $m^{th}$ power and raising to the $n^{th}$ power is complicated. It is practical to set the exponents so that "m=n=1" so as to reduce the calculation load and improve calculation speed. In the examples described above, the division result "(Vd−A·Vu)/Vu" of the dividing means 232 is multiplied by the result of multiplying the voltage "Vu" at the end of the first heating resistor 22 m times by itself and the result of multiplying the voltage "Vd" at the end of the second heating resistor 23 n times by itself. However, the division result includes the denominator "Vu". Accordingly, it may be that the subtraction result "Vd−A·Vu" of the subtracting means 231 is multiplied by the result of multiplying the voltage "Vu" at the end of the first heating resistor 22 (m−1) times by itself and the result of multiplying the voltage "Vd" at the end of the second heating resistor 23 n times by itself. In this case, the dividing means 232 can be omitted.

Further, it may be that, instead of individually providing the $m^{th}$ power means and $n^{th}$ power means, a single power means is provided and is combined with an exponent providing means which provides exponents "m, n" as parameters to the single power means appropriately.

Figure 23:
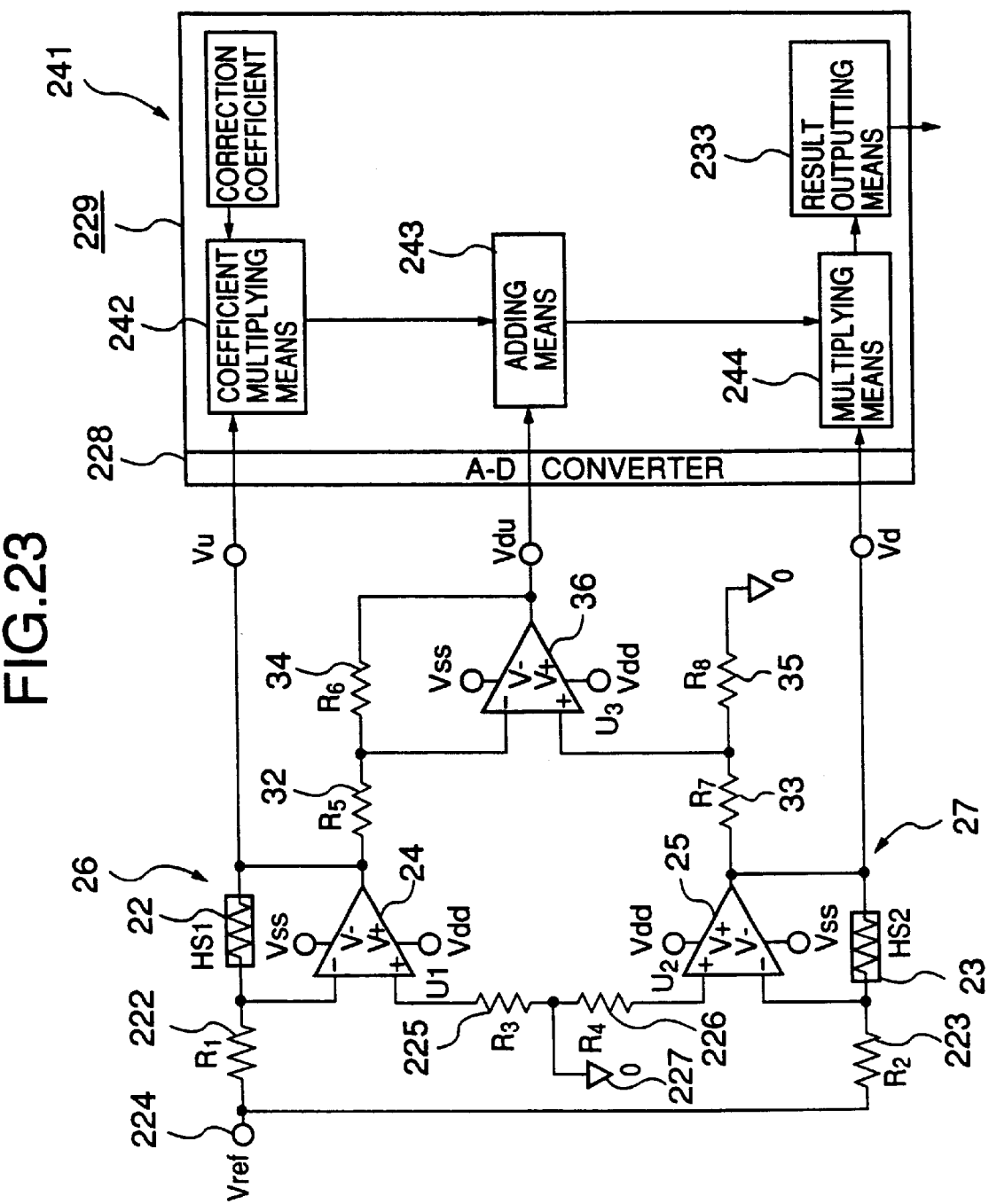
FIG. 23 shows a block diagram of a flow measuring device in a seventh embodiment of the present invention.

A seventh embodiment of the present invention will now be described with reference to FIG. 23. In a flow measuring device 241 in the seventh embodiment, the first and second operational amplifiers 24 and 25 are connected to a third operational amplifier 36, acting as subtracting means, via resistors 32 and 33, and resistors 34 and 35 are also connected to the third operational amplifier 36. Because the resistance values of the resistors 32 and 33 are identical to one another and the resistance values of the resistor 34 and 35 are identical to one another, the third operational amplifier 36, together with the resistors 32, 33, 34 and 35, functions as a differential amplifier. The third operational amplifier 36 is also connected to the microprocessor 229 via the A-D converter 228. The microprocessor 229 includes a coefficient multiplying means 242, adding means 243 and multiplying means 244.

The third operational amplifier 36 subtracts the voltage "Vu" at the end of the first heating resistor 22 from the voltage "Vd" at the end of the second heating resistor 23. The coefficient multiplying means 242 multiplies the voltage "Vu" at the end of the first heating resistor 22 by a predetermined correction coefficient "e". The correction coefficient "e" is set appropriately depending on various conditions. Here, the correction coefficient "e" is obtained from the following equation:

$$e=1-A=1-Rd/Ru.$$

Thus, "e" is obtained as a result of subtracting "A" from "1". "A" is obtained as a result of dividing the resistance value "Rd" of the second heating resistor 23 in the reference condition where the flow rate is "0" at a predetermined temperature by the resistance value "Ru" of the first heating resistor 22 in the same reference condition.

The adding means 243 divides the output voltage "Vdu", which is obtained as a result of the third operational amplifier 36 performing the differential amplification, by the amplification factor. Thus, adding means 243 converts the output voltage "Vdu" into the differential voltage "V'du". The adding means 243 adds the converted differential voltage "V'du" to the multiplication result "e·Vu" of the coefficient multiplying means 242. The multiplying means 244 multiplies the addition result "V'du+e·Vu" by the voltage "Vd" at the end of the second heating resistor 23. The result outputting means 233 outputs this multiplication result "(V'du+e·Vu)·Vd" as the flow rate measurement result "f2(u)".

In the above-described arrangement, similar to the above-described flow measuring device 21, the flow measuring device 241 measures flow rates of a fluid such as gas, and outputs the measurement results externally. The third operational amplifier 36 performs differential amplification with the ratio of the resistance values of the resistors 32 and 34 on the voltages "Vu, Vd" at the ends of the first and second heating resistors measured by the first and second operational amplifiers 24 and 25. The thus-obtained differential voltage "Vdu" is also input to the microprocessor 229.

As mentioned above, the differential voltage "Vdu", which is obtained as a result of the third operational amplifier 36 performing differential amplification, is divided by the amplification factor, and thus, is converted into the differential voltage "V'du". Further, the voltage "Vu" at the end of the first heating resistor 22 is multiplied by the predetermined correction coefficient "e". The multiplication result "e·Vu" is added to the differential voltage "V'du". The addition result "V'du+e·Vu" is multiplied by the voltage "Vd" at the end of the second heating resistor 23. The multiplication result "f2(u)" is expressed as follows:

$$f2(u)=(V'du+e \cdot Vu)Vu.$$

This multiplication result linearly approximates the fluid flow rate, in comparison to the voltages "Vu, Vd" at the ends of the first and second heating resistors 22 and 23.

When changing the form of the equation:

$$f2(u)=(V'du+e \cdot Vu)Vu,$$

$$f2(u)=(Vd-Vu+e \cdot Vu)Vu=\{(Vd-A \cdot Vu)/Vu\} \cdot Vu \cdot Vd.$$

This expression is the same as the expression of the above-mentioned "f2(u)" in the case where "m=n=1". Accordingly, by the flow measuring device 241, flow rates can be accurately measured with a very small influence of the fluid temperature.

Further, detection of the differential voltage of the voltages "Vu, Vd" at the ends of the first and second heating resistors 22 and 23 is not performed through digital operation by software of the microprocessor 229 but is performed through analog operation by the third operational amplifier 36. Then, the thus-detected differential voltage is input to the microprocessor 229 after being amplified. As a result, even if the resolution of the A-D converter 228 is low, flow rate can be finely measured.

In the flow measuring device 241, because the voltage "Vu" at the end of the first heating resistor 22 is multiplied by the correction coefficient "e", even if the resistance values of the first and second heating resistors 22 and 23 in the reference condition and/or currents flowing therethrough are different from one another, whether or not the fluid flows can be accurately determined. However, if the resistance values of the first and second heating resistors 22 and 23 in the reference condition and currents flowing therethrough are identical to one another as mentioned above, the correction coefficient "e" is "0". Accordingly, the coefficient multiplying means 242 and the adding means 243 can be omitted. In this case, the structure of the software programs of the microprocessor 229 can be simplified, the data processing load can be reduced and the data processing speed can be improved.

When the resistance values of the first and second heating resistors 22 and 23 in the reference condition and/or currents flowing therethrough are different from one another, it is necessary to appropriately set the correction coefficient "e". It is preferable that setting is made such that "f2(u)" is "0" when the flow rate is "0". In this case, identical currents "I" are caused to flow through the first and second heating resistors 22 and 23 in the reference condition, and the resistance "Ru, Rd" thereof are measured. Then, the correction coefficient "e=1−(Rd/Ru)" is calculated as a result of subtracting the ratio "Rd/Ru" from "1". The thus-obtained correction coefficient "e" may be set to the coefficient multiplying means 242.

Setting of the correction coefficient "e" based on the resistance values "Ru, Rd" of the first and second heating resistors 22 and 23 is effective when currents flowing through the first and second heating resistors 22 and 23 are identical to one another. However, this setting is not effective when currents flowing through the first and second heating resistors 22 and 23 are different from one another. In such a case, it is preferable that, after actually forming the power source circuit and current flowing circuit, the voltages "Vu, Vd" at the ends of the first and second heating resistors 22 and 23 in the reference condition are measured from the first and second operational amplifiers 24 and 25, and "1−Vd/Vu" is set as the correction coefficient "e".

It is further preferable that the differential voltage "V'du" is divided by the voltage "Vu" at the end of the first heating resistor 22, and the value "−V'du/Vu" obtained as a result of inverting the plus/minus sign thereof is set as the correction coefficient "e". In fact, the differential voltage "Vdu" output by the third operational amplifier 36 is much affected by differential amplification and an offset voltage. Although the microprocessor divides the differential voltage "Vdu" by the amplification factor and thus calculates the differential voltage "V'du", the matching of the differential voltages "V'du" and "Vdu" to the voltages "Vu, Vd" at the ends of the first and second heating resistors 22 and 23 is not good.

Although the correction coefficient "e" is set in this situation based on the voltages "Vu, Vd" at the ends of the first and second heating resistors 22 and 23, because the matching between the thus-obtained correction coefficient "e" and the differential voltage "V'du" is not good, accuracy of the flow rate measurement result is low. However, the correction coefficient "e" is a parameter which indicates the slight difference between the voltages "Vu, Vd" at the ends of the first and second heating resistors 22 and 23. This slight difference is detected through analog operation, is amplified, is input to the microprocessor 229, is then restored, and thus the differential voltage "V'du" is obtained. Therefore, by using the value "V'du" in the correction coefficient "e", it is possible to improve the accuracy of the correction coefficient "e".

When the correction coefficient "e" is calculated based on the differential voltage "V'du", it is considered that an error such as an offset voltage of the third operational amplifier 36 is included in the correction coefficient "e". However, the "V'du" is obtained as a result of converting and thus compressing the different voltage "Vdu", which is obtained from differential amplification, by dividing by the amplification factor through the microprocessor 229. As a result, it is possible to set the correction coefficient "e" with high accuracy.

Figure 24:
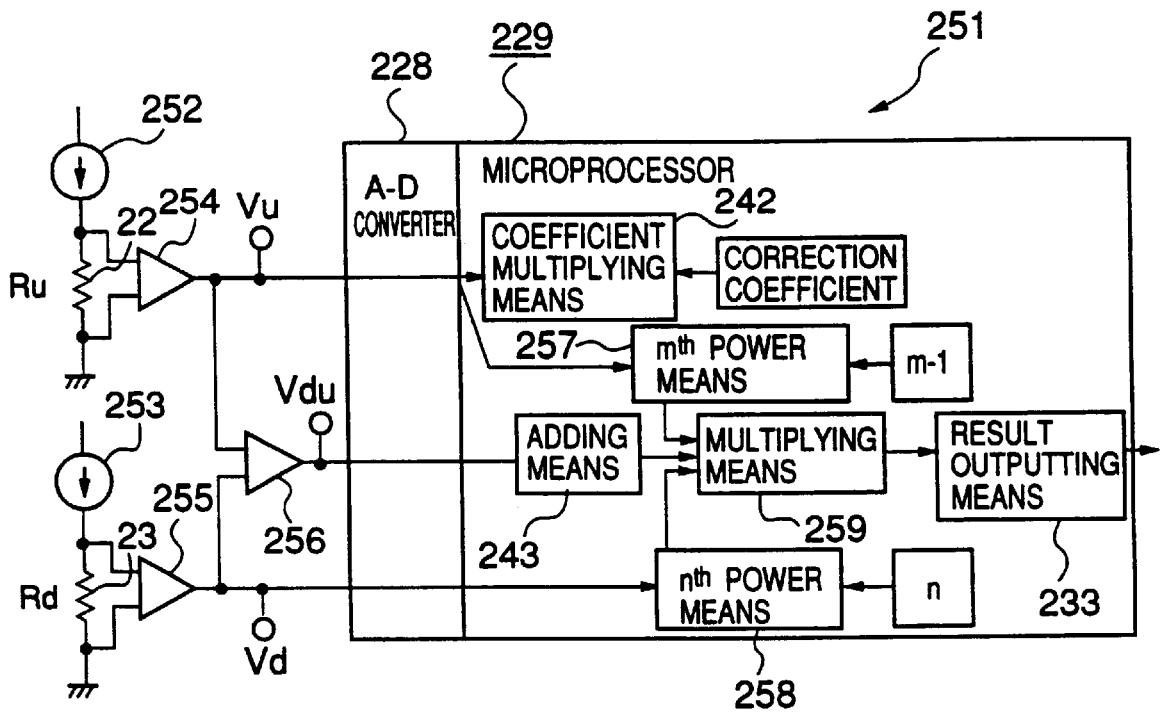
FIG. 24 shows a block diagram of a flow measuring device in an eighth embodiment of the present invention.

An eighth embodiment of the present invention will now be described with reference to FIG. 24. In a flow measuring device 251 in the eighth embodiment, the circuit arrangement of the above-described flow measuring device 241 or the like is equivalently simplified. The first and second heating resistors 22 and 23 are directly connected to first and second constant-current sources 252 and 253, acting as first and second power supply means, respectively. To the first and second heating resistors 22 and 23, first and second measuring circuits 254 and 255, acting as first and second measuring means, are connected, respectively, and the first and second measuring circuits 254 and 255 are connected to the microprocessor 229 via the A-D converter 228. The first and second measuring circuits 254 and 255 are also connected to a differential amplifying circuit 256, acting as subtracting means, and the differential amplifying circuit 256 is also connected to the microprocessor 229 via the A-D converter 228.

In the microprocessor 229, $m^{th}$ power means 257 and $n^{th}$ power means 258 are additionally provided. The $m^{th}$ power means 257 raises the voltage "Vu" at the end of the first heating resistor 22 to the $(m-1)^{th}$ power. The $n^{th}$ power means 258 raises the voltage "Vd" at the end of the second heating resistor 23 to the $n^{th}$ power. A multiplying means 259 multiplies the addition result "V'du+e·Vu" by the raising to the $(m-1)^{th}$ result "$Vu^{m-1}$" and the raising to the $n^{th}$ result "$Vd^n$". The result outputting means 233 outputs the multiplication result $$"(V'du+e·Vu)·Vu^{m-1}·Vd^n"$$

as the flow measuring result "f3(u)".

In the above-described arrangement, in the flow measuring device 251, the voltages "Vu, Vd" at the ends of the first and second heating resistors 22 and 23 and the differential voltage "Vdu" are input to the microprocessor 229. In the microprocessor 229, the differential voltage "Vdu" is converted into the differential voltage "V'du" as a result of being divided by the amplification factor of the differential amplifying circuit 256. The voltage "Vu" at the end of the first resistor 22 is multiplied by the predetermined correction coefficient "e". The multiplication result "e·Vu" is added to the differential voltage "V'du". The voltage "Vu" at the end of the first resistor 22 is raised to the $(m-1)^{th}$ power and the voltage "Vd" at the end of the second resistor 23 is raised to the $n^{th}$ power. The addition result "V'du+e·Vu" is multiplied by the raising to the $(m-1)^{th}$ power result "$Vu^{m-1}$" and the raising to the $n^{th}$ power result "$Vd^n$". The multiplication result $$"(V'du+e·Vu)·Vu^{m-1}·Vd^n"$$

is output as the flow measuring result "f3(u)".

As the measurement result "f3(u)" is thus calculated, the ratio of temperature correction for the first and second heating resistors 22 and 23 is adjusted using "m, n". Thereby, it is possible to accurately measure fluid flow rates independently of the temperature of the fluid. Further, it is possible to determined in which direction the fluid flows as a result of determining whether the measurement result "f3(u)" is positive or negative.

Figure 25:
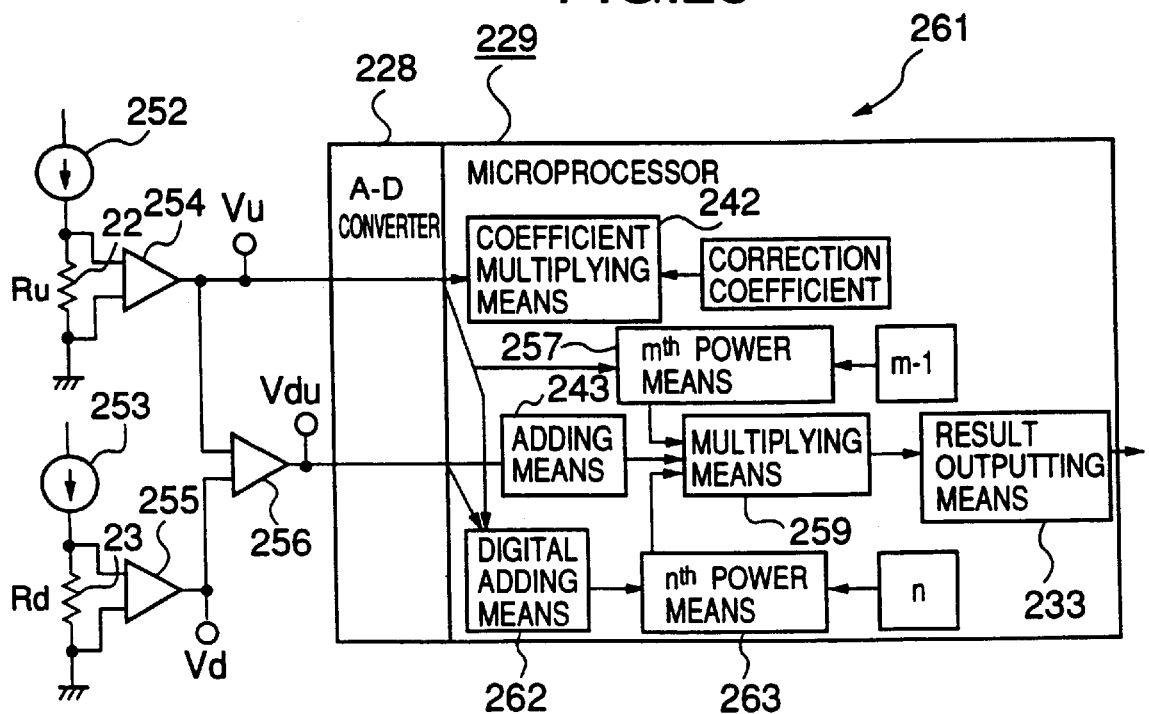
FIG. 25 shows a block diagram of a flow measuring device in a ninth embodiment of the present invention.

A ninth embodiment of the present invention will now be described with reference to FIG. 25. In a flow measuring device 261 in the ninth embodiment, a digital adding means 262 is additionally provided. Further, the second measuring circuit 255 is connected to the differential amplifying circuit 256 but is not connected to the microprocessor 229. The first measuring circuit 254 and differential amplifying circuit 256 are connected to an $n^{th}$ power means 263 via the digital adding means 262. Here, 'connection' means not only physical wiring connection but also logical linkage by means of software.

The digital adding means 262 adds the differential voltage "Vdu" and the voltage "Vu" at the end of the first heating resistor 22, each being obtained as a result of being converted into digital data. The $n^{th}$ power means 263 raises the addition result "Vdu+Vu", instead of the voltage "Vd" at the end of the second heating resistor 23, to the $n^{th}$ power. Thus, the series of the means 262 and 263 function as replacement means for replacing the measurement voltage.

In the above-described arrangement, in the flow measuring device 261, in the data processing of flow measurement, the voltage "Vd" at the end of the second heating resistor 23 is not used, and the addition result "Vdu+Vu" of the differential voltage "Vdu" and the voltage "Vu" at the end of the first heating resistor 22 is substituted for the voltage "Vd" at the end of the second heating resistor 23.

The differential voltage "Vdu" is likely to be affected by external disturbances, as mentioned above, because the differential voltage "Vdu" is a feeble signal. Therefore, when the differential voltage "Vdu" is used in calculation together with the voltages "Vu, Vd" at the ends of the first and second resistors 22 and 23, matching therebetween may not be good. However, when the addition result of one of the two voltages "Vu, Vd" and the differential voltage "Vdu" is substituted for the other of the two voltages "Vu, Vd", it is possible that matching is good in the calculation, and thus, it is possible to accurately measure fluid flow rates.

In the embodiment, the addition result of the voltage "Vu" at the end of the first heating resistor 22 and the differential voltage "Vdu" is substituted for the voltage "Vd" at the end of the second heating resistor 23. However, it is also possible that the addition result of the voltage "Vd" at the end of the second heating resistor 23 and the differential voltage "Vdu" is substituted for the voltage "Vu" at the end of the first heating resistor 22.

When, thus, only the voltage "Vd" at the end of the second heating resistor 23 is used but the voltage "Vu" at the end of the first heating resistor 22 is not used in the flow measurement, it is preferable to accordingly change the correction coefficient "e" of the coefficient multiplying means 242. The differential voltage "Vdu" of the differential amplifying circuit 256 measured in the reference condition is subtracted from the voltage "Vd" at the end of the second heating resistor 23 in the reference condition. The sign of the differential voltage "Vdu" of the differential amplifying circuit 256 is inverted. The resulting value "−Vdu" is divided by the above-mentioned subtraction result "Vd−Vdu". The division result "−Vdu/(Vd−Vdu)" is set to the coefficient multiplying means 242 as the correction coefficient "e".

In this case, in the calculation of the correction coefficient "e=−Vdu/(Vd−Vdu)" of the coefficient multiplying means 242, only the voltage "Vd" at the end of the second heating resistor 23 is used but the voltage "Vu" at the end of the first heating resistor is not used. Therefore, when only the voltage "Vd" at the end of the second heating resistor 23 is used but the voltage "Vu" at the end of the first heating resistor is not used also in the flow measurement as mentioned above, matching in the entire operation is improved.

Figure 27:
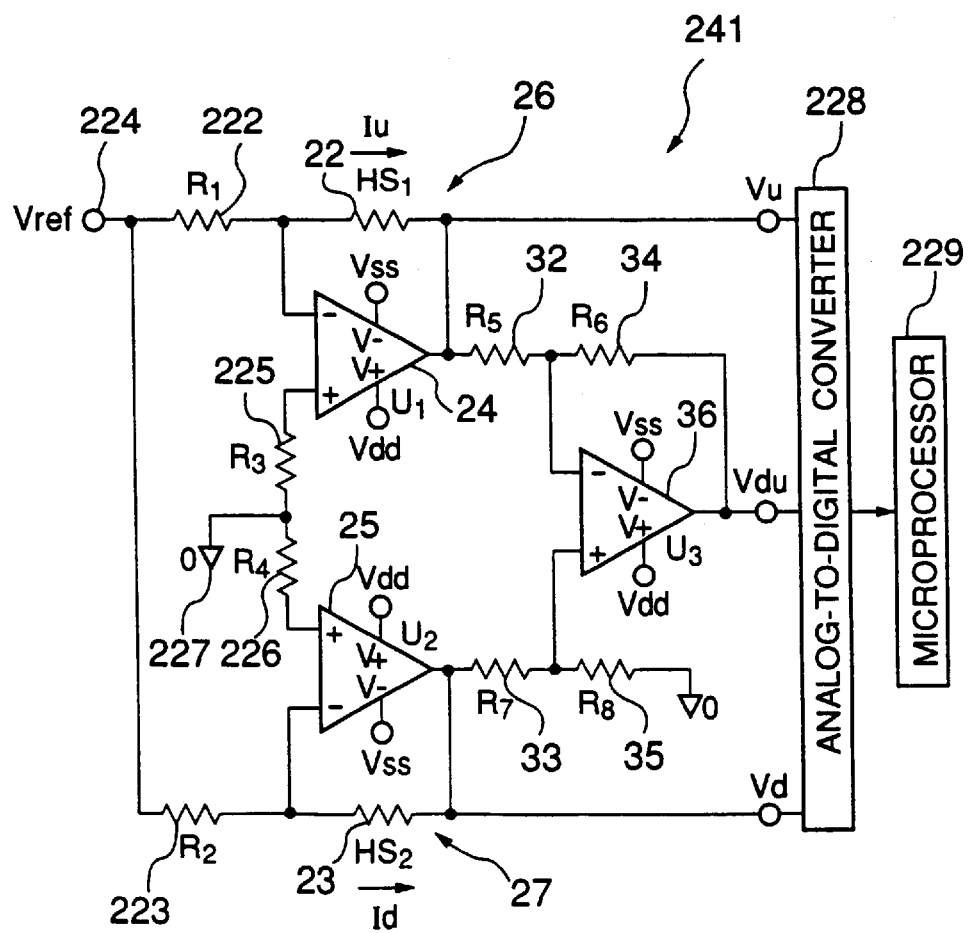
FIG. 27 shows a block diagram of an arrangement which is used in considering.

A tenth embodiment of the present invention will be described. Prior to the description of the tenth embodiment, the arrangement of the flow measuring device 241, which is a basis of the tenth embodiment, will now be studied again with reference to FIG. 27. FIG. 27 shows the arrangement of the above-described seventh embodiment after rewriting. In the flow measuring device 241 shown in FIG. 27, the output voltage Vu of the operational amplifier 24 depends on the resistance value of the first heating resistor 22, and the output voltage Vd of the operational amplifier 25 depends on the resistance value of the first heating resistor 23. Accordingly, the differential voltage Vdu of the operational amplifier 36 depends on the difference between the resistance values of the first and second heating resistors 22 and 23. The first and second heating resistors 22 and 23 heat due to currents flowing therethrough. Because the heat of the heating resistors 22 and 23 is thermally coupled with the fluid, the heating resistors 22 and 23 are cooled by the fluid. The heat quantities removed from the heating resistors 22 and 23 depend on the fluid flow velocity. The resistance values of the first and second heating resistors 22 and 23 decrease as the heat quantities removed from the heating resistors 22 and 23 increase. Accordingly, it is possible to know the fluid flow velocity from the resistance values of first and second heating resistors 22 and 23.

In the flow measuring device 241, as shown in FIG. 27, constant currents Iu and Id are supplied to the first and second heating resistors 22 and 23 from the separate current sources, respectively. Measurement results when the currents supplied to the first and second heating resistors 22 and 23 change will now be described.

In this measurement example, each of the first and second heating resistors 22 and 23 has the same resistance value of approximately 500 Ω, and the same temperature coefficient of resistance on the order of approximately 3300 ppm/° C. The currents which flow through the first and second heating resistors 22 and 23 have the same current value of 2 mA. The fluid temperature is maintained to be 25° C., and the fluid flow velocity is changed. At this time, how the different voltage Vdu changes when the current flowing through the first heating resistor 22 or the second heating resistor 23 changes is measured. The amplification factor of the operational amplifier 36 acting as a subtracter is set to be 1.

Figure 28:
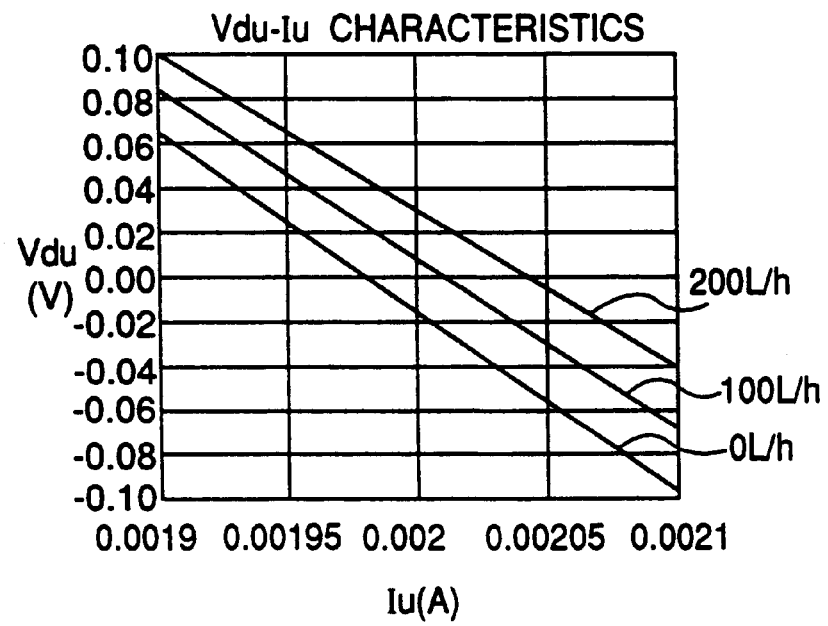
FIG. 28 shows a Vdu-Iu characteristic graph showing measurement results of the arrangement shown in FIG. 27.

FIG. 28 shows how the differential voltage Vdu changes when the current Iu of the first heating resistor 22 is changed. According to this measurement example, the differential voltages Vdu at the flow rates of 0 L/h, 100 L/h and 200 L/h, when the current is 0.002 A, change as the current Iu changes. The differential voltage Vdu at the flow rate of 100 L/h, when the current Iu is 0.00205 A, is lower than the differential voltage Vdu at the flow rate of 0 L/h when the current Iu is 0.002 A. Thus, change of the current Iu greatly affects the differential voltage Vdu.

Figure 29:
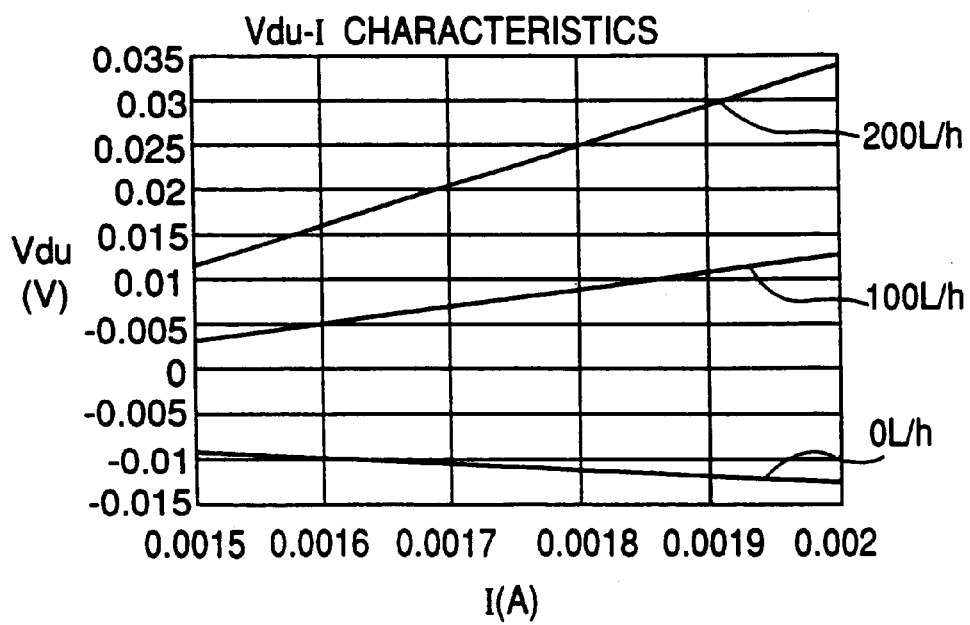
FIG. 29 shows a Vdu-Iu characteristic graph showing measurement results, in another condition, of the arrangement shown in FIG. 27.

FIG. 29 shows measurement results when the currents Iu and Id change equally. That is, I=Iu=Id, and FIG. 29 shows how the differential voltages Vdu change when the current I changes. When comparing the measurement results of FIG. 28 with those of FIG. 29, it is known that change of the differential voltages Vdu in the case of FIG. 29 is smaller than that in the case of FIG. 28. Accordingly, in the arrangement shown in FIG. 27, the separate current sources supply the currents to the first and second heating resistors, respectively, thereby the currents may change differently, and thus, the differential voltage Vdu may change largely as the currents change.

Figure 26:
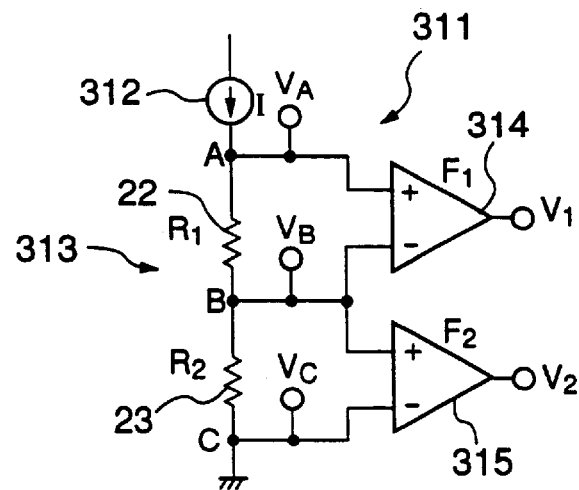
FIG. 26 shows a block diagram of a flow measuring device in a tenth embodiment of the present invention.

According to a flow measuring device 311 in the tenth embodiment shown in FIG. 26, when fluid flow rates are measured based on change of resistance values of the first and second heating resistors which are exposed to the fluid, influence of change of currents flowing through the heating resistors on the measurement result is reduced, and thereby, the measurement accuracy is improved. Each of the heating resistors 22 and 23 heats as a result of power being supplied thereto. Each of the heating resistors 22 and 23 has a large temperature coefficient of resistance, and is placed in the fluid. Thus, the heating resistors 22 and 23 are placed at positions where the resistors 22 and 23 are thermally coupled with the fluid. For example, the first heating resistor 22 is placed on the upstream side. The first and second heating resistors 22 and 23 are connected in series together with a constant-current source 312 which causes a constant current I to flow. Thus, a resistor series 313 is formed in which the heating resistors 22 and 23 are connected in series and the same current as flows through the heating resistor 22 flows through the heating resistor 23. A voltage measuring device 314, acting as first voltage measuring means, is provided, which outputs a terminal voltage $V_1$ based on the voltages $V_A$ and $V_B$ at points A and B of the first heating resistor 22. The voltage measuring device 314 calculates the difference between the voltages $V_A$ and $V_B$, and thus, outputs the terminal voltage $V_1$ which corresponds to the voltage between the points A and B of the first heating resistor 22. Similarly, a voltage measuring device 315, acting as second voltage measuring means, is provided, which outputs a terminal voltage $V_2$ based on the voltages $V_B$ and $V_C$ at points B and C of the second heating resistor 23. The voltage measuring device 315 calculates the difference between the voltages $V_B$ and $V_C$, and thus, outputs the terminal voltage $V_2$ which corresponds to the voltage between the points B and C of the second heating resistor 22. The input impedance of each of the voltage measuring devices 314 and 315 is sufficiently high in comparison to the impedances of the first and second heating resistors 22 and 23.

In the above-described arrangement, the constant-current I from the constant-current source 312 flows through the first heating resistor 22 from the point A, and flows through the second heating resistor 23 from the point B. Accordingly, the equal constant current I flows through each of the first and second heating resistors 22 and 23. As a result, the voltages $V_A$, $V_B$ and $V_C$ at the points A, B and C are expressed as follows:

$$V_A = I \cdot (R_1 + R_2);$$

$$V_B = I \cdot R_2;$$

and $$V_C = 0,$$

where $R_1$ and $R_2$ represent the resistance values of the heating resistors 22 and 23, respectively. The voltage measuring device 314 obtains $V_A - V_B$, and thus, for example, outputs the terminal voltage $V_1$ which is expressed as follows:

$$V_1 = I \cdot R_1.$$

Similarly, the voltage measuring device 315 obtains $V_B - V_C$, and thus, for example, outputs the terminal voltage $V_2$ which is expressed as follows:

$$V_2 = I \cdot R_2.$$

Thus, the voltage value of the terminal voltage $V_1$ corresponds to the resistance value of the first heating resistor 22, and the voltage value of the terminal voltage $V_2$ corresponds to the resistance value of the second heating resistor 23.

In the tenth embodiment, each of the first and second heating resistors 22 and 23 heats by the constant current I, and, because the heating resistors 22 and 23 are exposed to the fluid, heat quantities of the heating resistors 22 and 23 are removed by the fluid. The removed heat quantities depend on the fluid flow velocity. The resistance values of the first and second heating resistors 22 and 23 change as the temperatures thereof change. Accordingly, the values of the terminal voltages $V_1$ and $V_2$ according to the resistance values of the first and second heating resistors are values corresponding to the fluid flow velocity, and thereby, the flow rate can be obtained. Because the first and second heating resistors 22 and 23 are connected in series so as to form the resistor series 313, it is possible that equal current always flows through each of the heating resistors 22 and 23 by the single constant-current source 132. Accordingly, influence of change of the currents flowing through the heating resistors on the measurement result can be reduced, and thereby, the measurement accuracy can be improved.

Figure 30:
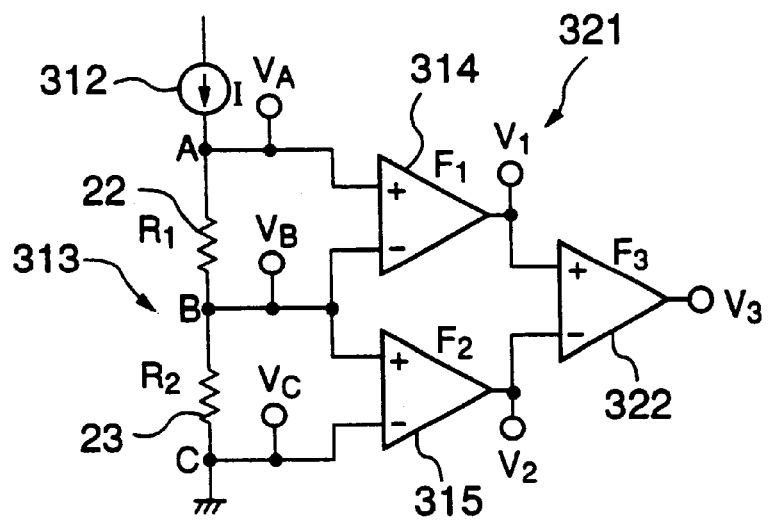
FIG. 30 shows a block diagram of a flow measuring device in an eleventh embodiment of the present invention.

With reference to FIG. 30, an eleventh embodiment of the present invention will now be described. In a flow measuring device 321 in the eleventh embodiment, a subtracting device 322, acting as subtracting means, is additionally provided, which calculates the differential voltage $V_3$ between the terminal voltages $V_1$ and $V_2$ which are the output voltages of the voltage measuring devices 314 and 315. The structure of the subtracting device 322 is similar to the structure of each of the voltage measuring devices 314 and 315.

The subtracting device 322 outputs the differential voltage $V_3$ which is expressed as follows:

$$V_3 = V_1 - V_2 = I \cdot (R_1 - R_2).$$

The value of the differential voltage $V_3$ corresponds to the difference between the resistance values of the first and second heating resistors 22 and 23. By additionally providing the subtracting device 322, the accuracy in measurement of the difference between the resistance values of the first and second heating resistors 22 and 23 is improved.

Figure 31:
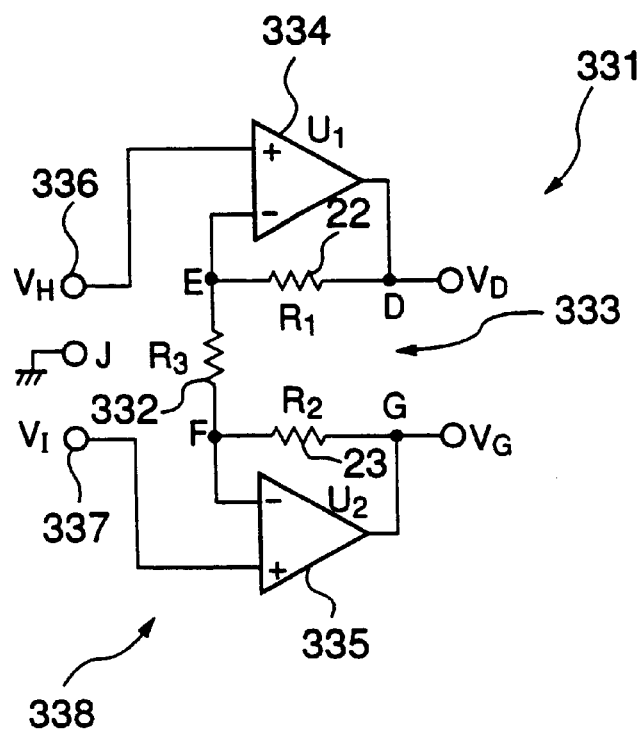
FIG. 31 shows a block diagram of a flow measuring device in a twelfth embodiment of the present invention.

With reference to FIG. 31, a twelfth embodiment of the present invention will now be described. In a flow measuring device 331 in the twelfth embodiment, a resistor 332 is provided between the first and second resistors 22 and 23, and thus, a resistor series 333 in which the resistors 22, 332 and 23 are connected in series is formed. Different from the heating resistors 22 and 23, the resistor 332 has a small temperature coefficient of resistance. Further, the resistor 332 is placed in a position such that the resistor 332 is not thermally related to the fluid.

In this embodiment, the first and second heating resistors 22 and 23 are connected in the feedback loops of operational amplifiers 334 and 335, respectively. A point D of one end of the first heating resistor 22 is connected to the output terminal of the operational amplifier 334, and a point E of the other end of the first heating resistor 22 is connected to the minus input terminal of the operational amplifier 334. Similarly, a point G of one end of the second heating resistor 23 is connected to the output terminal of the operational amplifier 335, and a point F of the other end of the second heating resistor 23 is connected to the minus input terminal of the operational amplifier 335. The point E of one end of the resistor 332 provided between the heating resistor 22 and 23 is connected to the minus input terminal of the operational amplifier 334, and the point F of the other end of the resistor 332 is connected to the minus input terminal of the operational amplifier 335. To the plus input terminals of the operational amplifiers 334 and 335, constant-voltage sources 336 and 337 are connected, respectively, so that voltages $V_H$ and $V_I$ are input to these plus terminals, respectively. A point J is a zero voltage point of a reference voltage of the circuit. Thereby, as will be described later, the three resistors 22, 23 and 332 are connected in series through the points D, E, F and G and the same current as flows through the resistor 22 flows through the resistor 332 and also flows through the resistor 23, and a position between the points E and F is the zero voltage point.

The input impedance of each of the operational amplifiers 334 and 335 is so high that no current flows through the input terminal thereof. The current flowing from the output terminal of the operational amplifier 334 flows through the first heating resistor 22 from the point D. The current flowing through the first heating resistor 22 flows to the point E. Because no current flows to the minus input terminal of the operational amplifier 334 from the point E, the current flowing through the heating resistor 22 to the point E then flows through the resistor 332 to the point F. Because no current flows to the minus terminal of the operational amplifier 335 from the point F, the current flowing through the resistor 332 to the point F then flows through the heating resistor 23 to the point G, that is, to the output terminal of the operational amplifier 335. Thus, the three resistors 22, 23 and 332 are connected in series through the points D, E, F and G and the same current as flows through the resistor 22 flows through the resistor 332 and also flows through the resistor 23.

In this arrangement, feedback is performed on the operational amplifiers 334 and 335 through the heating resistors 22 and 23, respectively. Thereby, the plus input terminal and minus input terminal of each operational amplifier are artificially grounded to one another, and thus have equal voltages. Thus, the voltage at the point E which is connected to the minus terminal of the operational amplifier 334 is equal to the voltage $V_H$. Similarly, the voltage at the point F which is connected to the minus terminal of the operational amplifier 335 is equal to the voltage $V_I$.

As a result, according to Ohm's law, the current I flowing through the resistor 332 from the point E to the point F is expressed as follows:

$$I = (V_H - V_I)/R_3.$$

Because the three resistors 22, 23 and 332 are connected in series through the points D, E, F and G and the same current as flows through the resistor 22 flows through the resistor 332 and also flows through the resistor 23 as mentioned above, this current I flows out from the operational amplifier 334, flows through the points D, E, F and G, and flows to the operational amplifier 335.

Assuming that the voltages $V_H$ nd $V_I$ are constant voltages and the resistance value of the resistor 332 does not change, the current I is a constant current. Thereby, it is possible that the constant current always flows through the first and second heating resistors 22 and 23. Thus, in this embodiment, a constant-current source 338 is formed as a result of combining the constant-voltage sources 336 and 337, which supply the constant voltages $V_H$ and $V_I$, respectively, with the operational amplifiers 334 and 335.

The voltage $V_D$ at the point D and the voltage $V_G$ at the point G are expressed as follows:

$$V_D = I \cdot R_1 + V_H;$$

and $$V_G = -I \cdot R_2 + V_I.$$

For example, assuming that $V_H = 1$ (V) and $V_I = -1$ (V), in order that I=2 (mA), $$R_3 = (1-(-1))/0.002 = 1000.$$

Thus, the resistance value of the resistor 332 is 1 kΩ.

As a result of the constant current I flowing, the first and second heating resistors 22 and 23 heat. Because each of these heating resistors 22 and 23 has a large temperature coefficient of resistance, the resistance value thereof changes as the ambient temperature changes, the fluid temperature changes and/or the fluid flow changes. In a case where the resistance value changing range of each heating resistor is on the order of from approximately 500 to 750 Ω, the voltage at the point D changes from 2 to 2.5 V and the voltage at the point G changes from −2 to −2.5 V. By subtracting the constant voltage $V_H$ from the voltage $V_D$ at the point D, the voltage between the ends of the first heating resistor 22 is obtained. Similarly, By subtracting the constant voltage $V_I$ from the voltage $V_G$ at the point G, the voltage between the ends of the second heating resistor 23 is obtained.

Although $V_H$ is set to 1 V and $V_I$ is set to −1 V in the above-described example, it is also possible that these voltages are set to lower voltages so that $V_H$=0.5 V, $V_I$=−0.5 V and the resistance value of the resistor 332 is set to be 500 Ω. In this case, the voltage changing range of the voltage $V_D$ at the point D changes from 1.5 to 2 V and the voltage changing range of the voltage $V_G$ at the point G changes from −1.5 to −2 V. It is also possible that $V_I$=0 (V). Thereby, the voltage at the point F is 0 V. Thereby, it is possible to omit the constant voltage source 337. In this case, $V_H$ is set to be 1 V and the resistance value of the resistor 332 is set to be 500 Ω. Thereby, the voltage changing range of the voltage $V_D$ at the point D changes from 2 to 2.5 V and the voltage changing range of the voltage $V_G$ at the point G changes from −1 to −1.5 V.

By setting the voltage at the point E to be positive and setting the voltage at the point F to be negative as mentioned above, it is possible that the zero voltage point is present in the path between the points E and F. Thereby, it is possible to reduce the absolute values of the voltages to be applied to the heating resistors 22 and 23 for the measurement to be small. This feature is advantageous in a gas meter or the like which is driven by a battery or the like.

In this embodiment, any of the first and second heating resistors 22 and 23 may be set on the upstream side (this condition is also applied to each embodiment described hereinafter). Further, it is also possible that $V_H$ is negative and $V_I$ is positive.

Figure 32:
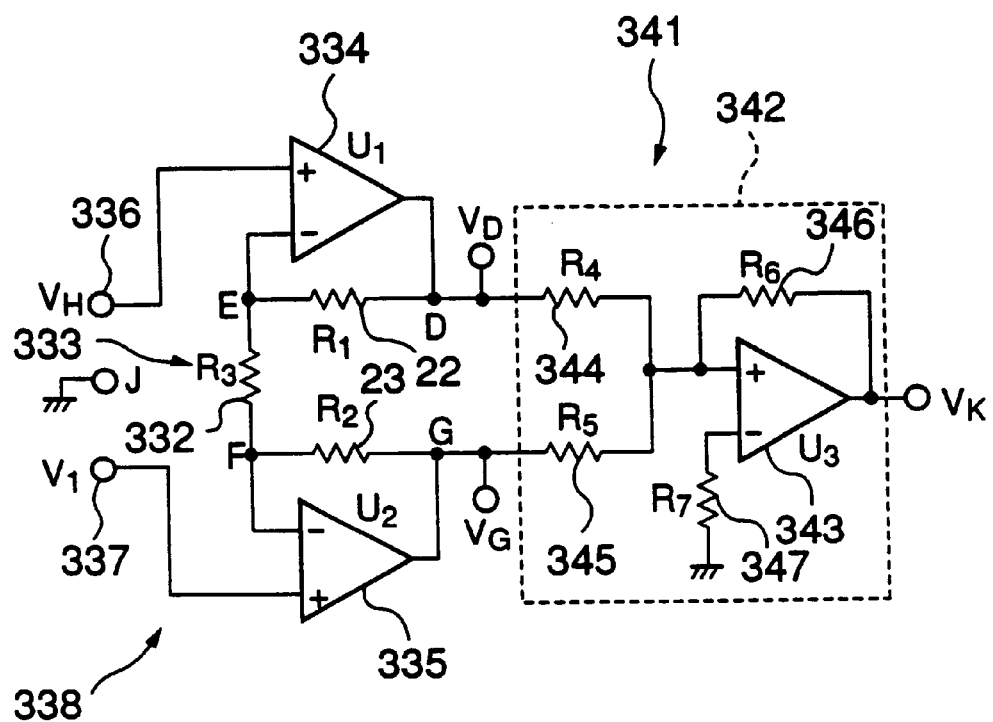
FIG. 32 shows a block diagram of a flow measuring device in a thirteenth embodiment of the present invention.

With reference to FIG. 32, a thirteenth embodiment of the present invention will now be described. In a flow measuring device 341 of the thirteenth embodiment, an adder 342, acting as adding means for adding the voltages $V_D$ and $V_G$ which are the output voltages of the operational amplifiers 334 and 335, is additionally provided. $V_D$ is the terminal voltage of the larger absolute value between the both-end terminal voltages of the first heating resistor 22. $V_G$ is the terminal voltage of the larger absolute value between the both-end terminal voltages of the second heating resistor 23. The adder 342 includes an operational amplifier 343 and a plurality of resistors 344, 345, 346 and 347 for inputting signals to the operational amplifier 343 and feedback for the operational amplifier 343.

In this arrangement, the resistance values of the resistors 344 and 345 are equal to one another ($R_4$=$R_5$) and the relationship between the voltages $V_H$ and $V_I$ is such that $V_H$=−$V_I$. Thereby, as mentioned above, $$V_D = I \cdot R_1 + V_H;$$

and $$V_G = -I \cdot R_2 0 - V_I.$$

Through the connection path D, E, F and G, the zero voltage point is present between the points E and F. Accordingly, the absolute value of the voltage at the point D is larger between those of the voltages at the both-end points D and E of the first heating resistor 22. Similarly, the absolute value of the voltage at the point G is larger between those of the voltages at the both-end points G and F of the second heating resistors 23. The adder 342 adds the voltage $V_D$ at the point D and the voltage $V_G$ at the point G and outputs the added voltage $V_K$. The added voltage $V_K$ is expressed as follows:

$$V_K = -R_6 \cdot (V_D/R_4 + V_G/R_5).$$

The above equations are substituted and thus, $$V_K = -R_6/R_4 \cdot \{I \cdot R_1 + V_H + (-I \cdot R_2) - V_H\} = -R_6/R_4 \cdot I \cdot (R_1 - R_2).$$

Assuming that the values of the voltages $V_H$ and $V_I$ are constant, the current I is a constant current. Thereby, from the above equation, it is known that the added voltage $V_K$ of the output of the adder 342 is in proportion to the difference between the resistance values of the first and second heating resistors 22 and 23. Thus, it is possible to extract only the component of the difference between the resistance values of the heating resistors 22 and 23, and the measurement accuracy is improved.

Figure 33:
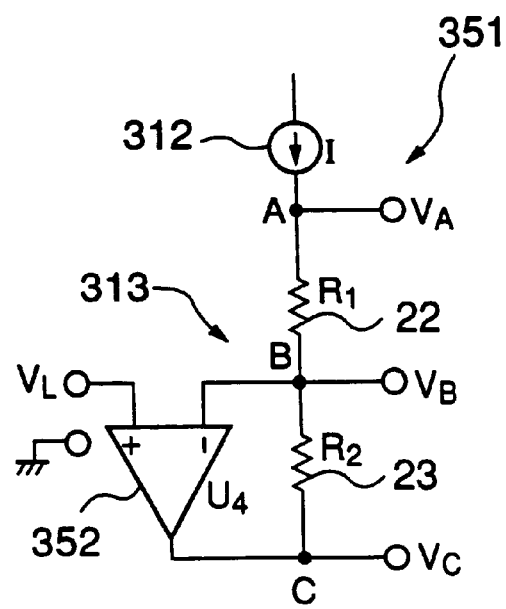
FIG. 33 shows a block diagram of a flow measuring device in a fourteenth embodiment of the present invention.

With reference to FIG. 33, a fourteenth embodiment of the present invention will now be described. In a flow measuring device 351 in the fourteenth embodiment, the second heating resistor 23 in the resistor series 313 such as that shown in FIG. 26 is connected to an operational amplifier 352 so that a feedback loop is formed. Specifically, the connection point B between the heating resistors 22 and 23 is connected to the minus input terminal of the operational amplifier 352 and the other end point C of the heating resistor 23 is connected to the output terminal of the operational amplifier 352. Thereby, the connection point B between the heating resistors 22 and 23 is artificially grounded to the plus input terminal of the operational amplifier 352 through the operational amplifier 352. To the plus input terminal of the operational amplifier 352, an arbitrary constant voltage $V_L$ is applied.

In this arrangement, the constant current I from the constant current source 312 flows through the first heating resistor 22 from the point A, and flows to the point B. The current flowing to the point B does not flow to the minus input terminal of the operational amplifier 352 because input impedance of the operational amplifier 352 is high. The current flowing to the point B then flows through the second heating resistor 23 to the point C. Thus, the first and second heating resistors are connected in series and the same current as flows through the first heating resistor 22 flows through the second heating resistor 23.

Because the heating resistor 23 is connected to the operational amplifier 352 so that feedback control of the operational amplifier 352 is performed, the minus input terminal and plus input terminal of the operational amplifier 352 are artificially grounded to one another, and as a result, have an equal voltage. Thereby, the voltage at the point B is equal to the constant voltage $V_L$. Accordingly, the voltage $V_A$ at the point A and the voltage $V_C$ at the point C are expressed as follows:

$$V_A = I \cdot R_1 + V_L;$$

and $$V_C = -I \cdot R_2 + V_L.$$

Thus, the voltages $V_A$ and $V_C$ are linear with respect to the resistance values of the heating resistors 22 and 23, respectively.

In this embodiment, as a result of supplying the constant current I, the first and second heating resistors 22 and 23 heat. Because each of the heating resistors 22 and 23 has a large temperature coefficient of resistance, the resistance value thereof changes as the ambient temperature changes, the fluid temperature changes and/or the fluid flow changes.

In a case where the heating resistors, the resistance changing range of each being on the order of from approximately 500 to 750 Ω, are used, the constant voltage $V_L$ is set to be 0 V, and the constant current I is set to be 2 mA, the voltage at the point A changes from 1 to 1.5 V and the voltage at the point C changes from −1 to −1.5 V. From the voltage change, the fluid flow can be known. In this embodiment, although the heating resistors 22 and 23 are connected in series and the constant current is caused to flow therethrough, a resistor or the like such as the resistor 332 in the arrangements of FIGS. 31 and 32, which is used for placing the zero voltage point therein, is not needed, and it is possible to cause the circuit to operate with low voltages.

Figure 34:
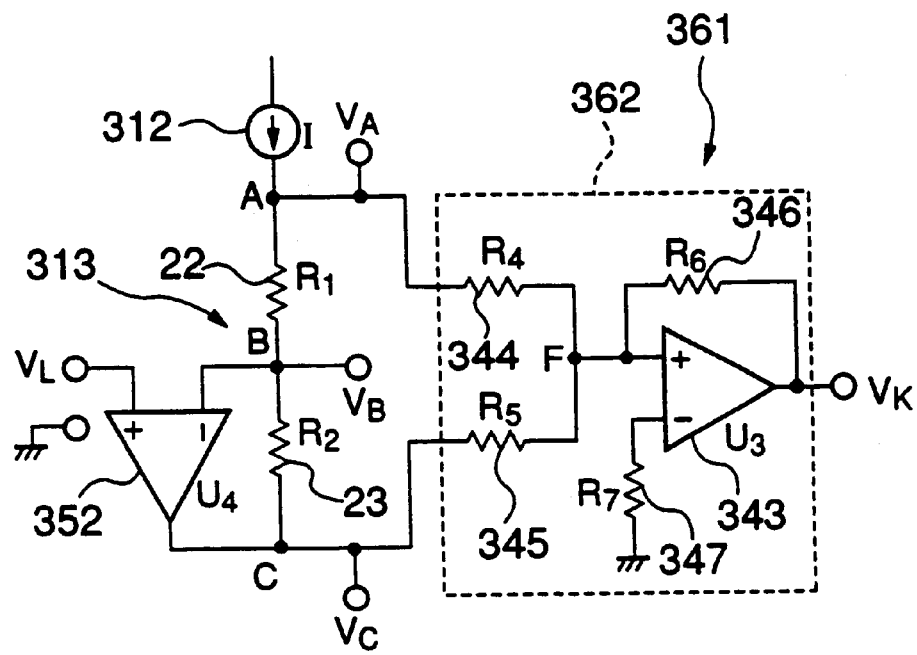
FIG. 34 shows a block diagram of a flow measuring device in a fifteenth embodiment of the present invention.

With reference to FIG. 34, a fifteenth embodiment of the present invention will now be described. In a flow measuring device 361 in the fifteenth embodiment, an adder 362 acting as adding means for adding the voltages at the ends of the resistor series 313 to one another is additionally provided. The structure of the adder 362 is the same as the structure of the adder 342 shown in FIG. 32. The adder 362 includes the operational amplifier 343 and the plurality of resistors 344, 345, 346 and 347 for inputting the signals to the operational amplifier 343 and the feedback for the operational amplifier 343. Accordingly, the added voltage $V_K$ output from the adder 362 is expressed as follows:

$$V_K = -R_6 \cdot (V_A/R_4 + V_C/R_5).$$

In a case where $V_L = 0$ (V) and the resistance values of the resistors 344 and 345 are equal to one another ($R_4 = R_5$), the above equations becomes $$V_K = -R_6/R_4 \cdot \{I \cdot R_1 + (-I) \cdot R_2\} = -R_6/R_4 \cdot I \cdot (R_1 - R_2).$$

Thus, assuming that the current I is constant, the value of the added output $V_K$ of the adder 362 is in proportion to the difference between the resistance values of the first and second heating resistors 22 and 23. Thus, it is possible to extract. only the component of the difference between the resistance values of the heating resistors 22 and 23, and the measurement accuracy is improved.

Figure 35:
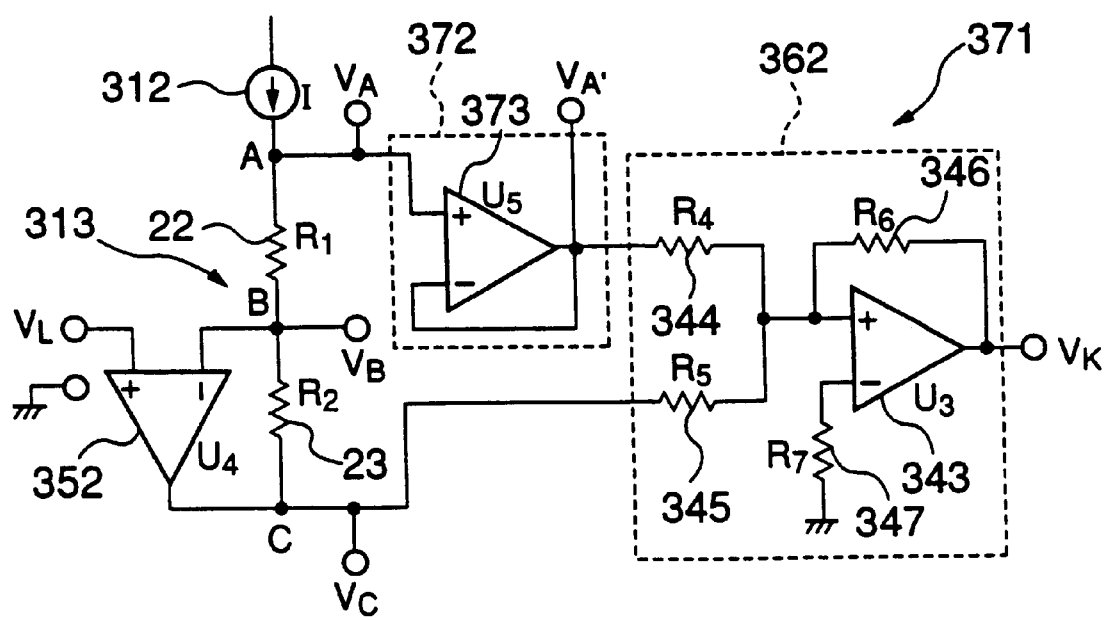
FIG. 35 shows a block diagram of a flow measuring device in a sixteenth embodiment of the present invention.

With reference to FIG. 35, a sixteenth embodiment of the present invention will now be described. In a flow measuring device 371 in the sixteenth embodiment, in addition to the arrangement shown in FIG. 34, an operational amplifier 373, which acts as impedance converting means 372 as a result of forming a voltage follower, is provided between the point A and the plus-side input terminal of the adder 362.

In the arrangement of FIG. 34, which does not include the operational amplifier 373, a part of the current I from the constant-current source 312 flows toward the adder 362. This branch current depends on the input impedance of the adder 362. By the branch current, the current flowing through the first and second heating resistors 22 and 23 is reduced and thereby is not equal to the constant current I. Further, the voltage $V_A$ at the point A changes as the resistance value of the first heating resistor changes. When the voltage $V_A$ at the point A changes, the current flowing to the adder 362 from the point A changes. In order to measure flow rates accurately, it is necessary to accurately measure the changes of the resistance values of the first and second heating resistors 22 and 23. However, the change of the current leaking to the adder 362 from the point A is a cause of an error in measuring of the resistance values of the first and second heating resistors 22 and 23.

In the sixteenth embodiment, by inserting the operational amplifier 373 at the input stage of the adder 362 as shown in FIG. 35, the above-described problem can be solved. The input impedance of the operational amplifier 373 is, ideally, infinitely high. In actual products, there are operational amplifiers having the input impedances on the order of from $10^6$ to $10^9$ Ω. Accordingly, by using the first heating resistor 22 having the resistance value on the order of $10^3$ Ω and using the operational amplifier 373 of a high input impedance, it is possible to reduce the current flowing to the operational amplifier 373 from the point A to the order of a neglectable amount. Thus, by a high impedance of the operational amplifier 373, the influence which the adder 362 has on the current flowing through the first and second heating resistors 22 and 23 can be reduced.

Figure 36:
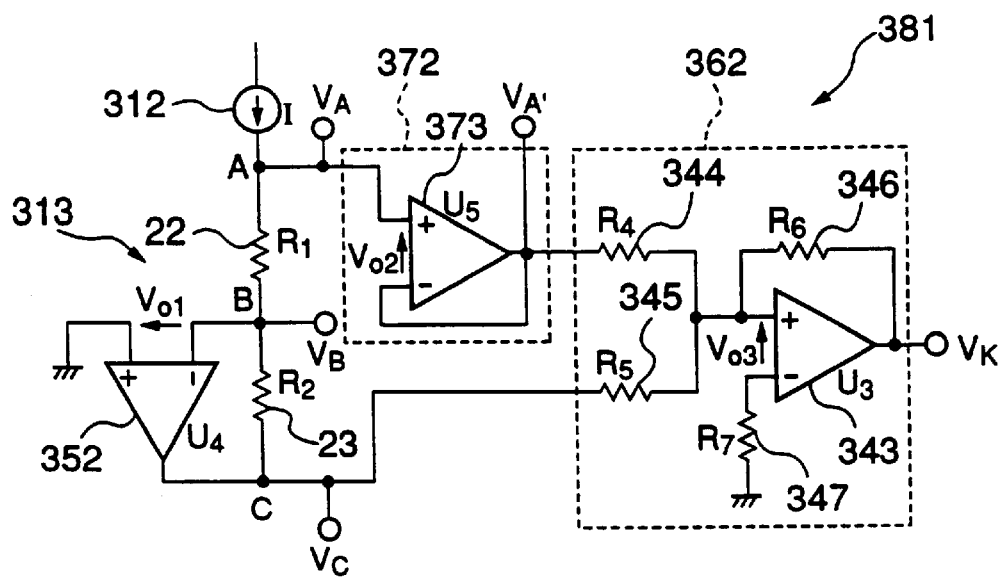
FIG. 36 shows a block diagram of a flow measuring device in a seventeenth embodiment of the present invention.

With reference to FIG. 36, a seventeenth embodiment of the present invention will now be described. The arrangement of a flow measuring device 381 in the seventeenth embodiment is the same as the arrangement of the flow measuring device 371 of the sixteenth embodiment shown in FIG. 35. However, in the flow measuring device 381, the three operational amplifiers 343, 352 and 373 are formed on a common silicon wafer and sealed in a common package. Specifically, such a structure can be easily obtained by using three circuits, for the operational amplifiers 343, 352 and 373, of the four circuits included in a four-circuit-containing operational amplifier such as OPA404 of BURR-BROWN Inc. or LT1179 of LINEAR TECHNOLOGY Inc. In this case, the resistance values of the resistors 344, 345 and 346 are the same as each other.

Using operational amplifiers in a common package is advantageous when the offset voltages of the operational amplifiers are considered. The offset voltage is present in each operational amplifier. Even in the artificially grounded condition, it is difficult for the voltage of the minus input terminals and the voltage of the plus input terminal to be equal to one another. The offset voltages of the three operational amplifiers 352, 373 and 343 will be referred to as $V_{O1}$, $V_{O2}$ and $V_{O3}$, respectively. The voltage $V_B$ of the connection point B is expressed as follows:

$$V_B = -V_{O1}.$$

When the current I flows from the constant-current source 312, the voltages $V_A$ and $V_C$ at the points A and C are expressed as follows:

$$V_A = V_B + I \cdot R_1 = I \cdot R_1 - V_{O1};$$

and $$V_C = V_B - I \cdot R_2 = -I \cdot R_2 - V_{O1}.$$

The output voltage $V_A'$ of the operational amplifier 373 is expressed as follows:

$$V_A' = V_A - V_{O2} = I \cdot R_1 - V_{O1} - V_{O2}.$$

Because the resistance values of the resistors 344, 345 and 346 are equal to each other, $R_4 = R_5 = R_6 = R$. The added output $V_K$ output from the adder 362 is expressed as follows;

$$V_K = V_{O3} - \{(V_A' - V_{O3})/R + (V_C - V_{O3})/R\} \cdot R = -3 \cdot V_{O3} - V_A' V_C = -3 \cdot V_{O3} + 2 \cdot V_{O1} + V_{O2} - I \cdot (R_2 - R_1).$$

Thus, the terms of the offset voltages $V_{O1}$, $V_{O2}$ and $V_{O3}$ are included in the added voltage $V_K$ other than the term of the difference between the resistance values of the first and second heating resistors 22 and 23.

For example, in the case of LT1179 of LINEAR TECHNOLOGY Inc., an offset voltage on the order of 100 μV may occur at an ambient temperature of 25° C. Further, the offset voltage changes as a result of being affected by the ambient temperature and elapsing time.

In the case where the offset voltages of the three operational amplifiers 343, 352 and 373 are equal to each other and thus $V_{O1} = V_{O2} = V_{O3} = V_O$, the above equation becomes $V_K = -I \cdot (R_2 - R_1)$.

Thus, the added output $V_K$ is not affected by the offset voltages.

To manufacture operational amplifiers having the offset voltages completely equal to each other is very difficult. However, by using operational amplifiers formed on a common silicon wafer, it is possible to provide operational amplifiers having offset voltages very approximately to equal to each other. By using three circuits, for the operational amplifiers 343, 352 and 373, of the four circuits included in a four-circuit-containing operational amplifier such as OPA404 of BURR-BROWN Inc. or LT1179 of LINEAR TECHNOLOGY Inc., it is possible to make the differences between the offset voltages of the operational amplifiers very small. Especially, by using operational amplifiers sealed in a common package, it is possible to make the thermal conditions of the three operational amplifiers 343, 352 and 373 be the same as each other. As a result, with regard to changes of the offset voltages due to change of temperature, it is possible to make the tendencies of changes of the offset voltages of the three operational amplifiers 343, 352 and 373 be the same as each other. Thereby, it is possible to make the influence of the offset voltages on the measurement of the resistance values of the first and second heating resistors 22 and 23 be very small.

In actual products, it is not necessary to use the above-mentioned two specific types of IC products. It is not necessary to use operational amplifier ICs either. It is possible to form the entirety of the circuit shown in the figure on a silicon wafer and seal it in a common package.

Figure 37:
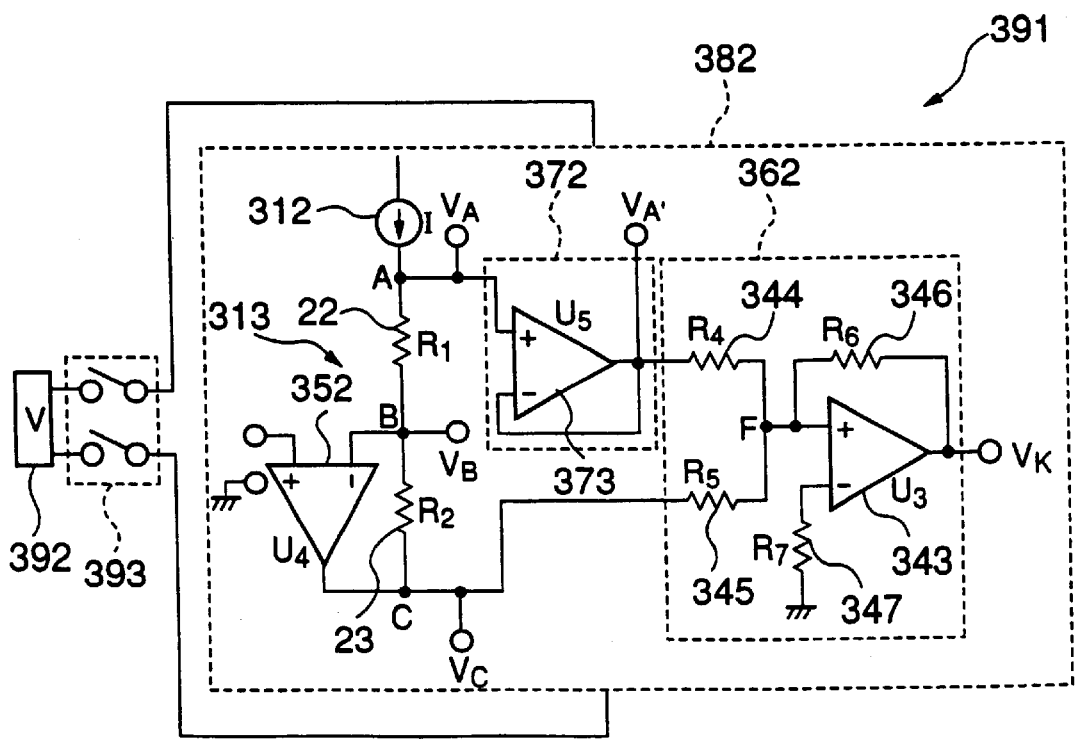
FIG. 37 shows a block diagram of a flow measuring device in an eighteenth embodiment of the present invention.

With reference to FIG. 37, an eighteenth embodiment of the present invention will now be described. An arrangement of a flow measuring device 391 in the eighteenth embodiment is applied to, for example, the flow measuring device 381 shown in FIG. 36. A power source 392 such as a battery or the like, which drives the circuit 382 of the flow measuring device 381, is provided, and a switch 393, acting as switching means for connecting the power source 392 to the circuit 382 and disconnecting the power source 392 from the circuit 382, is provided. The switch 393 can be arbitrarily closed or opened automatically externally by a control circuit at an arbitrary point of time.

In this arrangement, when flow rates are measured, the switch 393 is closed and power is supplied to the circuit 382 from the power source 392. Thereby, the circuit 382 can perform the above-described operations and a current is supplied to the first and second heating resistors 22 and 23. When it is not necessary to measure flow rates, the switch 393 is opened. Thereby, the power supply to the circuit 382 from the power source 392 is stopped. As a result, the circuit cannot operate and no current is supplied to the first and second heating resistors 22 and 23. Thus, by causing the current value to be zero when it is necessary to measure flow rates, power which is unnecessarily consumed can be eliminated. Particularly, when the power source 392 is a battery, it is possible to elongate the period for which the measurement operation can be performed without replacing the battery.

In this embodiment, when it is not necessary to measure flow rates, the switch 393 is used for stopping power supply to the circuit 382 in order to cause the current flowing through the first and second heating resistors 22 and 23 to be zero. However, instead, it is also possible to disconnect the connecting path from the constant-current source 312 to the resistor series 313 and thus to cause the current flowing through the resistor series 313 to be zero. Further, the circuit 382 to which the arrangement of the eighteenth embodiment is applied is not limited to the circuit shown in FIG. 36. The arrangement of the eighteenth embodiment can be applied to any of the tenth, eleventh, twelfth, thirteenth, fourteenth, fifteenth and sixteenth embodiments.

The present invention is not limited to the above-described embodiments, and variations and modifications may be made without departing from the scope of the present invention claimed in the following claims.

What is claimed is:

1. A flow measuring device, comprising:

a first heating resistor placed in a fluid flow path;

a second heating resistor placed downstream of said first heating resistor;

power supply means for supplying power to each of said first and second heating resistors;

temperature measuring means for measuring a heating temperature of each of said first and second heating resistors;

subtracting means for subtracting the heating temperature of said first heating resistor from the heating temperature of said second heating resistor; and dividing means for dividing a result of the subtraction by the heating temperature of one of said first and second heating resistors.

2. The flow measuring device, according to claim 1, wherein said subtracting means multiplies by a constant at least one of the two heating temperatures of said first and second heating resistors before performing the subtraction.

* * * * *

UNITED STATES PATENT AND TRADEMARK OFFICE
CERTIFICATE OF CORRECTION

PATENT NO.   : 6,230,560 B1
DATED        : May 15, 2001
INVENTOR(S)  : Suzuki

It is certified that error appears in the above-identified patent and that said Letters Patent is hereby corrected as shown below:

<u>Title page,</u>
Item [73] is incorrect. Item [73] should read:
-- [73] Assignees: Ricoh Company, Ltd., Tokyo;
                   Ricoh Elemex Corporation, Nagoya, both of (JP) --

Signed and Sealed this

Ninth Day of October, 2001

Attest:

*Nicholas P. Godici*

NICHOLAS P. GODICI
*Attesting Officer*    *Acting Director of the United States Patent and Trademark Office*